United States Patent
Janisse et al.

(10) Patent No.: US 10,005,212 B2
(45) Date of Patent: Jun. 26, 2018

(54) LACROSSE HEAD POCKET AND RELATED METHOD OF MANUFACTURE

(71) Applicant: Warrior Sports, Inc., Warren, MI (US)

(72) Inventors: Richard J. Janisse, Windsor (CA); Craig M. Herman, Pleasant Ridge, MI (US)

(73) Assignee: Warrior Sports, Inc., Warren, MI (US)

( * ) Notice: Subject to any disclaimer, the term of this patent is extended or adjusted under 35 U.S.C. 154(b) by 4 days.

(21) Appl. No.: 15/449,120

(22) Filed: Mar. 3, 2017

(65) Prior Publication Data

US 2017/0173832 A1 Jun. 22, 2017

Related U.S. Application Data

(63) Continuation of application No. 15/147,218, filed on May 5, 2016, now Pat. No. 9,592,628, which is a
(Continued)

(51) Int. Cl.
*B29C 70/76* (2006.01)
*B29C 70/68* (2006.01)
(Continued)

(52) U.S. Cl.
CPC .......... *B29C 45/1418* (2013.01); *A63B 59/20* (2015.10); *B29C 33/26* (2013.01);
(Continued)

(58) Field of Classification Search
CPC ............ B29C 70/688; B29C 45/14786; B29C 45/14631; B29C 33/26; B29C 45/14065;
(Continued)

(56) References Cited

U.S. PATENT DOCUMENTS

| 2,042,984 A | 6/1936 | Fritz |
| 3,910,578 A | 10/1975 | Brine, Jr. |

(Continued)

FOREIGN PATENT DOCUMENTS

| CA | 2326206 | 5/2001 |
| CA | 2359858 | 4/2002 |

OTHER PUBLICATIONS

Photo of deBeer Lacrosse Head.
Webpage download, e-lacrosse, 2003, www.e-lacrosse.com/stech67.php, 10 pages.

*Primary Examiner* — Joseph S Del Sole
*Assistant Examiner* — Thu Khanh T Nguyen
(74) *Attorney, Agent, or Firm* — Warner Norcross + Judd, LLP

(57) ABSTRACT

A lacrosse head pocket and a related method of manufacture are provided. The pocket can be a molded pocket including individual molded strings, combined strings, shooting strings and support rails extending around a perimeter of the pocket. Certain pocket elements can include transition parts to smoothly transition components having different cross sections. The pocket can include a pre-formed ball channel and hole units having broadsides for connection to a head or other component. The pocket can be attached to a pocket frame, and optionally constructed from a mesh or other synthetic material that is tensioned with the pocket frame. A mold and related molding method are also provided.

15 Claims, 26 Drawing Sheets

Related U.S. Application Data continuation of application No. 14/043,514, filed on Oct. 1, 2013, now Pat. No. 9,333,405.

(60) Provisional application No. 61/714,895, filed on Oct. 17, 2012.

(51) Int. Cl.
| | |
|---|---|
| *B29C 45/14* | (2006.01) |
| *B29C 70/70* | (2006.01) |
| *B29C 33/26* | (2006.01) |
| *A63B 59/20* | (2015.01) |
| *B29C 37/02* | (2006.01) |
| *B29C 45/26* | (2006.01) |
| *B29C 55/00* | (2006.01) |
| B29L 31/52 | (2006.01) |
| B29K 77/00 | (2006.01) |
| B29K 105/20 | (2006.01) |

(52) U.S. Cl.
CPC ........ *B29C 37/02* (2013.01); *B29C 45/14065* (2013.01); *B29C 45/14336* (2013.01); *B29C 45/14467* (2013.01); *B29C 45/14631* (2013.01); *B29C 45/14786* (2013.01); *B29C 45/2681* (2013.01); *B29C 55/00* (2013.01); *B29C 70/688* (2013.01); *B29C 70/70* (2013.01); *B29C 2045/14122* (2013.01); *B29C 2045/14147* (2013.01); *B29C 2045/14868* (2013.01); *B29K 2077/00* (2013.01); *B29K 2105/20* (2013.01); *B29K 2105/206* (2013.01); *B29K 2713/00* (2013.01); *B29L 2031/52* (2013.01); *B29L 2031/5245* (2013.01)

(58) Field of Classification Search
CPC ... B29C 37/02; B29C 45/14467; B29C 55/00; B29C 45/2681; B29C 45/14336; B29C 45/1418; B29C 70/70; B29C 2045/14122; B29C 2045/14147; B29C 2045/14868; A63B 59/20; B29L 2031/52; B29L 2031/5245; B29K 2077/00; B29K 2713/00; B29K 2105/206; B29K 2105/20
USPC ....................................................... 264/45.5
See application file for complete search history.

(56) References Cited

U.S. PATENT DOCUMENTS

| | | |
|---|---|---|
| 4,022,477 A | 5/1977 | Pool |
| 4,049,273 A | 9/1977 | Pool |
| 4,153,251 A | 5/1979 | Pond |
| 4,183,776 A | 1/1980 | Staub et al. |
| 4,273,331 A | 6/1981 | Fischer |
| 4,460,178 A | 7/1984 | Ulman |
| 4,861,042 A | 8/1989 | Trettin |
| 4,938,480 A | 7/1990 | Lods |
| D318,509 S | 7/1991 | Naumburg, Jr. |
| 5,174,580 A | 12/1992 | Pratt |
| 5,269,532 A | 12/1993 | Tucker et al. |
| 5,814,268 A | 9/1998 | Banchelin et al. |
| 5,920,970 A | 7/1999 | Coblentz |
| 5,957,791 A | 9/1999 | Nichols et al. |
| 6,213,901 B1 | 4/2001 | Collinson |
| 6,447,410 B2 | 9/2002 | Crawford |
| 6,471,276 B1 | 10/2002 | Brunsman et al. |
| 6,506,132 B1 | 1/2003 | Brine, III et al. |
| 6,520,875 B1 | 2/2003 | Crawford |
| 6,533,686 B2 | 3/2003 | LeMire |
| 6,626,774 B2 | 9/2003 | Sorbie |
| 6,641,492 B2 | 11/2003 | LeMire |
| 6,824,636 B2 | 11/2004 | Nelson et al. |
| 6,852,047 B2 | 2/2005 | Tucker, Sr. |
| 6,966,854 B1 | 11/2005 | Gait |
| 7,022,035 B2 | 4/2006 | Morrow et al. |
| 7,070,523 B1 | 7/2006 | Gait |
| 7,131,919 B2 | 11/2006 | Kohler et al. |
| 7,192,369 B2 | 3/2007 | Morrow |
| 7,211,009 B2 | 5/2007 | Samaras et al. |
| 7,238,128 B1 | 7/2007 | Filice et al. |
| 7,278,936 B2 | 10/2007 | Tucker, Jr. |
| 7,331,884 B2 | 2/2008 | Samaras et al. |
| RE40,182 E | 3/2008 | Morrow |
| 7,338,396 B2 | 3/2008 | Gait |
| 7,364,519 B1 | 4/2008 | Gait |
| 7,390,275 B1 | 6/2008 | Gait |
| 7,458,908 B1 | 12/2008 | Gait |
| 7,503,859 B1 | 3/2009 | Gait |
| 7,507,171 B2 | 3/2009 | Gait |
| 7,524,253 B1 | 4/2009 | Gait |
| 7,727,092 B2 | 6/2010 | Lignelli et al. |
| 7,833,116 B2 | 11/2010 | Tucker, Sr. et al. |
| 7,854,670 B2 | 12/2010 | Gait |
| 7,963,867 B1 | 6/2011 | Gait |
| 7,979,918 B2 | 7/2011 | Sandusky et al. |
| 8,083,978 B1 | 12/2011 | Fox et al. |
| 8,235,846 B2 | 8/2012 | Winningham et al. |
| 8,371,966 B2 | 2/2013 | Winningham et al. |
| 9,259,883 B1 | 2/2016 | Morrow et al. |
| 9,283,699 B2 | 3/2016 | Morrow et al. |
| 2001/0044347 A1 | 11/2001 | Crawford |
| 2002/0107094 A1 | 8/2002 | LeMire |
| 2002/0160865 A1 | 10/2002 | Brine, III et al. |
| 2002/0173389 A1 | 11/2002 | Morrow |
| 2003/0100388 A1 | 5/2003 | LeMire |
| 2003/0181270 A1 | 9/2003 | Morrow et al. |
| 2005/0010142 A1 | 1/2005 | Kim |
| 2006/0046876 A1 | 3/2006 | Tucker, Jr. |
| 2006/0194655 A1 | 8/2006 | Tucker, Sr. et al. |
| 2007/0054760 A1 | 3/2007 | Gait |
| 2007/0191153 A1 | 8/2007 | Gait |
| 2008/0026883 A1 | 1/2008 | MacNeil et al. |
| 2008/0127615 A1 | 6/2008 | Gait |
| 2008/0146385 A1 | 6/2008 | Lundberg |
| 2008/0146387 A1 | 6/2008 | Gait |
| 2010/0000656 A1 | 1/2010 | Winningham et al. |
| 2011/0160007 A1 | 6/2011 | Winningham et al. |
| 2012/0122617 A1 | 5/2012 | Szurley |
| 2012/0165140 A1 | 6/2012 | Bound |
| 2012/0255670 A1 | 10/2012 | Winningham et al. |

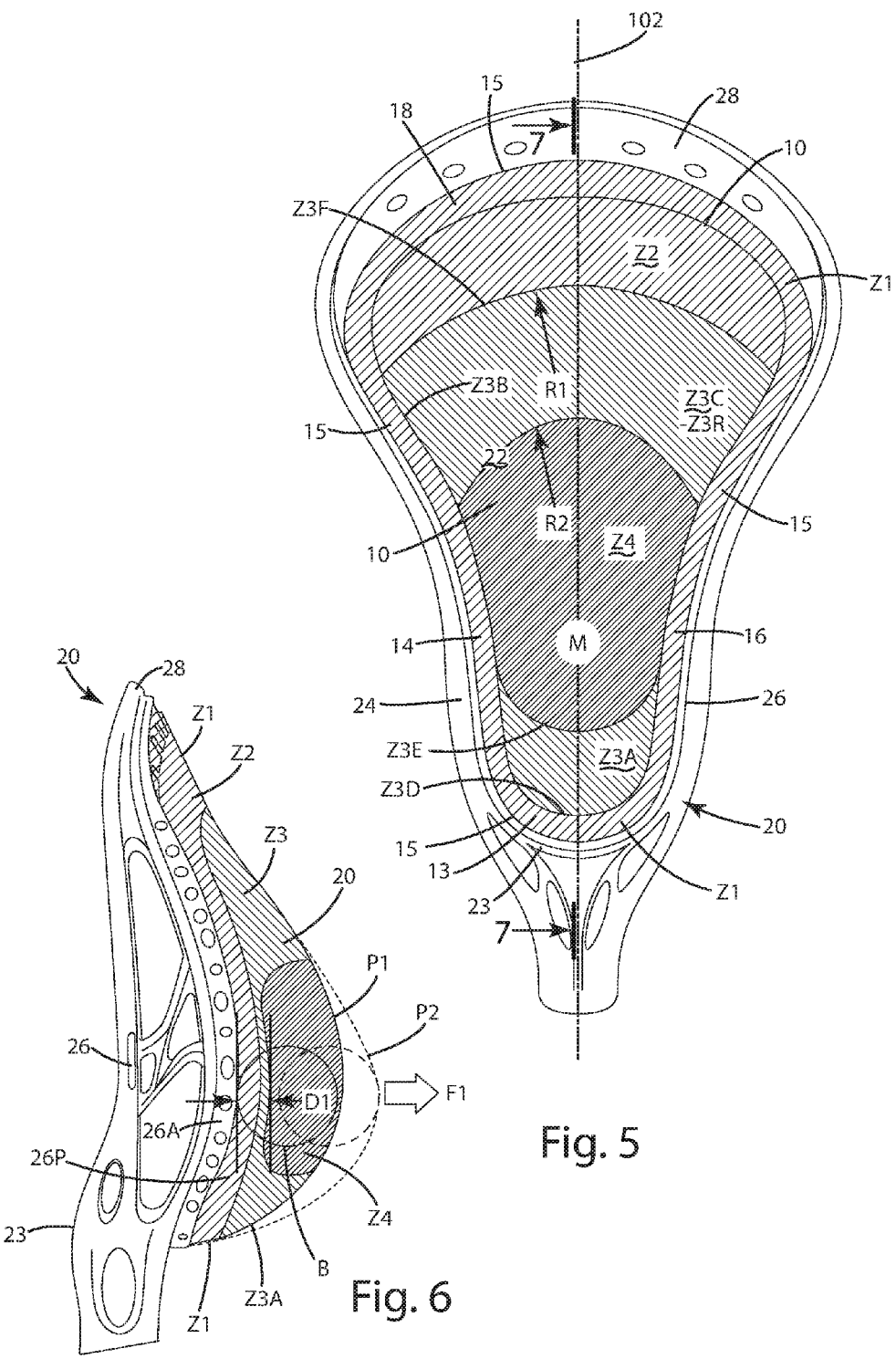

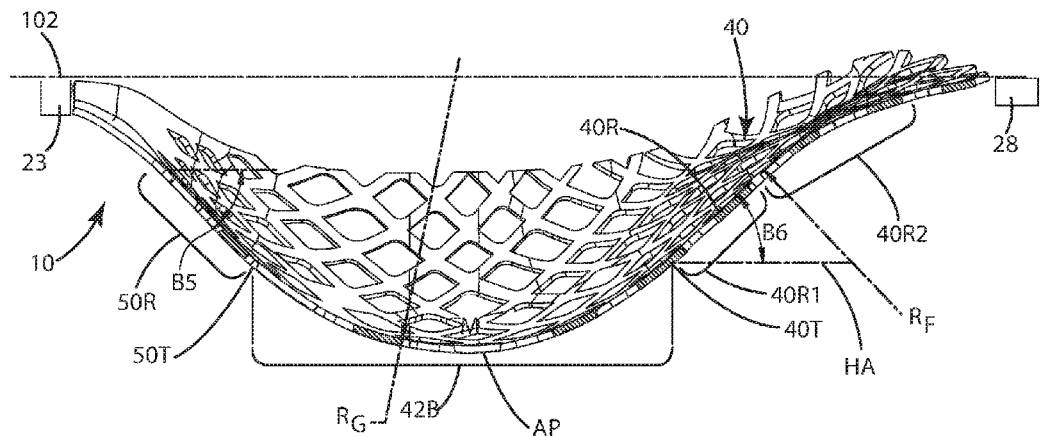
Fig. 13F
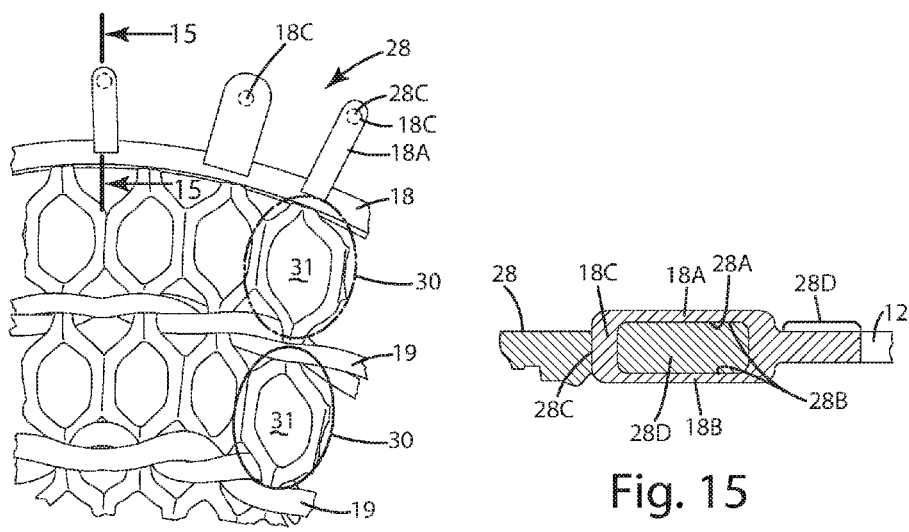
Fig. 14
Fig. 15

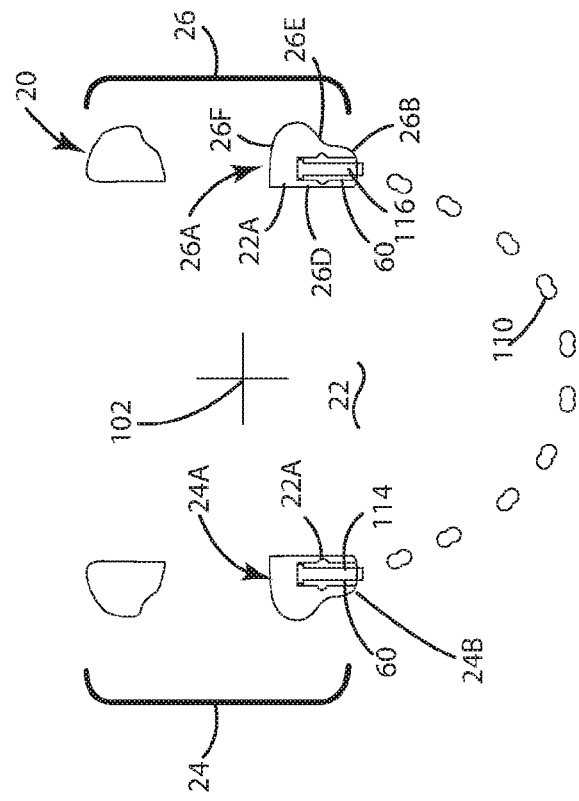
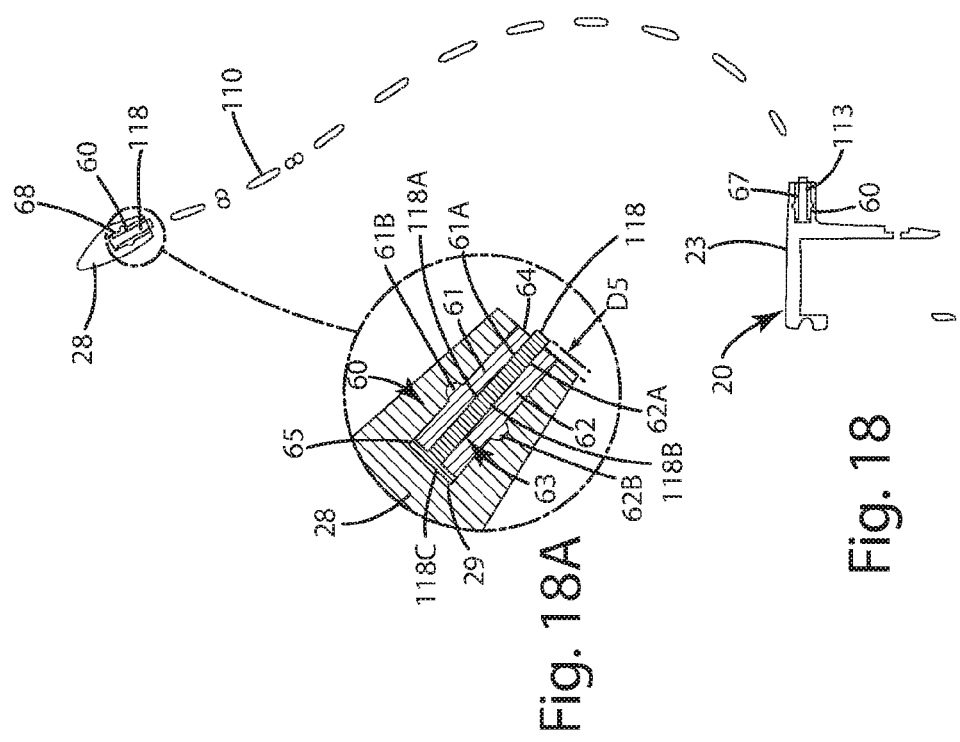

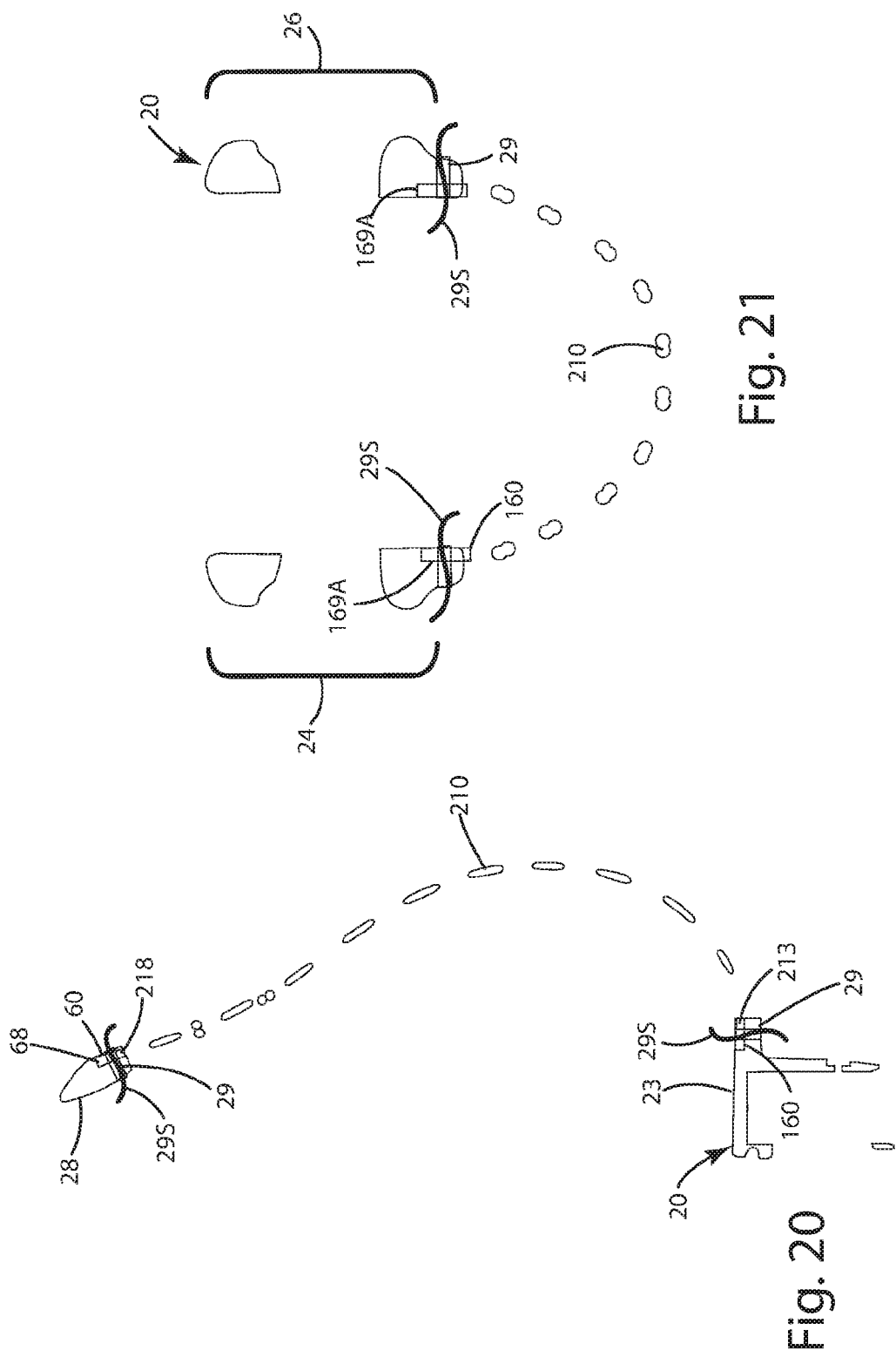

LACROSSE HEAD POCKET AND RELATED METHOD OF MANUFACTURE

BACKGROUND OF THE INVENTION

The present invention relates generally to lacrosse equipment, and more particularly, to a lacrosse head pocket and a related method of manufacture.

Conventional lacrosse sticks include a head joined with a handle. The head includes a frame that forms a region within which a lacrosse ball can be caught, held or shot. A net is joined with the back side of the frame. Typically, the net is constructed from laces or mesh, which is further connected to the frame via multiple small holes defined by the frame. The net forms a pocket within which the lacrosse ball is held while a player is in possession of the ball, and can be a determinant factor as to the player's ability to catch, retain and shoot the ball.

Different lacrosse players at different positions typically prefer pockets having certain profiles and handling characteristics. For example, while a player at an attack position generally prefers a pocket configured for vertical cradling and accurate shooting of a lacrosse ball, a midfielder prefers a pocket for better control and safely carrying a ball by cradling it back and forth, causing the ball to snugly set in the pocket due to centripetal forces. A defensive player generally prefers a pocket configured for better cradling and release with a defensive stick. Further, depending on the player, they may prefer a modification of the pocket. For example, an attacker may prefer their shooting strings, which generally form the ramp of the pocket from which the lacrosse ball is shot, to be at a certain angle to impart spin, control the release point of the ball out of the pocket, or exert more force on the ball as it exits the head. With many conventional pockets, however, it is frequently difficult to accommodate these player preferences without significant knowledge and experience about how to modify the net so that the pocket has a specific profile and performs as desired.

In addition, when a conventional pocket wears out, the mere thought of replacing it can be daunting to many, particularly younger or less experienced lacrosse players. This is true for traditional pockets, which include a complicated arrangement of thongs and lacing, and in many cases mesh pockets, which include a soft fabric mesh material that is carefully attached directly to the lacrosse. The reason many players dread replacing or servicing pockets is because most pockets require a complex lacing procedure, which is mastered by only a limited number of individuals, to secure the net to a lacrosse frame in a desired pocket configuration. Thus, many lacrosse players, particularly youths and newcomers to the sport, are left at the mercy of having to wait for their lacrosse sticks to be restrung by someone else, and even then, after the pocket is strung, it usually takes several weeks or months until the pocket is properly broken in to achieve a desired profile.

In addition to conventional lacrosse pockets being difficult to customize and replace, they usually are affected by climate and moisture. For example, even where a pocket net is woven or otherwise constructed from filaments of nylon or polypropylene, when wetted by a rain, the net of the pocket can expand or become slippery, and when dried after being wetted the net can shrink, both of which can significantly alter how a lacrosse ball is shot from the pocket. This can lead to inconsistent shooting, which can be detrimental to the player's performance.

Some manufacturers have attempted to resolve the above issues. One approach is implemented in a pocket called the deBeer Gripper Pro, commercially available from J. deBeer & Son of Altamont, N.Y. The technology of this pocket is presented in U.S. Pat. No. 7,524,253 to Gait, which generally describes a pre-formed pocket including runners having two layers of multiple types of different materials and perpendicular cross pieces strung between the runners. A first layer includes a polyurethane material that is joined with a braided nylon web. A second layer also includes a polyurethane material joined with another braided nylon web. The first and second layers are sandwiched and machine stitched together in some areas, but separated in other areas to form openings between the layers. The openings are large enough so that the cross pieces can be loosely inserted through them. The cross pieces or other laces are then laced through openings in the lacrosse head frame.

While this construction provides an easy-to-install runner system, it requires a skill to precisely position and connect the cross pieces to the multilayered runners, which skill may not be possessed by younger or inexperienced players. Moreover, although the polyurethane and braided nylon layers work well, the layering of different materials requires additional assembly time. The extra machine stitching and sewing to join the various layers also requires additional assembly time and resources.

Another attempt to resolve the above issues with conventional pockets is presented in U.S. Pat. No. 7,192,369 to Morrow, which discloses in one embodiment a mesh pocket integrally formed with a lacrosse head frame. The mesh and head are constructed from the same plastic material, with the mesh and head being portions a single, injection molded item. While this construction eliminates the connection issues between the head and pocket, the pocket material generally is of the same rigidity and has the same characteristics as the head material, which might not be desirable to all players. Further, these "hard pockets" usually do not have sufficient flexibility and sometimes cannot retain a lacrosse ball in the pocket well.

SUMMARY OF THE INVENTION

A lacrosse head is provided including a lacrosse pocket that is durable and provides desirable playing characteristics. The pocket is easy to manufacture, and optionally easy to replace and/or service. A method for making the pocket also is provided.

In one embodiment, the pocket is molded and formed to mimic an open mesh or other pocket construction. This molded pocket is dimensioned to fit within the open area of a lacrosse head, generally within the area surrounded by a lacrosse head frame sidewalls, scoop and ball stop. The molded pocket includes a network of multiple individual molded strings constructed of varying cross sections. The cross sections vary throughout different zones of the molded pocket to increase ball control and throwing consistency.

In another embodiment, the multiple joined, individual molded strings of the molded pocket are joined with one another to form fused or combined molded strings, and generally oriented to define pocket holes through the molded pocket. The molded strings and combined strings can vary in cross section about different subsets of the pocket holes located in different zones. For example, molded strings and combined strings in a first pocket zone around the pocket perimeter, near the frame, can be of a first cross section. Additional molded strings and combined strings in a second zone, in the upper part of the pocket near the scoop, can be of the first cross section as well. Other molded strings and combined strings in a third zone, in a transition portion of the pocket, where the ball rolls or moves from the middle of the pocket into the upper part of the pocket toward the scoop, or from the middle of the pocket toward the ball stop, can have a second cross section that is less than the first cross section. Yet other molded strings and combined strings in a fourth zone formed in the middle of the pocket can have a third cross section that is less than the second cross section. The varying cross sections of the molded strings can enable the different zones of the molded pocket to function differently based on their intended function and desired play characteristics.

In still another embodiment, the pocket holes can vary with, or independent of, the molded individual and combined string cross sections, from zone to zone within the molded pocket, to increase ball control and throwing consistency. For example, in the second zone in the upper part of the pocket near the scoop, the pocket holes can be made up of holes of a first dimension. Other pocket holes in a third zone, in the transition portion of the pocket, can be of a second dimension that is greater than the first dimension. In this zone, there can be, for example, 6 to 10, or 8 holes across the molded pocket. Yet other pocket holes in the fourth zone in the middle of the pocket can have a third dimension that is greater than the first and second dimensions. In this zone, where the ball is typically carried, there can be, for example, 4 to 8, or 6 holes across the molded pocket. The varying cross sections of the molded strings can enable the different zones of the molded pocket to function differently based on their intended function and desired play characteristics.

In yet another embodiment, the molded pocket can include molded strings that smoothly transition between different cross sections in different parts or zones of the molded pocket. For example, an individual molded string or combined string can include a first part, a transition part and a second part. The transition part can be located directly between the first and second parts. The first part can have a first cross section, and the second part can have a greater second cross section. The transition part can include multiple varying cross sections sized between the first and second cross sections. The transition part can include an exterior surface having a taper of increasing size from the first part to the second part. The taper can be of a frustoconical, conical, polygonal, or other tapering geometric shape so that the first part transitions to the second part, generally void of any abrupt bumps or steps between the two parts.

In still yet another embodiment, the molded pocket can include pocket holes that are longer in a pocket hole length dimension, which is aligned with a longitudinal axis of the lacrosse head leading from ball stop to scoop, than a pocket hole width dimension, which is generally transverse or perpendicular to the longitudinal axis. In this construction, the molded strings surrounding the holes can generally form hole units, which have broad sides on opposing sides of the length dimensions of the pocket holes.

In a further embodiment, the molded pocket having the hole units with broad sides can be positioned so that multiple broad sides of hole units abut one another across the width of the molded pocket. The broad sides of certain perimeter hole units also can be positioned so that the broad side, and the associated molded string forming that side, is immediately adjacent the outer lateral perimeter or support rail of the molded pocket, a lateral side of a pocket frame to which the molded pocket is joined, and/or a lower sidewall rail of the lacrosse head. With the broad side of the perimeter hole units in this location, the molded pocket can be attached to the structural portions of the molded pocket and/or the head in a consistent and strength enhancing manner. This can improve the connection between the molded pocket as well as the structural longevity of the molded pocket.

In still a further embodiment, the molded pocket can include a shooting channel. The shooting channel can extend generally from the middle portion of the pocket or the fourth zone as mentioned above, through the third zone, in the transition portion of the pocket, and out through the second zone in the upper part of the pocket near the scoop. Throughout these zones, the shooting channel can have varying widths and heights progressing from the middle of the pocket to the upper part of the pocket near the scoop.

In still yet a further embodiment, the shooting channel can include decreasing widths and depths that are molded directly into the molded pocket and reflected in the molded strings as the channel progresses from the middle of the pocket to the upper part of the pocket near the scoop.

In another further embodiment, the molded pocket can include molded shooting strings molded directly to the other molded strings in the pocket, for example the individual molded strings and/or the combined strings. The shooting strings can extend laterally across the molded pocket from near one sidewall toward an opposing sidewall, near the scoop. The molded shooting strings can be integrally formed and monolithic with the molded strings and hole units. The molded shooting strings can have rounded, angled or flat upper surfaces facing into the molded pocket, generally upward into the area where the ball is held or moves within the pocket. The molded shooting strings can also have an arced, parabolic or rounded shape when viewed from the top side of the head, so that they form a generally convex shape when viewed from above the head, and from a perspective view from the scoop toward the ball stop along the longitudinal axis of the head.

In yet another further embodiment, the molded pocket, or alternatively a fabric mesh or other traditional pocket, can be joined with a pocket frame, which is further joined with the lacrosse head. The pocket frame can define one or more grooves around the perimeter of the frame. The grooves can be located in areas which, when the pocket frame is joined with the lacrosse head, correspond to the ball stop, sidewalls and/or scoop. The molded pocket or other pocket can be received in the groove to secure the pocket to the pocket frame. The pocket frame can include an inner part and an outer part that sandwich a perimeter of the molded pocket or other pocket there between, generally within the groove.

In another embodiment, the pocket frame can be joined with the head frame by molding the head frame over the pocket frame. The pocket frame can include ridges, projections, or other connection enhancing structure extending from surfaces thereof to enhance the physical connection between the pocket frame and the head frame. The pocket frame can be molded over by material of the head frame in the ball stop, sidewalls and/or scoop of the head frame. Optionally, the material of the pocket frame can be a different material from the material of the head frame and the molded pocket as well.

In even another embodiment, the molded pocket and its components can be constructed from a polymeric material, for example, thermoplastic elastomer polymers, such as thermoplastic polyurethane (TPU), thermoplastic copolyester, thermoplastic polyamides, polyolefin blends, styrenic block polymers, and/or elastomeric alloys, as well as rubber, formable but flexible resins, hydrophobic flexible materials, and/or other similar flexible materials.

In still another embodiment, the pocket frame can define multiple string holes around at least a portion of its periphery. The lacrosse head frame can define a stringing ridge or shoulder. The pocket frame can be sized or contoured to fit within, around, or generally mate with the stringing ridge or shoulder. The molded pocket or other pocket can be attached to the head by a string that passes through string holes defined in the head and through the string holes defined by the pocket frame.

In yet another embodiment, a method for molding a fabric mesh pocket or other pocket is provided. A mold defining a pocket frame mold cavity corresponding to the pocket frame is provided. The mold optionally can include one or more locator pins around a perimeter of the frame, optionally mounted exterior to the outside of pocket frame mold cavity. A standard mesh or synthetic material is stretched laterally and optionally longitudinally above the pocket frame mold cavity. The stretched mesh or synthetic material is moved toward the pocket frame mold cavity and engaged with the locator pins so that the mesh or synthetic material is maintained in a tensioned state, laterally and/or longitudinally, with a portion of it laying across and/or in the pocket frame mold cavity. Polymeric material is introduced into the pocket frame mold cavity with the mesh or synthetic material maintained in the tensioned state, so that the polymeric material is molded around the mesh or synthetic material occupying the pocket frame mold cavity. The polymeric material is allowed to cure and form the pocket frame. The pocket frame is removed from the mold, with the mesh or synthetic material molded within it and attached to it so that it cannot be removed without destroying the pocket frame and/or the mesh or synthetic pocket material.

In still yet another embodiment, the mold defining a pocket frame mold cavity corresponding to the pocket frame includes a central part located along a longitudinal axis of the mold, generally in the middle of pocket to be formed with the mold. The central part includes a bulbous contour that projects upward, above the uppermost part of the pocket frame mold cavity. When the mesh or synthetic material is placed in a tensioned state with the pins and brought near or within the pocket frame mold cavity, the contour can engage the mesh or synthetic material to form it into a corresponding shape. When the pocket frame is ultimately removed from the mold, the attached mesh or synthetic material maintains this corresponding shape. The corresponding shape can be a fitted ball pocket depression within the pocket on the pocket frame within which a lacrosse ball naturally moves toward when it is in the pocket. The particular location of the contour can be selected based on the desired playing characteristics of the lacrosse head to which the pocket frame and pocket are attached. With this depression "pre-formed" in the pocket, minimal break-in time for the pocket can be realized.

In a further embodiment, a mold for molding a molded pocket are provided. The mold can include a base having a base molded pocket cavity forming a first pocket cavity portion corresponding generally to an interior surface of the molded pocket (facing inward, toward the interior of the head or pocket frame) and an axis of symmetry generally corresponding to a longitudinal axis or some other preselected axis of the molded pocket. The mold cavity can include a retainer portion that captures an already formed lacrosse head or pocket frame, and places it immediately adjacent the mold cavity in which the mold pocket is to be molded. Where the mold pocket is to be molded to the head or pocket frame, the retainer can perfectly align the lacrosse head or pocket frame with the mold cavity and any gates or other features of the mold.

In still a further embodiment, the mold can include at least two slides disposed generally opposite one another, optionally on opposite sides of the axis of symmetry. The slides collectively can define a second pocket cavity portion of the molded pocket cavity, which generally corresponds to the exterior surface of the molded pocket (facing outward, away from the head or pocket frame). The slides can be operable to close against the mold base so that the first pocket cavity portion and second pocket cavity portion cooperatively form a cavity corresponding to the molded pocket.

In still yet a further embodiment, the at least two slides can each be configured to pivot toward the base about first and second mold pivot axes, optionally disposed opposite from one another across the axis of symmetry. The slides can each fold or swing about the respective axes toward one another to meet at the axis of symmetry and close the mold cavity of the molded pocket. The pivoting or folding slides can be configured to open in an opposite direction, pivoting outward from the molded pocket after the molding operation is complete. Due to the pivoting or folding movement, the first and second slides cleanly release from the multifaceted, complex structures of the molded pocket, for example the hole units and variety of molded strings with their optional varying cross sections.

In even a further embodiment, the first and second mold pivot axes are disposed opposite from one another across the axis of symmetry, and above the lowermost portions of the lacrosse head to which the molded pocket is joined. Optionally, the first and second mold pivot axes are placed above or even with the uppermost portions of the lacrosse head to which the molded pocket is joined. With this spatial orientation of the pivot axes relative to the head and/or the completed molded pocket, the slides fold or pivot away from the base in a manner that allows the first and second slides to cleanly release from the structures of the molded pocket, for example the hole units and molded strings.

In another, further embodiment, a method for molding the molded pocket is provided. In the method, a mold including a base having a base molded pocket cavity forming a first pocket cavity portion and an axis of symmetry is provided. Further provided are first and second slides configured to pivot toward the base about first and second mold pivot axes, where the first and second slides are disposed opposite from one another across an axis of symmetry of the base, and cooperatively define a second pocket cavity portion. A lacrosse head frame or pocket frame is placed in the base adjacent the first pocket cavity portion. The slides are pivoted about the respective axes toward one another to optionally meet at the axis of symmetry and close the mold cavity of the molded pocket. A material is introduced, for example by injection, into the first pocket cavity portion and second pocket cavity portion which form the molded pocket cavity to form a molded pocket. The material engages and/or bonds to the head or pocket frame. The slides are folded open about the axes, with the second pocket cavity portion cleanly releasing from the molded pocket and any associated molded strings or other structures of the pocket, head and/or pocket frame. The molded pocket and associated head or pocket frame are removed from the mold.

The pocket and methods herein can provide a pocket that is virtually unaffected by weather changes, temperature changes and moisture, which enables it to have a substantially consistent profile and configuration throughout such conditions. In turn, this enables the player to play with confidence, even under adverse environmental conditions. The molded pocket can be of a sufficient stiffness to provide more accurate, higher velocity shooting and passing, yet can still be able to adequately cradle, catch and retain a lacrosse ball. In turn, the pocket can be custom built for a variety of different positions in the game of lacrosse. Where it includes a preselected set of contours, the pockets herein require minimal break-in, maintenance and skill for installation on a lacrosse head. The pockets herein also can be less expensive to manufacture and assemble than conventional lacrosse head pockets.

These and other objects, advantages, and features of the invention will be more fully understood and appreciated by reference to the description of the current embodiment and the drawings.

Before the embodiments herein are explained in detail, it is to be understood that the invention is not limited to the details of operation or to the details of construction and the arrangement of the components set forth in the following description or illustrated in the drawings. The invention may be implemented in various other embodiments and of being practiced or being carried out in alternative ways not expressly disclosed herein. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof. Further, enumeration may be used in the description of various embodiments. Unless otherwise expressly stated, the use of enumeration should not be construed as limiting the invention to any specific order or number of components. Nor should the use of enumeration be construed as excluding from the scope of the invention any additional steps or components that might be combined with or into the enumerated steps or components.

BRIEF DESCRIPTION OF THE DRAWINGS

FIG. 5 is a top view illustrating different zones of the pocket;

FIG. 6 is a side view of the head and pocket illustrating the different zones;

FIG. 13F is a cross section view of the middle portion of the pocket and the ball channel taken along lines 13F-14F of FIG. 13A;

FIG. 14 is a close up view of molded shooting strings integral with other molded strings in the molded pocket, as well as molded pocket connectors along a scoop of the head;

FIG. 15 is a cross section view of the molded pocket connector taken along line 15-15 of FIG. 14;

FIG. 18 is a cross section view of the first alternative embodiment of the molded pocket and pocket frame taken along line 18-18 in FIG. 16;

FIG. 18A is a close up view of the cross section view of the first alternative embodiment of the molded pocket and pocket frame in FIG. 18;

FIG. 19 is a cross section view of the first alternative embodiment of the molded pocket and pocket frame taken along line 19-19 in FIG. 16;

FIG. 20 is a cross section view of a second alternative embodiment of the molded pocket and pocket frame taken along line 18-18 in FIG. 16;

FIG. 21 is a cross section view of the second alternative embodiment of the molded pocket and pocket frame taken along line 19-19 in FIG. 16;

DETAILED DESCRIPTION OF THE CURRENT EMBODIMENTS

I. Overview

Figure 1:
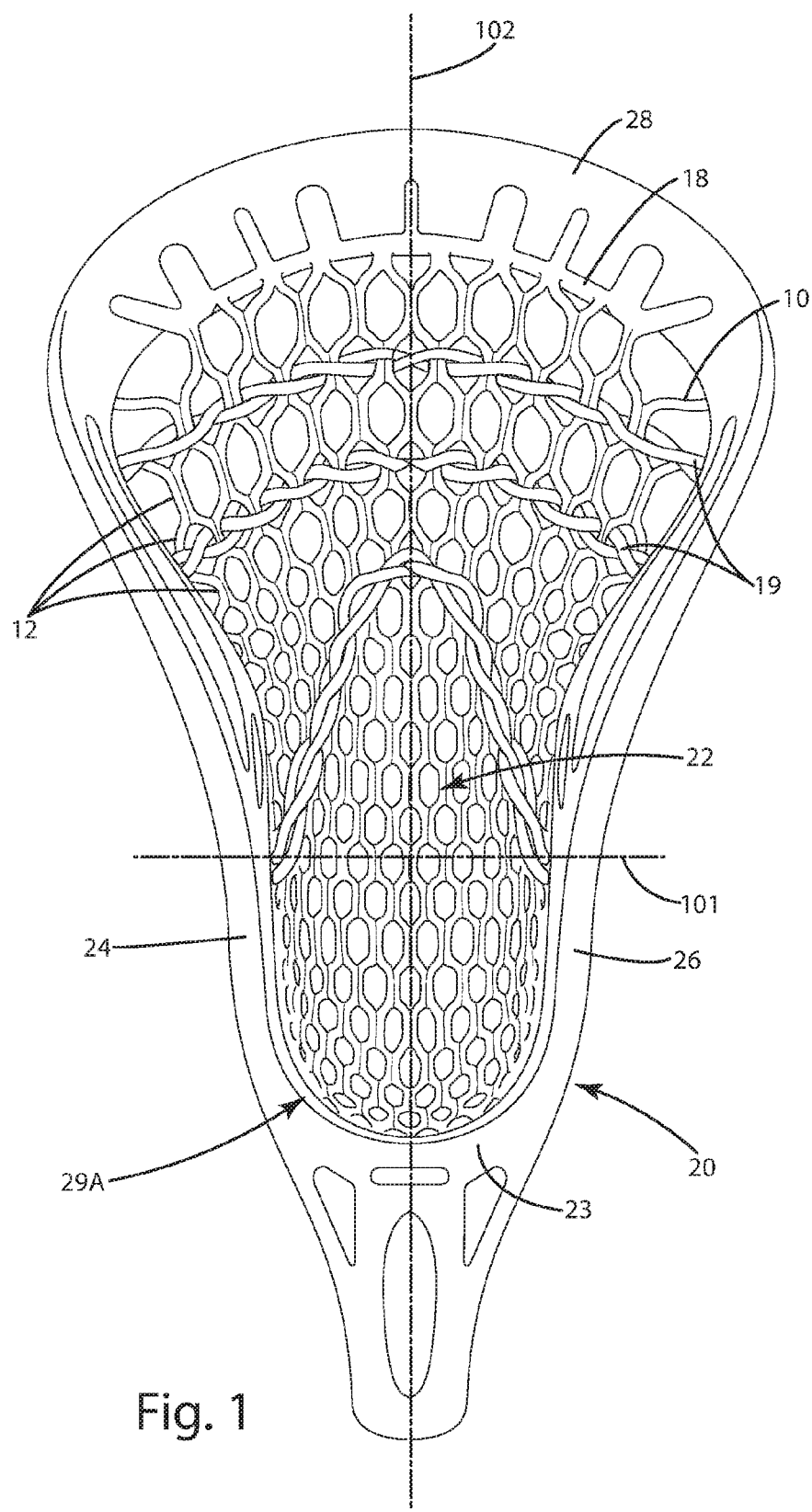
FIG. 1 is a top view of a lacrosse head including a current embodiment of a lacrosse pocket.

A current embodiment of a lacrosse head pocket is shown in FIGS. 1-7 and generally designated 10. The pocket 10 is secured to a lacrosse head 20 to form a "strung" lacrosse head. The lacrosse head 20 can be further joined with a handle (not shown) to form a lacrosse stick. As shown in FIG. 1, the lacrosse pocket 10 is in the form of a molded pocket including no conventional woven lacing, webbing or thongs in the inside pocket area 22 bounded by the lacrosse head frame 20. The molded pocket includes a network of molded strings 12 monolithically and integrally formed with one another from a polymeric material to form a single piece unit. The molded pocket can be void of any strings, laces and/or cross pieces embedded or encapsulated therein or otherwise joined with the molded pocket and/or head. The molded strings can be in the form of individual strings, or fused or combined strings 12C (FIG. 4), or other features of the pocket that resemble strings. The molded strings can form hole units 30 which are positioned and sized strategically throughout the pocket. The molded pocket 10 can include multiple zones Z1-Z4 having molded strings of different cross sections, that is, cross sectional areas when a cross section is taken through the molded strings, around the perimeter of the pocket near the head, on the shooting ramp near the scoop, in the middle portion where a ball is cradled in the pocket, and in the transition between the middle portion and the shooting ramp near the scoop.

Figure 2:
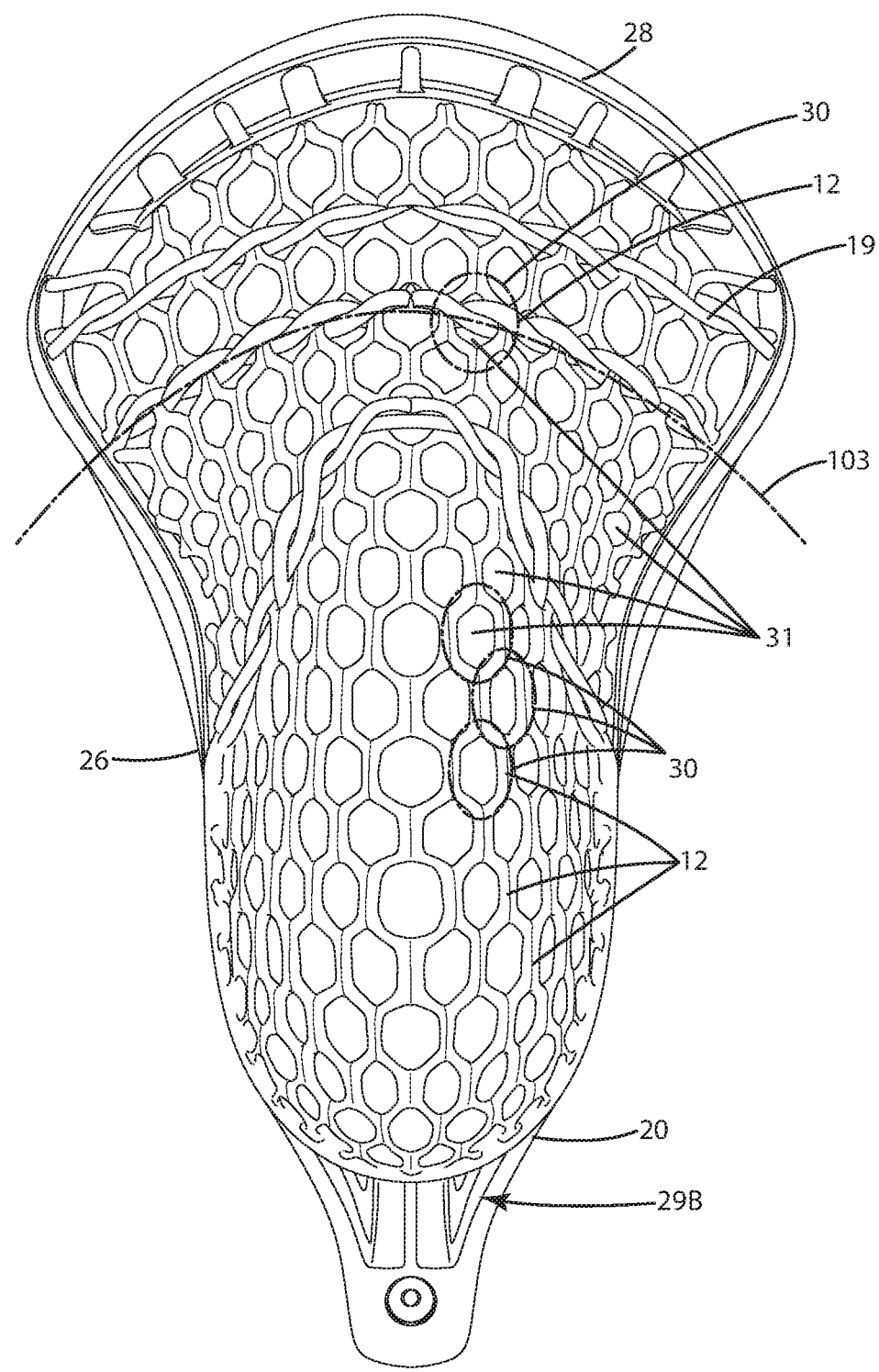
FIG. 2 is bottom view of the lacrosse head and pocket.
Figure 8:
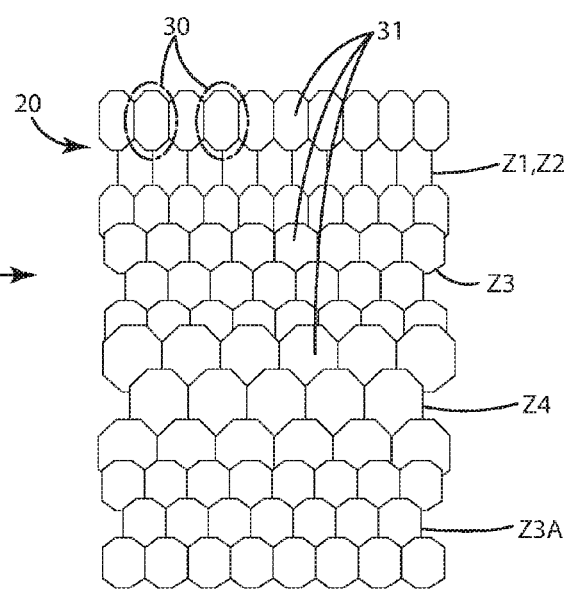
FIG. 8 is a close up view of the pocket illustrating varying hole sizes in the different zones.

The molded pocket 10 can also define holes 31 which are surrounded substantially by the molded strings 12. These molded strings and holes can form hole units 30. As shown in FIGS. 2, 6 and 8, these hole units 30 can vary in number laterally across the lacrosse head 20 from one sidewall 24 to an opposing sidewall 26 of the lacrosse head. The number of holes and holes units can also vary depending on the zones Z1-Z4 within which they are located.

Figure 9:
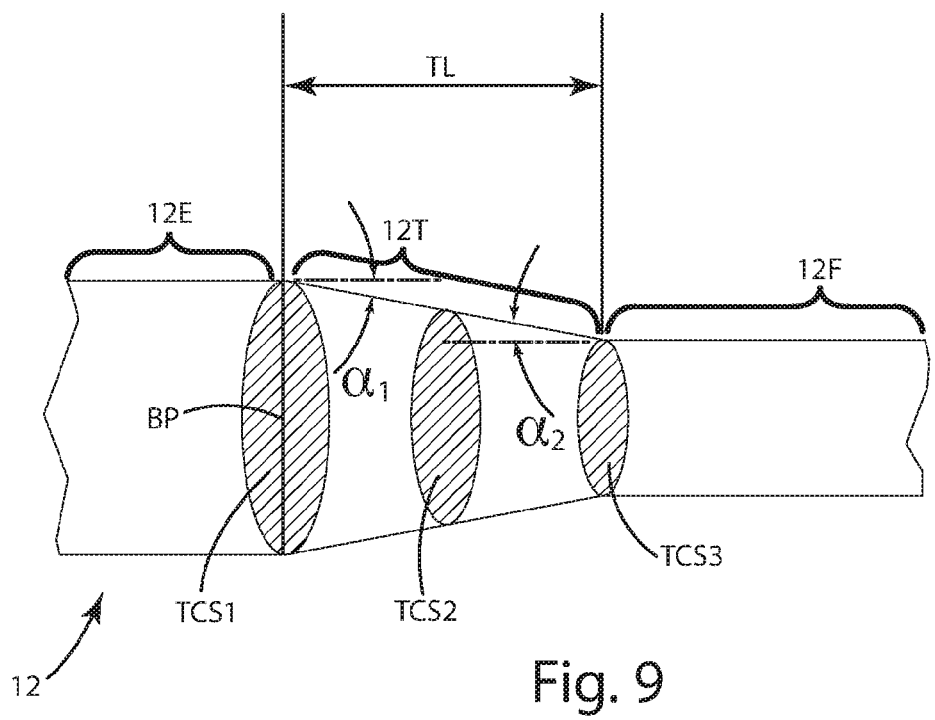
FIG. 9 is a close up side view of a molded string of the pocket having a transition part between first and second parts of different cross sections.
Figure 10:
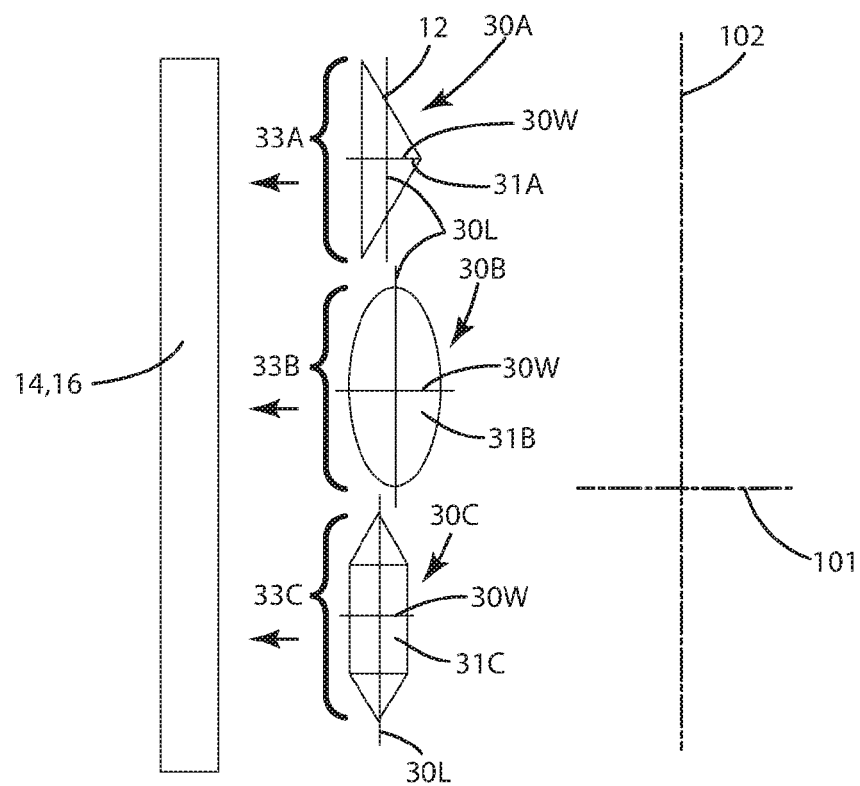
FIG. 10 is a close up view of molded strings surrounding holes to form hole units with opposing broad sides.

As shown in FIG. 10, the pocket can also include hole units 30A-30C having broadsides 33A, 33B and 33C which can be joined with an outer peripheral support rail 14, 16 of the molded pocket 10. With reference to FIG. 9, the molded strings themselves can be constructed to include a transition part 12T between larger and smaller first part 12A and second part 12C of a particular molded string 12. These parts 12A and 12C can be integral with the transition part 12T so that the cross section of the molded string gradually decreases through a total length TL of the transition part 12T, from a first total cross section TCS1 to a second lesser total cross section TCS3 without any abrupt steps, bumps or drop offs.

Figure 13:
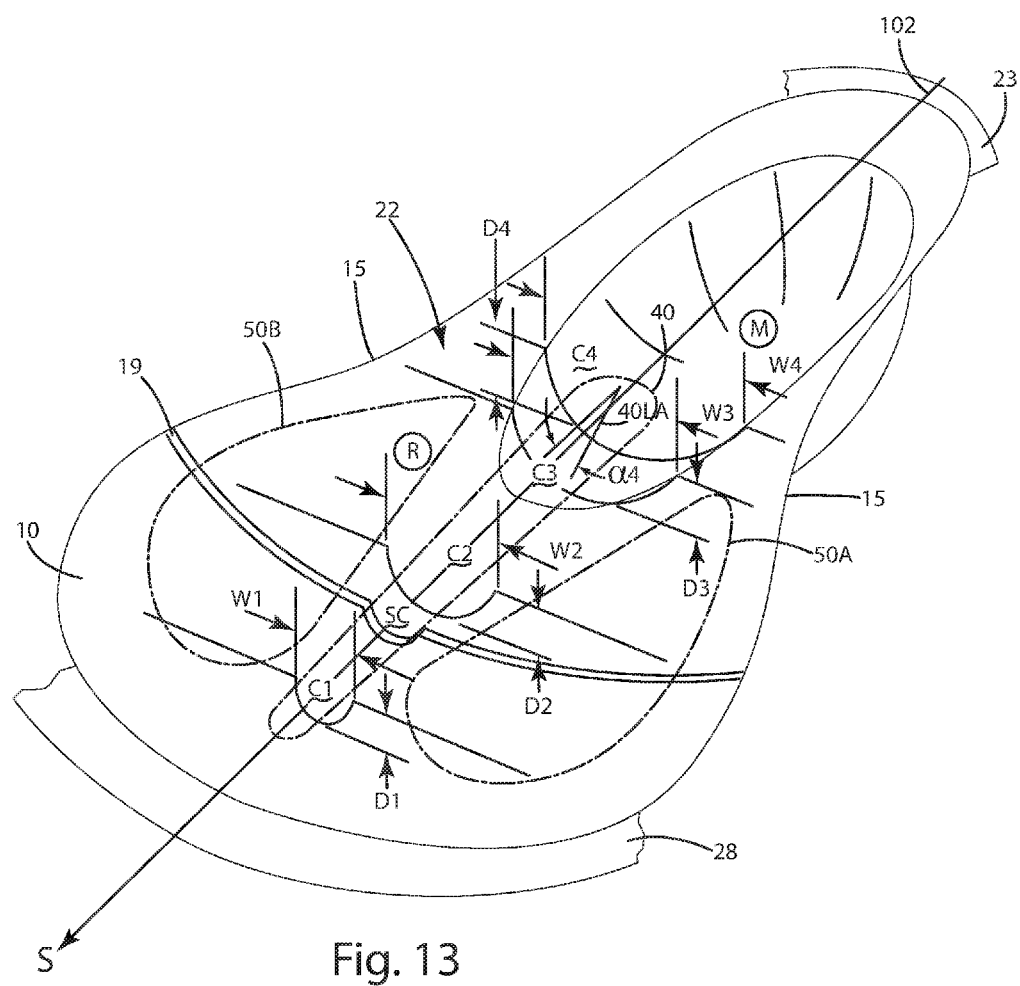
FIG. 13 is a perspective view of the pocket channel of the molded pocket.
Figure 13A:
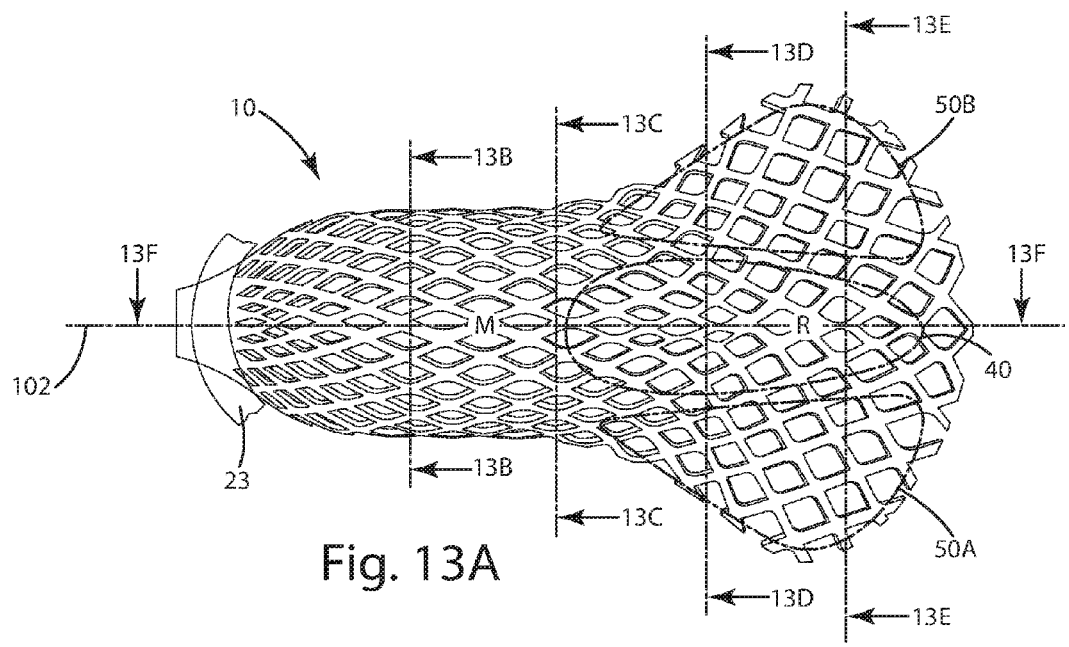
FIG. 13A is a top view of the pocket channel and flanks of the molded pocket.
Figure 17:
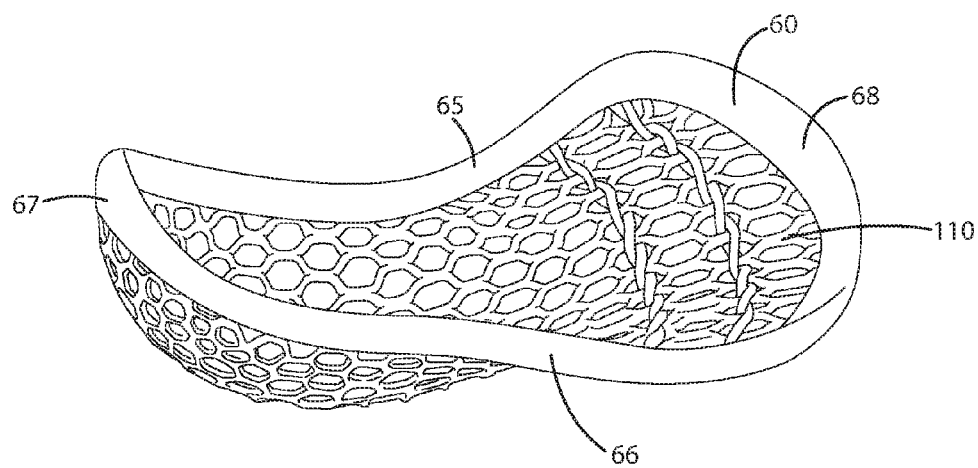
FIG. 17 is a perspective view of the first alternative embodiment of the molded pocket and pocket frame independent of the lacrosse head.
Figure 22:
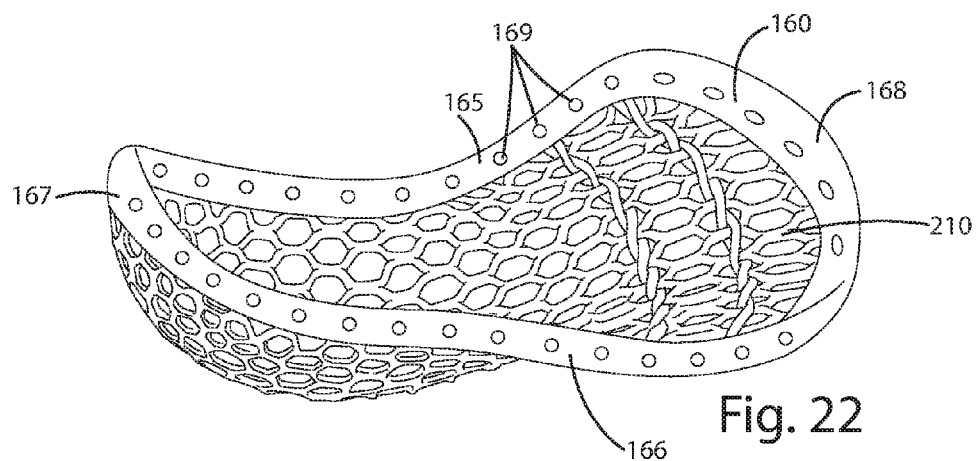
FIG. 22 is a perspective view of the second alternative embodiment of the molded pocket and pocket frame independent of the lacrosse head.

The pocket 10 also can include a shooting channel 40 as shown in FIG. 13 which in integrally molded within the molded pocket 10. A molded pocket or another type of pocket can be joined with a pocket frame 60 as shown in FIG. 17, optionally pre-tensioned and/or preformed to provide a desired pocket profile. The pocket frame 60 can be molded over by a lacrosse head to join to the lacrosse head as shown in FIG. 18, or tied to a particular string ridge as shown in FIG. 20. Another method for molding a frame on a mesh or other synthetic pocket material is shown in FIGS. 26-33. A method for molding the molded pocket 10 to a lacrosse head or frame with a particular mold is shown in FIGS. 34-45.

II. Construction

The various structural components and construction of the current embodiment will now be described. Beginning with FIGS. 1-7, the pocket 10 is joined with the lacrosse head 20, which as shown as a men's lacrosse head. The pocket described herein, however can be readily used on a women's lacrosse head. The lacrosse head 20, and in particular the frame, of the lacrosse head 20, includes a base including a ball stop 23, opposing sidewalls 24 and 26 extending from the base or ball stop, and a scoop 28 connected to the sidewalls. The lacrosse head 20 can include a socket extending rearward from the frame for attachment to a lacrosse handle (not shown). The head 20 can include a front side 29A and a rear side 29B. The head 20 also can define an interior 22 which is bounded generally by the sidewalls 24, 26, ball stop 23 and the scoop 28. In this area, a lacrosse ball (not shown) is usually caught, handled and/or shot from the lacrosse head 20.

Figure 4:
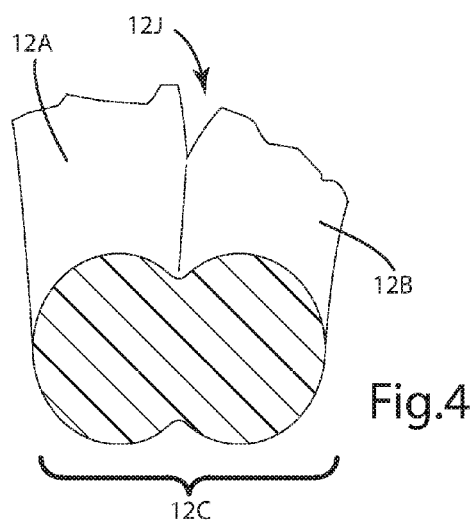
FIG. 4 is a cross section view taken along line 4-4 of FIG. 3.

The molded pocket 10 can include a network of multiple molded strings 12 which extend and connect with one another across the pocket along various lateral 101 and longitudinal 102 axes. These molded strings 102 can be of a rounded or circular cross section in areas where adjacent molded strings do not meet up with one another. For example as shown in FIG. 4, individual molded strings 12A and 12B can merge together and form a single monolithic combined or fused molded string 12C. Optionally, the separate individual molded strings 12A and 12B can converge at a junction 12J at which they form the fused or combined molded string 12C. The cross section of that combined molded string can be monolithically formed and of a generally homogeneous material, for example, the polymeric material from which the molded pocket and individual strings is constructed.

Although shown as being of a generally circular or rounded cross section and configuration, any of the molded strings can be of other geometric cross sections as well. For example, they can be square, rectangular, rounded, triangular, polygonal, elliptical or combinations of the foregoing. As a further example, a molded string of the pocket can be flat on the rear side and rounded on the front side or vice versa. The molded strings also can include a variety of different tapers depending on the particular location within the pocket. Further, the individual molded strings or combined molded strings can include different types of textures or surfaces to enhance ball control and grip.

The molded pocket herein can be constructed from a variety of polymeric materials, which include, but are not limited to, elastomeric materials, such as the thermoplastic polymers, thermoplastic polyurethane, thermoplastic resins, thermoplastic copolyesters, thermoplastic polyamides, polyolefin blends, styrenic block polymers, and elastomeric alloys, as well as rubber, formable but flexible resins, hydrophobic flexible materials, or similar flexible materials, or combinations of the foregoing. Where the material is hydrophobic, the single layer runners and the resulting pocket can be resistant to shrinkage or shape alteration due to moisture, and in many cases changes in ambient temperature. Optionally, the entire structure of the molded pocket is formed from a single, monolithic piece of polymeric material, having different thicknesses and cross section areas of molded strings, rails or other components as desired.

Figure 3:
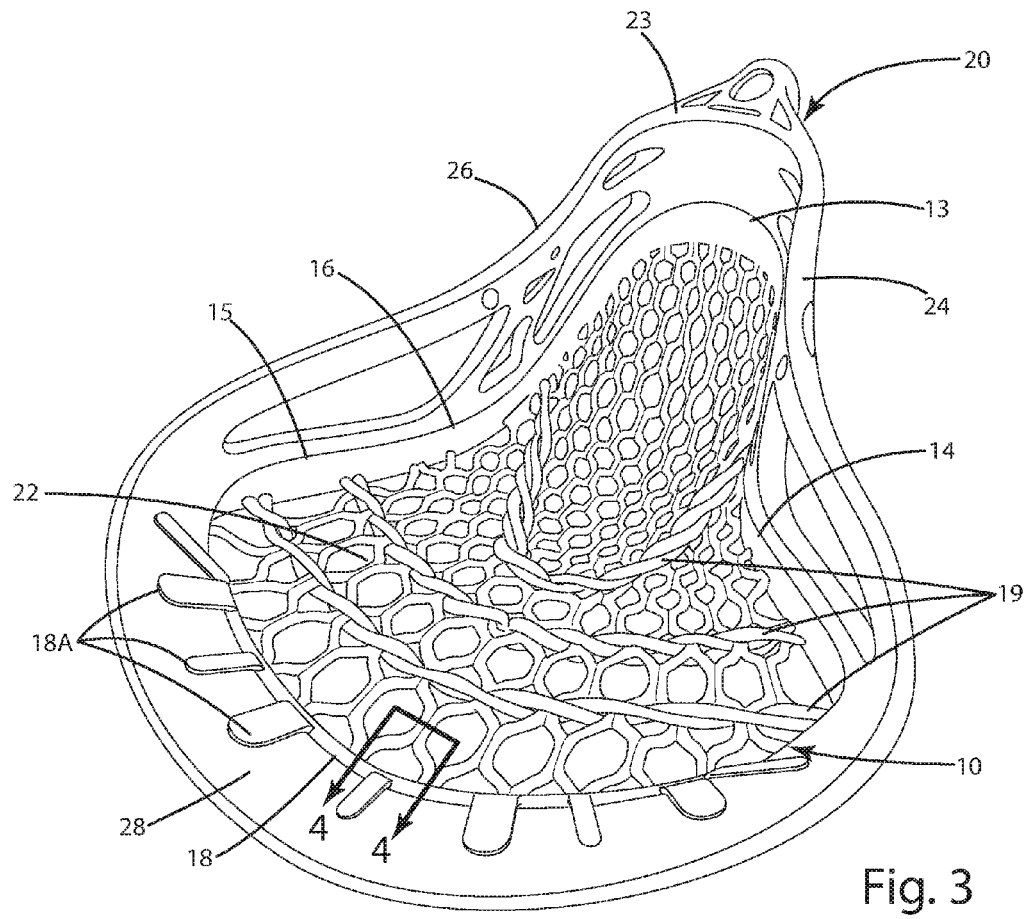
FIG. 3 is front perspective view of the lacrosse head and pocket.

As shown in FIGS. 1-3, the molded strings 12 can also be fused and integrally formed to form a monolithic structure with one or more shooting strings 19. These shooting strings 19, also referred to as shooters, can cooperate with the adjacent molded strings 12 to channel the release of the ball from the molded pocket 10. The shooting strings can have round or flat surfaces, or a combination of round and flat surfaces facing the interior 22 of the head, depending on their location on a shooting ramp of the molded pocket. The shooters 19 also can be twisted in a helical configuration as shown in FIG. 14 or otherwise placed immediately adjacent one another. Optionally, the shooters 19 can be molded directly to the support rails 14 and 16, or the forward support rail 18, forming a monolithic, integral molded part. Alternatively, the shooters 19 can be molded to the bottom rail of the lacrosse head.

The shooters 19 can extend laterally across the lacrosse head generally extending from a first sidewall 24 to a second sidewall 26. The shooters 19 can also be structured to form a rounded or arc, which when viewed from the top of the head 20, form a generally concave structure, travelling from the scoop 28 toward the ball stop 23 along the longitudinal axis 102, or a concave structure going the opposite direction along the longitudinal axis. One or more shooters, whether intertwined with one another, can be spaced from one another approximately ¼ inch to 1¾ inch, ½ inch to 1½ inch, and/or ¾ inch to 1 inch. Other ranges can be selected depending on the particular desired characteristics of the pocket, and the position in which the pocket will be used, for example in an attack position, a midfield position or a defense position. As shown in FIG. 2, some of the shooters 19 can be joined with individual molded strings 12 and extend across a hole unit 30. In doing so, the shooters generally traverse the hole 31 defined by the hole unit 30 by the surrounding individual molded strings 12 as well as the combined strings 12C (FIG. 4). In this manner, each hole unit 30 is structurally rigidly enhanced, so that it is stiffened by way of the shooters. In turn, when the shooters are included in the ramp of the pocket leading from the middle portion of the pocket to the scoop, those elements make the ramp more rigid.

Within the molded pocket 10, the hole units 30 also can be aligned in an arced, rounded and/or parabolic configuration extending laterally from the first sidewall 24 to the second sidewall 26 on the head. Generally, the hole units 30, holes 31 and shooters 19 can be aligned along a curved axis 103 defined in the shooting ramp of the molded pocket.

Optionally, the hole units 30 as shown can be constructed to define holes 31. These holes as shown are in the form of a hexagonal shape. Of course, it is to be appreciated that the shape may vary. For example, the holes can be of an elliptical, circular, triangular, polygonal, octagonal, or other shape depending on the particular application and the zone or portion of the pocket within which the holes are defined and the respective hole units are located.

The molded pocket 10 can include additional components to facilitate attachment of the individual molded strings, the combined strings and/or the shooters to the head 20, and in particular its components such as the sidewalls 24, 26, the ball stop 23 and the scoop 28. For example, the molded pocket can include one or more support rails around all or a portion of its perimeter 15 also referred to as an upper perimeter. As shown in FIG. 3, the molded pocket can include integral sidewall support rails 14 and 16. These sidewall support rails 14 and 16 can be connected to the network of molded strings in the interior space 22 of the head. These rails can be of a generally linear construction following the contour of the lower rail or some other structure of the lacrosse head 20. The support rails 14 and 16 can be of a predetermined height, optionally about 0.5 mm to about 6 mm, further optionally about 0.5 mm to about 4 mm, or even further optionally about 1 mm to about 2 mm to facility connection of the remainder of the molded pocket 10 to the sidewalls. The rails 14 and 16 can also have a predetermined thickness, depending upon the desired flexibility and/or strength characteristics around the perimeter 15 of the molded pocket 10. The predetermined thickness can be optionally about 0.5 mm to about 3 mm, further optionally about 1 mm to about 2 mm, or even further optionally about 1.5 mm.

The sidewall support rails 14 and 16 can be integrally and monolithically molded with the individual strings, combined strings and/or shooting strings, or any other component of the molded pocket and constructed from the same material. Of course, the rails alternatively can be constructed from another material having a different durometer to provide enhanced or different rigidity and strength at the locations where the rails attach the molded pocket to the head.

Returning to FIG. 3, the sidewall support rails 14 and 16 along the sidewalls can join one another via the ball stop support rail 13. The ball stop rail 13 can be of similar dimensions, that is height and thickness, as the sidewall rails. Generally, the sidewall support rails 14 and 16 can form extensions extending forwardly of the ball stop rail 13. The transition between these elements can be seamless, and they can appear as a single continuous rail extending from one sidewall, through the ball stop, to the other sidewall if desired.

Optionally, each of the sidewall rails 14 and 16 and the ball stop rail can be configured to interfit within a shoulder or stringing ridge defined by the bottom edge of the head, generally through the ball stop and sidewalls, as further described below. These rails can be configured to perfectly fill the stringing ridge, so that their outermost surface facing the interior 22 of the head is flush with the interior surface of the sidewalls and ball stop. Of course, if desired, the rails can be offset or not flush with these surfaces, in which case they can be inwardly or outwardly set relative to the respective surfaces of the head facing the interior 22.

The molded pocket can also include a forward scoop support rail 18 that can also be integrally formed and monolithic with the remainder of the molded pocket, including the network of individual strings, combined strings, and/or shooting strings. As shown in FIG. 3, this scoop support rail 18 can be of a smaller dimension than the other support rails 13, 14 and 16. For example, it can be optionally about 0.5 mm to about 3 mm, or further optionally about 1 mm to about 2 mm in thickness and/or height. Although this support rail 18 is shown as discontinuous with the other support rails, it can alternatively be continuous with those rails as desired.

As shown in FIGS. 14 and 15, the scoop support rail 18 can include a connector generally including fingers 18A and 18B which extend forwardly along the scoop 28. These fingers 18A and 18B can extend and can be joined directly to a front surface 28A and a rear surface 28B of the scoop 28. This joining can be accomplished via direct bonding of the material from which the support rail 18 is constructed with the material of the scoop 28. A portion of the scoop 28D can extend through the connector portion. The scoop 28 can also define a net hole 28C. This net hole can be occupied or filled by a transverse connector portion 18C on the connector that extends from the first finger 18A on the forward surface of the scoop to the second finger 18B on the rearward surface of the scoop. Generally, the fingers 18A and 18B can be wider than the dimension of the net hole 28C to provide enhanced connection between the forward support rail 18 and the scoop 28. In some cases, the first finger 18A or the second finger 18B can be eliminated. Optionally, the support rail 18 can be fused directly into a groove defined by the scoop, such as the groove further explained in other embodiments below. Other constructions can be used to connect the various support rails of the molded pocket to the head. Even further optionally, the support rails can be eliminated altogether, and the molded pocket 10 can be joined with a dedicated pocket frame of another material or other support structure to join the molded pocket 10 with the head 20.

Figure 7:
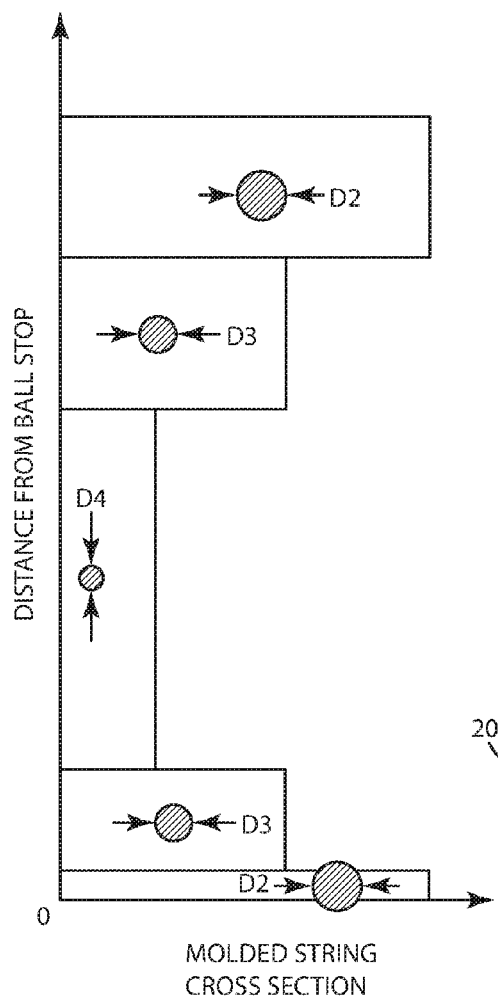
FIG. 7 is a graphical illustration of molded string cross sections within the zones taken along line 7-7 of FIG. 5.

The molded pocket can be divided into different zones as shown in FIGS. 5 and 7. In these different zones, the respective cross sectional areas of the molded strings, for example, the individual molded strings, combined strings and/or shooting strings can vary. For example, as shown in FIGS. 5 and 6, the head can be divided into zones Z1, Z2, Z3 and Z4.

Zone Z1 is a zone that extends around the periphery 15 of the pocket. Where the pocket 10 is a molded pocket, the zone Z1 immediately adjacent the periphery 15 of the interior 22 of the head, generally immediately adjacent the ball stop 23, sidewalls 24 and 26, and the scoop 28 of the head, can be formed from molded strings having a first cross section D2. For example, the individual molded strings can have a first cross section D2 ranging optionally from about 1 mm$^2$ to about 4 mm$^2$, further optionally about 2 mm$^2$ to about 3 mm$^2$, and even further optionally about 1.5 mm$^2$. The particular cross section of the molded strings in this zone can be selected so that around the perimeter, the molded pocket is fairly rigid and inflexible. This can enhance the attachment of the molded pocket around the periphery 15 of the pocket to the head 20. As explained below, the molded strings in this zone can also be constructed and include cross sections that merge and transition well into the support rails in the various regions of the molded pocket, for example the balls stop support rail 13, the sidewall support rails 14 and 16, and the scoop support rail 18. In some cases, however, the molded strings in this zone Z1, particularly near the ball stop and sidewalls, can be replaced entirely by the respective support rails 13, 14 and 16, or portions thereof, if desired.

Zone Z2 of the molded pocket 10 is located immediately adjacent the scoop 28 and extends laterally from one sidewall 14 to the opposing sidewall 16, or generally from a first side of the scoop 28 to a second, opposite side of the scoop 28. This zone Z2 optionally can have molded strings of the first cross section D2, like that described above in connection with zone 1. Of course, zones Z1 and Z2 can have different cross sections as well if desired. For example, where the individual molded strings, shooters or combined strings in zone Z1 connect directly to sidewalls, scoop and/or ball stop of the lacrosse head, those molded strings in zone Z1 can be of a larger cross section than the cross section of the molded strings in zone Z2.

As shown in FIG. 5, the molded pocket can include a third zone Z3 immediately adjacent zone Z2, located generally between zone Z2 and the middle of the pocket zone Z4, where the ball generally comes to rest when head 20 is held in a horizontal position. In that third zone Z3, the molded strings optionally can vary from the first cross section D2 in zones Z1 and Z2. For example, the molded strings in zone Z3 can include a second cross section D3, which can be of a lesser cross section than the first cross section D2 in zones Z1 and Z2. The second cross section D3 can optionally be about 0.5 mm$^2$ to about 2.0 mm$^2$, further optionally about 1 mm$^2$ to about 1.5 mm$^2$, and further optionally about 1.25 mm$^2$, or other areas as desired.

Of course, these cross sectional areas can vary, as can the other cross sections described herein, depending on the desired characteristics of the molded pocket. Further, the order of cross section can be altered depending on the particular play of the head. For example, the zone Z3 can be constructed from molded strings that are actually of a larger cross section the molded strings in zone Z2. Generally, however, the cross sections of molded strings in zone Z4 are less than the cross sections of molded strings in zones Z1, Z2 and Z3 to enhance the cradling capability of the ball and securely hold it or otherwise allow it to nest in the middle of the pocket in zone Z4.

Returning to zone Z3 shown in FIG. 5, that region is generally of an arcuate shape extending laterally from one sidewall 14 toward the other sidewall 16. Generally, the forward portion or edge Z3F of that zone nearest the scoop in the form an arc having a first radius R1. The rearward portion or edge Z3R of that zone Z3 can be in the form of another arc having a radius R2. Radius R1 can be less than radius R2. The difference between radius R1 and R2 can be anywhere from about 1% to 20%, 5% to 15% or about 10% depending on the particular application and the shape of the ball channel as described in further detail below.

The outermost lateral regions Z3B and Z3C of zone Z3 can include molded strings that transition immediately to the molded strings of the first zone Z1. The molded strings generally can increase in cross sectional area as described below. Further, at these lateral transition regions, as well as at the longitudinal transition regions between the forward edge Z3F and zone Z2, the rearward edge Z3R and zone 4, the molded strings, for example, the individual molded strings, shooters or combined strings can form or include a transition part as described below.

Optionally, near the ball stop 23, the molded pocket 10 can include another third zone Z3A which can include molded strings that are of the same or similar second cross section D3 as the region Z3. This zone Z3A can include a rearward portion Z3D and a forward portion Z3E. Both of these portions can be generally arcuate, parabolic and/or rounded. The rearward portion Z3D can transition directly to the zone Z1 around the perimeter of the pocket 10 and/or a support rails in the ball stop and/or sidewalls if included. The forward edge Z3E of the zone Z3A can likewise be of an arcuate, parabolic and/or rounded as well, and generally of a concave shape when transitioning along the longitudinal axis from the scoop 28 toward the ball stop 23. Generally, when referring to zone Z3, this also can refer to zone Z3A.

As described below, in the transition regions between zone Z3 or Z3A to zone Z4, the molded strings can include transitions parts. As shown in FIGS. 5 and 6, the zones Z3 and Z3A can generally connect with one another, generally surrounding zone Z4 if desired. Of course, in other embodiments, zone Z4 alternatively can separate zone Z3 and Z3A completely from one another, with zone Z4 transitioning immediately to the perimeter zone Z1.

Zone Z4 is generally located in the middle of the pocket. The individual shooting strings, combined strings and/or shooters, if any are included in this region, can include cross sections that can be of a third cross section D4 that is less than the molded string second cross section area D3 in zones Z3A and Z3, and also less than the molded string first cross section D2 in zone Z2 and optionally Z1. In zone Z4, for example, the molded strings can have a third cross section area D4 ranging optionally from about 0.25 mm$^2$ to about 2 mm$^2$, further optionally about 0.5 mm$^2$ to about 1 mm$^2$, and even further optionally about 0.75 mm$^2$. The particular cross section of the molded strings in this zone can be selected so that the zone Z4 is generally somewhat flexible and deformable, at least more so than the zones Z3, Z2 and Z1, which are designed to have slightly more rigidity and structural resistance to deformation when a ball contacts those zones. For example, the strings in zone Z4 can be configured so that when a player is cradling a ball in that section, the ball engages the softer, optionally more elastic molded strings in that region to better retain and hold the lacrosse ball within the molded pocket 10.

As shown in FIG. 6, zone Z4 and optionally the zone Z3 can be constructed or configured to provide a particular function. For example, the cross section area of molded strings in zone Z4 can be sized or constructed so that when a lacrosse ball B is cradled in the molded pocket 10 such that centripetal force F1 is exerted on the ball, that zone Z4 and optionally zone Z3 can deform so as to increase the distance of the ball B from bottom 26A of the sidewall 26 to a distance D1, offset from the bottom of the rail 26A. Optionally, due to the cross section area and/or elastic material properties of the molded pocket and its molded strings, the ball B can be held deeper in the pocket, farther away from the bottom rail 26A than with conventional mesh or other nets, when external forces are places on the ball, pocket and/or head.

Further optionally, the molded pocket can be constructed from an elastomeric material that is stretchable when a force is exerted upon it, such as the centripetal force F1, or some other force, so that the molded pocket temporarily and elastically deforms or stretches to provide the desired increased pocket depth D1 as shown in FIG. 6. As an example, when the ball B is in the bottom of the molded pocket in zone Z4, in an uncradled or static position, or when the head 20 is simply horizontal, the very top of the ball B, can be even or slightly above the lowermost plane of the lower rail 26A. Optionally, in this configuration, a viewer of the lacrosse head from a side view cannot see daylight between the top of the ball and the bottom edge or plane of the sidewall. However, when a force F1 is exerted upon the ball, for example by cradling the ball or moving the stick rapidly in a forward motion as shown in FIG. 6, the ball B deforms from the molded pocket profile P1 to the profile P2, and further alters the distance between the bottom edge of the lower rail 26A to a distance which is deeper within the pocket. As an example, the ball can be moved to a distance D1 below the lowermost plane 26P or bottom edge of the lower rail 26A. Thus, the ball B is held deeper within the pocket 10.

In applications where the molded pocket is constructed from elastomeric material, when that elastomeric material stretches upon application of the force and movement of the ball deeper in the pocket, the molded strings in zones Z4 and Z3 can clamp laterally inward on the ball B, generally toward the longitudinal axis of the head. This can provide additional grip to capture and retain the ball in the pocket.

FIG. 7 illustrates cross section areas in one embodiment of the molded pocket 10 shown in FIG. 5 measured in distances from the ball stop 23 toward the scoop 28, generally along the longitudinal axis 102 of the head. As illustrated, the cross section areas of the molded strings, such as the individual strings, combined strings and/or shooters, from the ball stop to the scoop along the longitudinal axis of the molded pocket, decrease from a first cross section area, to a smaller second cross section area, and to an even smaller third cross section. The cross section areas then increase from that third cross section area, to a greater second cross section area, which increases to an even greater first cross section area transitioning from a ball stop to the scoop. Optionally one or more of the different cross section areas can be eliminated.

More particularly, as shown in FIG. 7, the individual molded strings, combined strings and/or shooters have different cross section areas D2, D3 and D4 throughout the respective zones. These cross section areas D2, D3 and D4 are the first, second and third cross section areas mentioned above. As described above, the zone Z1 near the perimeter 15, nearest the ball stop 23, is generally of the first cross section area D2. This cross section area transitions to a lesser second cross section area D3, which further transitions to an even lesser third cross section area D4 corresponding to zone Z4. Proceeding farther toward the scoop along the longitudinal axis 102 of the head, the molded pocket transitions from zone Z4 to zone Z3, and in turn the cross section area transitions from third cross section area D4 to the second cross section area D3 mentioned above. In proceeding farther toward the scoop, in the shooting ramp, the zone Z3 transitions to zone Z2, and the cross section areas can transition from the second cross section area D3 to a greater first cross section area D2 mentioned above.

To achieve the particular functional attributes noted above, for example the flexibility in the middle of the pocket or rigidity around the perimeter or in the shooting ramp, the molded strings can be of the different cross sections in the different zones Z1, Z2, Z3 and Z4 or other zones of the head. Of course, additional or fewer zones can be included in the molded pocket 20. Optionally, however, to provide the different functional attributes in the different zones, instead of or in addition to varying the cross section areas, the durometer of the materials from which the molded pocket and molded strings are constructed can vary.

For example in zone Z4, the molded strings can be constructed from an elastomeric and/or polymeric material having a durometer ranging from optionally about 1 to 50 on Rockwell C, further optionally about 5 to 35 on Rockwell C, and even further optionally about 10 to 25 on Rockwell C. In zone Z3, leading from the middle portion of the pocket to zone Z2 near the scoop, the molded strings can be constructed from an elastomeric and/or polymeric material having a durometer ranging from about optionally about 30 to 70 on Rockwell C, further optionally about 40 to 60 on Rockwell C, and even further optionally about 45 to 50 on Rockwell C. In zone Z2 nearest the scoop, and zone Z1 around the perimeter, the molded strings can be constructed from an elastomeric and/or polymeric material having a durometer ranging from about optionally about 50 to 90 on Rockwell C, further optionally about 60 to 80 on Rockwell C, and even further optionally about 70 on Rockwell C. Of course, the aforementioned material properties, and in particular the durometers or hardnesses of the molded pocket and its components can vary in different zones or regions, other than those specifically illustrated in FIG. 5.

Optionally, the dimensions, shapes and/or number of the holes 31 and/or hole units 30 also can vary to provide the desired functional attributes of the molded pocket throughout the different zones Z1, Z2, Z3 and Z4, or different regions of the pocket. For example as shown in FIG. 8, the molded pocket can have hole units 30 having respective holes 31 that can vary in the different zones Z1, Z2, Z3 and Z4. In the first and second zones Z1 and Z2, in the upper part of the pocket near the scoop and/or around the perimeter 15, the pocket holes can be made up of holes of a first dimension. Other holes in the third zone Z3, transitioning from zones Z1 and/or Z2 to the zone Z4 can be of a second dimension that is greater than the first dimension. In the zone Z4, generally in the middle of the pocket, the holes can have a third dimension that is greater than the first and second dimensions.

In zone Z2, the pocket holes 30 and/or hole units 31 can number such that there are 8, 10, 12, 14, 16, 18 or 20 of them laterally from one sidewall 24 to the other sidewall 26. In zone Z3, the pocket holes 30 and/or hole units 31 can number such that there are 6, 8, 10, 12, 14 or 16 of them laterally from one sidewall to the other sidewall. In zone Z4 the pocket holes 30 and/or hole units 31 can number such that there are 4, 6, 8, or 10 of them laterally from one sidewall to the other sidewall. Further optionally in the zone Z3, there optionally can be 6, 10, or further optionally 8, holes or hole units laterally from one sidewall to the other. In the zone Z4, there optionally can be 4, 8 or further optionally 6 holes or hole units laterally from one sidewall to the other. The above number of holes can vary depending on the desired functional attributes of the pocket and/or player position. In some cases, the number of hole units and/or holes can be consistent and the same in all the different zones, and can have a generally uniform dimension across all the zones if desired.

As mentioned above, the molded strings can have varying cross section areas, where one part of the string transitions to another part of the string having a different cross section area. For example, turning to FIG. 9, an individual molded string 12, or any of the combined strings 12C (FIG. 4) or the shooters 19 (FIG. 1) can be constructed to include transition parts. The molded string 12 can include a first part 12E, a transition part 12T and a second part 12F. The transition part 12T can be located directly between the first and second parts, and can provide a smooth, tapered transition between the first part 12E and the second part 12F of the molded string. Again, although described in connection with the molded individual strings, this transition part can be incorporated into any of the combined strings 12C, shooters 19 or other components of the molded pocket, such as the rails.

The first part of the molded string 12E can be constructed to include a total cross section area TCS1. The second part 12F can include a total cross section area TCS3. The total cross section area TCS1 can be greater than the total cross section area TCS3 or vice versa. For example, the total cross section area TCS1 in FIG. 9 can be about 5%, 10%, 15%, 25%, 30%, 50%, 75%, 100% or greater in area than the total cross section area TCS3. Of course, the parts can be reversed, with the sizes reversed.

The overall geometric shapes of the respective cross section areas in parts 12E and 12F can be the same or they can be different. For example, the first part 12E can have a large circular or rounded cross section area TCS1 and the cross section area TCS3 of the second part 12F can be of a like or similar cross section. Alternatively, the first cross section area TCS1 can be square and the second cross section area TCS3 can be round or oval. The different cross sections can be mixed and matched, depending on the particular application and desired contact between the molded strings and the lacrosse ball within the molded pocket.

As shown in FIG. 9, the transition part 12T enables a smooth transition between the different cross section areas from the parts 12E and 12F within the molded string. The cross section area of the transition part 12T can include one or more total cross section areas TCS2. The cross section area TCS2 can be a combination of multiple different varying cross section areas TCS2 ranging from a size almost the same as, or the same as, TCS3 in the second part to the size TCS1 in the first part. The total cross section areas TCS2 in the transition part 12T can vary along the transition length TL. This transition length TL can be optionally about 0.1 mm to about 50 mm, 1 mm to about 25 mm, 2 mm to about 15 mm, 3 mm to about 8 millimeters, about 5 mm, or other lengths depending on the particular application and the abruptness of the change in cross section area between the first and second parts 12E and 12F.

Optionally, the transition part 12T can have a cross section area of the same shape, or a different shape, as the cross section areas of the first and second parts. For example, the first part 12E can have a cross section area TCS1 of a circular shape, the transition part 12T can have a cross section area TCS2 of an oval shape, and the second part 12F can have a cross section area TCS3 of a round or square shape. The geometric shapes and the cross section areas throughout the first part, second part and transition part can vary, again depending on the desired properties of the string.

Generally, the transition part 12T can have a frustoconical shape when viewed from a top or side view as shown in FIG. 9, particularly where the first and second parts of the molded string have a rounded or circular cross section area. Other tapered shapes, diminishing in total cross sectional area from the first part to the second part can be selected for the transition part 12T. Generally the cross section TCS2 of the transition part 12T can vary by at least about 1% to about 200%, 20% to 100%, 50% to 100%, 75% to 100%, or other amounts, from one end adjacent the first part 12E to the other end adjacent the second part 12F.

The transition part 12T can be implemented with the molded strings or components of the molded pocket to provide a smooth transition between first and second parts of the pocket of varying cross sections. The transition part 12T generally provides a non-abrupt, non-stepped transition between different parts so that a ball within a lacrosse pocket can smoothly roll across the molded string surfaces facing toward the interior of the pocket. Of course, in certain applications, integral steps or abrupt transitions can be integrated into the transition part 12T between different first and second parts as desired.

Referring to FIGS. 5 and 9, the particular transition part 12T can be implemented in transition regions between the different zones, for example between adjacent ones of the zones Z1, Z2, Z3 and Z4. Where it is desired to include different cross sections within the particular zones themselves, the transition parts 12T can be implemented in those different portions of the zones as well.

FIG. 9 also shows details of the parts transitioning to the transition part 12T. For example, the first part 12E transitions to the transition part 12T at a first angle α1. The second part 12F can transition to the transition part 12T at a second angle α2. These angles α1 and α2 are measured relative to the outer surfaces of the respective first part, transition part and second part that lie within a bisecting plane BP that generally bisects the respective first part, second part and transition part. Generally, these angles α1 and α2 can be optionally less that about 90°, further optionally about less than 60°, even further optionally less than 45°, yet even further optionally less than 30°, and still yet even further optionally less than 20°. Of course, although shown as transitioning at angles, the first and second parts can transition to the transition part in regions where the outer surfaces of the molded string are rounded, curved or of an arcuate shape, rather than of an angled shape within the bisecting plane BP. The particular transitions can vary depending on the construction of the mold with which the string 12 is constructed.

Figure 11:
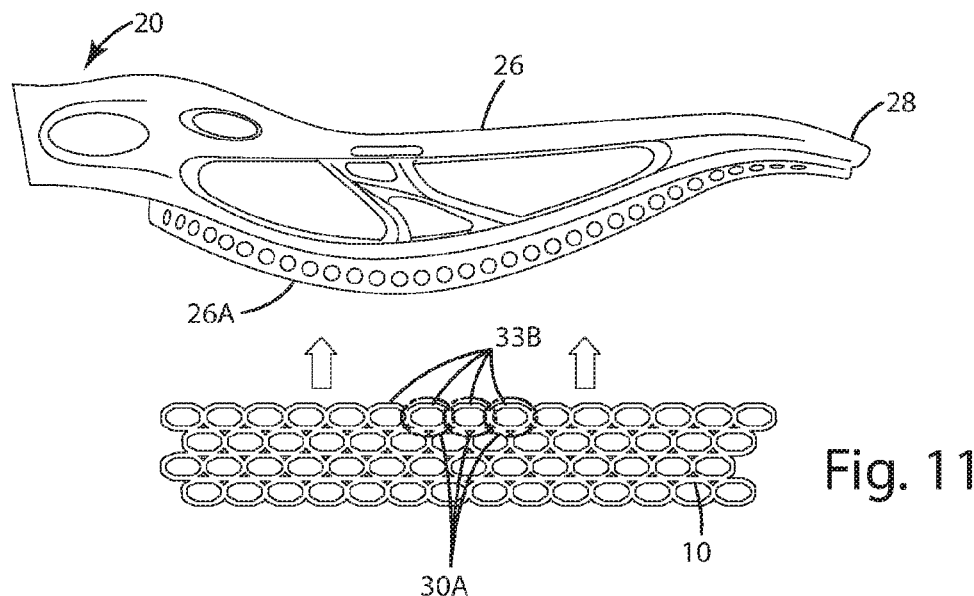
FIG. 11 is a side view of the broad sides of the hole units in the pocket being joined with a head.

With reference to FIGS. 10 and 11, the molded pocket described herein can include pocket holes that are longer in a pocket hole length dimension than a pocket hole width dimension. For example as shown in FIG. 10, the molded pocket can include molded strings that form hole units 30A, 30B or 30C. These different hole units define holes 31A, 31B and 31C which generally are of different geometric shapes. For example, hole 31A is of a triangular shape, hole 31B is of an oval shape, and hole 31C is of a polygonal shape. Different shapes other than those shown can be implemented in the holes and hole units as desired.

Generally, the different hole units 30A, 30B and 30C include broadsides 33A, 33B and 33C that are configured for attachment to the support rails 13, 14, 16 and/or 18 or other components of the pocket that connect directly or indirectly to the head 10. Alternatively, these broadsides 33A, 33B and 33C can connect directly to the lacrosse head itself in certain constructions, or to strings or laces that are strung to the head, or to a pocket frame as described below.

The hole units 30A, 30B and 30C are constructed so that the longitudinal dimensions 30L are greater than the lateral width dimensions 30W of each of the respective holes 31A, 31B and 31C and/or hole units 30A, 30B and 30C. These widths and lengths are generally aligned with and/or parallel to the lateral axis 101 and longitudinal axis 102 (FIG. 1) respectively of the lacrosse head and/or molded pocket. The respective hole units 30A, 30B and 30C include a broadside 33A, 33B and 33C that are longer than, or of a greater dimension than, the widths 30W of the holes and/or hole units. This can increases the overall attachment surface area of the hole units and the corresponding molded pocket to whatever structure those hole units are attached, for example the support rails 13, 14 16 and/or 18, the head directly, or a pocket frame as described below.

The lengths 30L and widths 30W of the hole units can be measured from the innermost perimeter of holes 31A-31C of the hole units. The precise ratio of the length to the width for the broadside hole units can vary depending on the particular application. For example as shown in FIG. 10, the length 30L of the units can be 1, 2, 3, 4, 5, 10, 15 or 20 times greater than the width 30W of the hole units.

With regard to hole units 30A, 30B and 30C positioned near the perimeter 15 of the pocket 10, the broadsides of those perimeter hole units optionally can be positioned so that the associated individual molded strings, combined strings and/or shooters are immediately adjacent a support rail of the pocket, a lateral side of the frame to which the pocket is joined, a lower sidewall rail of the lacrosse head, and/or the scoop. Perimeter hole units having this broadside construction can be attached to structural portions of the molded pocket and/or the head in a consistent strength enhancing manner. This can reduce and/or eliminate tearing of the molded pocket adjacent the support rail and/or head component. In some cases, this type of broadside attachment also can enhance the elasticity of the molded pocket, and in particular the hole units, in these regions. In turn, this can provide enhanced flexibility and/or rigidity, depending on the particular construction in these locations. Further, when coupled the increased cross section area of molded strings, the use of broadsides in hole units can enhance the rigidity and strength of the molded pocket near the perimeter.

FIG. 11 illustrates the broadsides 33B of the units 30B configured to attach to a lower rail 26A on the sidewall 26 of the head 20. Again, with the broadsides attached to the rail or some intermediate support rail 14, 16 (FIG. 10), the pocket 10 can be more securely attached to the head 20.

Optionally, the hole units 30A, 30B and 30C shown in FIG. 10 can be configured so that along their broadsides, for example 33A, 33B and 33C, the hole units are bounded by an individual molded string or a molded combined string. For example, referring to hole unit 30B, along the upper and lower curved portions of the hole unit, that unit can be bounded by individual molded strings. Along the left and right broad sides of the hole unit, the unit can be bounded by combined strings. In this manner, the broadside of the hole unit can have an effective greater cross section are in some cases, than the upper and lower portions of the hole unit.

Figure 12:
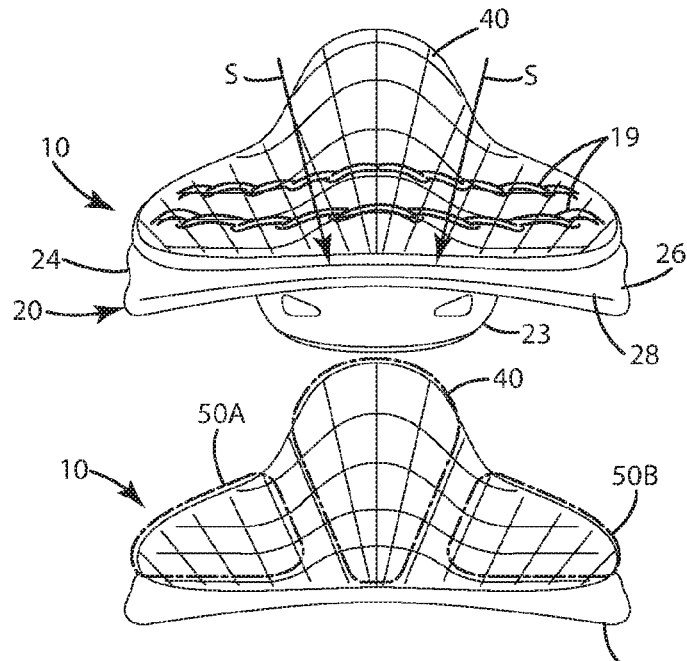
FIG. 12 is a front scoop view of a pocket channel defined in a molded pocket.

As shown in FIGS. 12-13, the molded pocket 10 can also define a shooting channel 40 to ensure a consistent launch and exit of a lacrosse ball from the head 20. This ball channel 40 can be specifically configured depending on the position of the player using the head. For example, the ball channel can vary for players using a head in an attack position, a midfield position, or a defense position, as explained further below in detail.

Generally, the ball channel 40 can be implemented in the molded pocket 10 so that it extends from the middle portion M of the molded pocket 10, through the ramp R, toward the scoop 28. The particular locations of the middle portion of the pocket M and the ramp R can vary depending on the particular construction of the molded pocket. Optionally, the middle portion M can be at and/or near the part of the pocket at which an apex AP (FIG. 13F) is found. The apex can be the part of the pocket that is the greatest distance from the head, and/or generally the lowermost part of the pocket. The molded pocket 40 can be bounded on opposing sides by generally flat, planar portions or flanks, 50A and 50B of the pocket. These flanks 50A and 50B are generally disposed on opposing sides of the ball channel 40 as it extends from the middle of the pocket M toward the scoop. The flanks can extend laterally outward from the ball channel 40 to the sidewall or sides of the scoop, generally filling the space between those features and the ball channel in the interior of the head.

Although shown as generally being separated along the entire longitudinally axis 102 from one another by the ball channel 40, the flanks 50A and 50B can join one another, forward of the ball channel 40 near the scoop 28. The flanks also can extend through the ramp leading from the middle of a pocket M toward the scoop. The flanks can terminate adjacent the middle portion of the pocket M, which can correspond to the zone Z4 shown in FIG. 5. Further, the flanks 50A and 50B can be disposed in zone Z3 and Z2 as shown in FIG. 5.

The flanks can be generally flat and planar as shown, or can include a slight or significant curvature extending from the channel 40 to the perimeter 15 of the molded pocket on opposing sides, near the sidewalls 14 and 16 of the head 20. Optionally, the flanks can be concave upwardly or convex upwardly, into the interior 22 of the head 20. The flanks, along with the ball channel, can all be constructed as integral parts of the molded pocket 10, including any of the features explained in the embodiments herein. For example, the network of molded strings 12 and any associated shooting strings or other parts can be monolithically and integrally formed with one another from a polymeric material to form a single piece unit, spanning across the flanks and ball channel, as well as the ramp and middle portion of the pocket.

Optionally, where the flanks, ball channel, middle portion of the pocket and ramp are all part of the molded pocket, and the pocket is constructed from an elastomeric material, these components can remain in a somewhat fixed, static configuration, in which they are all consistently and semi-rigidly held in a desired spatial configuration. However, given the elastic and stretching properties of the elastomeric material, these components can flex or stretch out of the static configuration to a dynamic configuration, and then return to the static configuration after a particular head manipulation is performed. For example, when a lacrosse ball is shot out the ball channel 40 from the middle portion of the pocket M along the ramp R, all of these components can flex or stretch, and more particularly, the molded strings and shooters of these components can elongate, stretch, compress or otherwise deform. When this occurs, the channel and flanks, and ramp and/or middle of the pocket can change their spatial orientation from one another, in some cases, changing temporarily the angles of these components relative to one another, the dimensions of the respective components, and the general distances between the components and/or the sidewall, scoop and/or base of the head.

The flanks can include portions of the shooters 19 if desired. The shooters 19 can extend through the first flank 50A, the ball channel 40, and out toward the opposing sidewall along the flank 50B. The shooters 19 themselves can be depressed, recessed or warped generally along their central region near the longitudinal axis 102, and can extend downwardly into the ball channel 40, as described below.

Returning to FIGS. 12 and 13, the ball channel 40 can be configured to channel the ball and the direction of the shooting arrows S so that the ball cleanly and consistently exits the middle portion of the pocket M along the longitudinal axis 102, or some other predefined axis, depending on the particular lacrosse pocket. To facilitate this consistency, the ball channel 40 can be in the form of a recess, groove, or channel having predefined geometric shape and dimensions. As shown in FIG. 13, the shape is generally of a U or V shape or sideways C shape. Of course, the shape can vary to include other geometric shapes. Further, although extending from the middle portion M of the pocket toward the scoop 28, the ball channel 40 can extend along any portion of the pocket from the ball stop 23 to the scoop 28.

The ball channel 40 can be centered on the longitudinal axis 102 of the head. In some cases, however, the ball channel 40 can be offset laterally toward one sidewall 14 or the other sidewall 16. The offset angle of approach toward the scoop can vary from being parallel with the longitudinal axis 102. For example, the ball channel can have an axis 40LA that is offset at some angle $\alpha 4$ from the longitudinal axis 102. This angle $\alpha 4$ can be about 1°, 5°, 10°, 15°, 20° or other angles as desired. Further, it can be offset either direction, laterally of the longitudinal axis 102.

As shown in FIG. 13, the ball channel 40 is illustrated with an upwardly concave contour along its length. For example, it is illustrated with the contour C1, contour C2, contour C3 and contour C4, which generally are ordered from the scoop 28 toward the ball stop 23. Although only described herein in connection with four contours, there may be an infinite number of contours along the ball channel 40.

Generally the ball channel 40 can be contoured so that the contours C1-C4 are of a decreasing depth D1-D4, and increasing width W1-W4. As illustrated, these contours are generally of a U, V, sideways C shape, or parabolic shape, concave upwardly toward the upper side of the lacrosse head. The contours can include maximum depths and maximum widths. Measured from the interior 22 of the head, the depths generally extend from the upper surface of the molded pocket immediately adjacent the contours, downward to the lowermost portion of the contours. The depths also can vary increasingly from near the scoop 28 toward the ball stop 23 or the middle of pocket M.

For example, the contours C1, C2, C3 and C4 can be of an increasing depth from the scoop to the middle M of the pocket. The variance in the depths of the ball channel 40 along the contours can be such that depth D4 of contour C4 is optionally about 1, 2, 3, 4, 5, 10, 15, 20, or 25 times greater than depth D1 of contour C1. The depths D1-D4 can also vary depending on the position of the player using the molded pocket, and/or depending on the desired location of the apex AP of the pocket, that is, the deepest part of the molded pocket from scoop 28 to base 23. For example, the apex can be located high near the scoop, in the middle about midway between the scoop and the ball stop, or low, that is, near the ball stop of the head. Depending on the locations of the apex, the depths D1-D4 can vary, and optionally all can generally increase from the scoop toward the apex of the pocket and/or the middle portion M of the pocket.

The contours C1-C4 of the ball channel can include widths W1-W4 that vary from the scoop toward the apex of the pocket and/or the middle M of the pocket, generally in an increasing manner. The variance between the width W1 of the contour C1 relative to that of the width W4 at contour C4 can be such that width W4 is optionally about 1, 2, 3, 4, 5, 10, 15, 20, or 25 times greater than width W1 at contour C1. Optionally, widths W1-W4 can generally increase from the scoop toward the apex of the pocket and/or the middle M of the pocket. Further optionally, the contours can be configured so that the contours near the middle portion of the pocket have a first width, and the contours near the scoop have a second width that is at least one of less than, greater than, and/or the same as the first width.

Referring to FIG. 13, the shooters 19 can traverse the pocket 10, generally from the first side of the perimeter 15 across to the other side perimeter 15 on the opposite of the longitudinal axis 102. In traversing the pocket 10, the shooting string can generally be of a planar or slightly concave upward formation, across the flank 50B, as well as the opposing flank 50A. The shooting string 19 also can dip downward to form a shooting contour SC corresponding to the ball channel 40. This shooting contour SC can be of the same geometric shape, for example, concave upwardly toward the upper surface of the molded pocket within the ball channel 40. The shooter contour SC generally can be of the U, V, or sideways C shape, or a parabolic shape similar to that of any of the other contours C1-C4. It can also include the widths and depths of the contours in the immediately adjacent area and/or variations of the same depending on its particular location within the shooting ramp of the pocket.

Figures 13B, 13C:
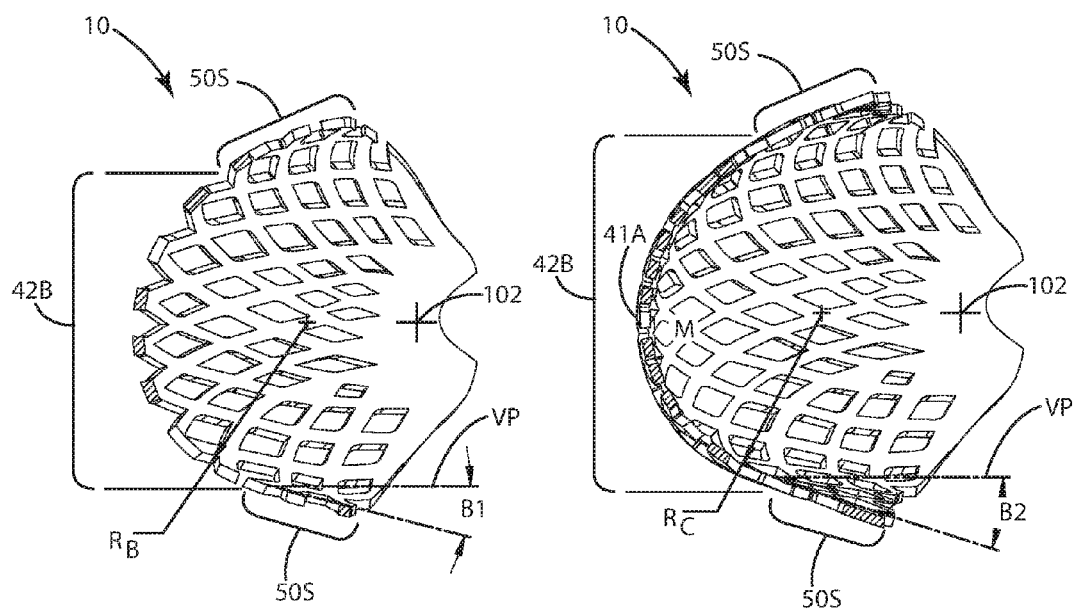
FIG. 13B is a cross section view of the middle portion of the molded pocket taken along lines 13B-13B of FIG. 13A.
FIG. 13C is a cross section view of the middle portion of the molded pocket taken along lines 13C-13C of FIG. 13A.
Figure 13D:
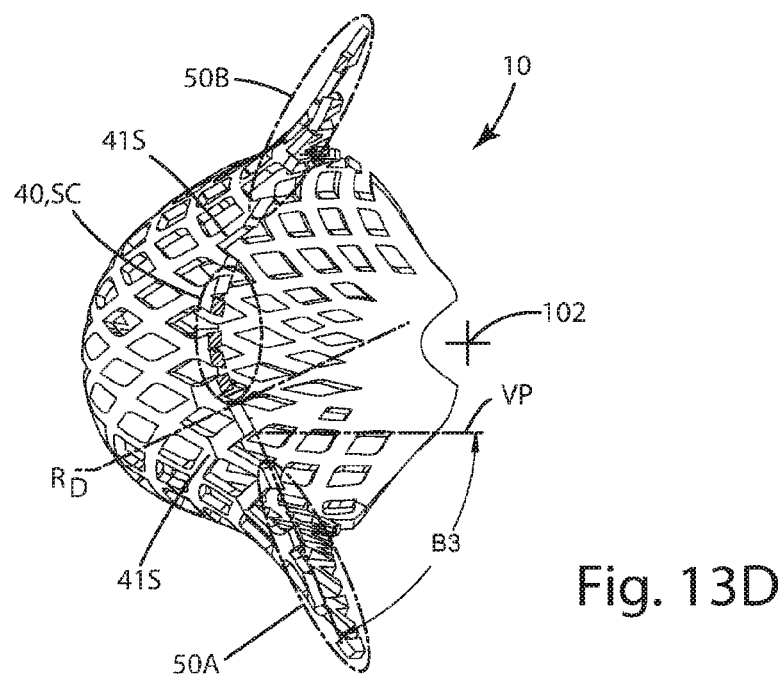
FIG. 13D is a cross section view of the pocket channel of the molded pocket taken along lines 13D-13D of FIG. 13A.
Figure 13E:
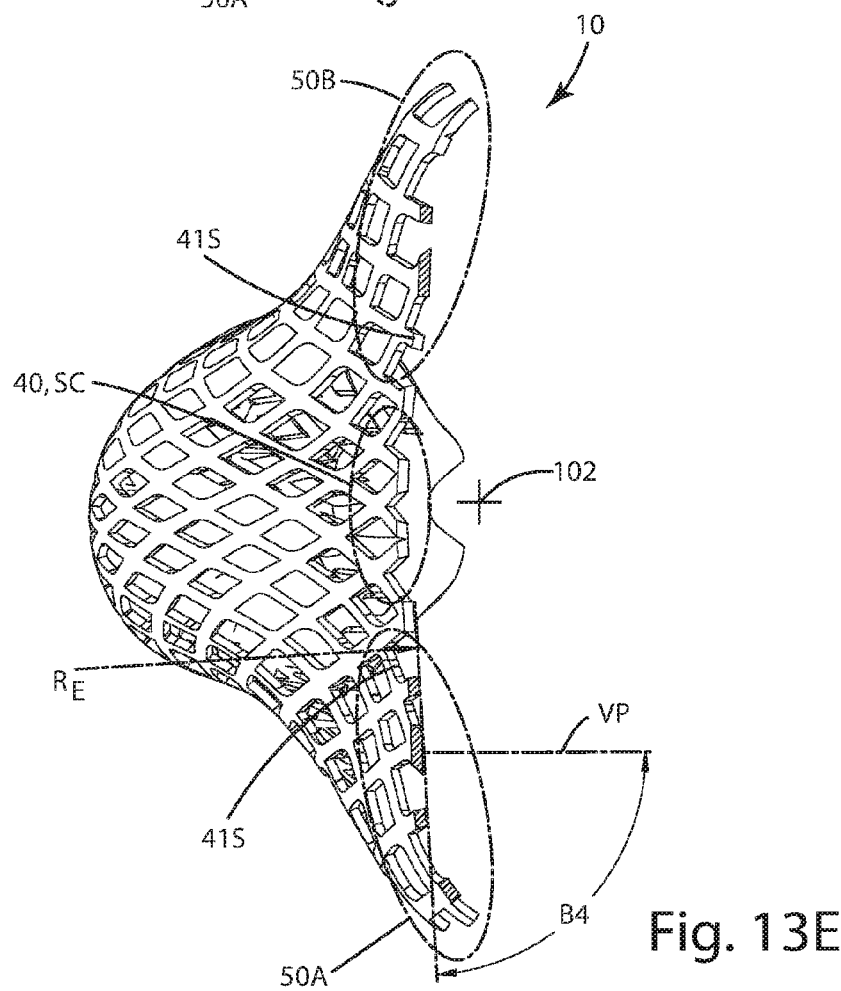
FIG. 13E is a cross section view of the pocket channel of the molded pocket taken along lines 13E-13E of FIG. 13A.

Optionally, as shown in FIGS. 13D and 13E, ball channel 40 and/or the concave shooting contour SC can merge or transition into the flanks on opposing sides of the channel. In this transition, the generally concave ball channel or shooting contour (when viewed from the front of the head) can transition at shoulders 41S to the flanks. The shoulders can be subtle, and generally in the form of a large radius transition that joins the flanks at their innermost parts with the ball channel. In the shoulders 41S, the molded strings and shooters can be permanently formed and molded in a rounded or angled configuration to provide the transition. Of course, where the molded pocket and these components are constructed from an elastomeric material, they can elastically deform from the rounded or angled configuration and snap back to their original configuration after a relevant force is removed.

As mentioned above, the shooting strings 19 can traverse the hole units 30 in the molded pocket 10. Accordingly, in some cases, where the shooting strings 19 traverse hole units within the ball channel 40, the combined shooting strings and hole units, and corresponding individual strings or combined strings, can also be incorporated into a monolithic structure having the shooting contour SC.

Optionally, the shooting contour SC, or any other contour C1-C4 for that matter, can be shaped so that the components of the pocket on opposite sides of the longitudinal axis 102 are identical and symmetrically located about the axis to impart consistent spin and/or forces on a lacrosse ball contacting the components on opposite sides of longitudinal axis 102 as that lacrosse ball traverses along the ball channel 40. For example, if there is a hole unit disposed in the shooting contour SC or any of the other contours C1-C4, that hole unit can be positioned so that it is symmetric across the longitudinal axis 102. Alternatively, the first and second hole units can be positioned immediately adjacent one another, but on opposite sides of the longitudinal axis 102. In this manner, the longitudinal axis 102 generally dissects the individual molded string or the combined string along the axis 102.

Figure 12A:
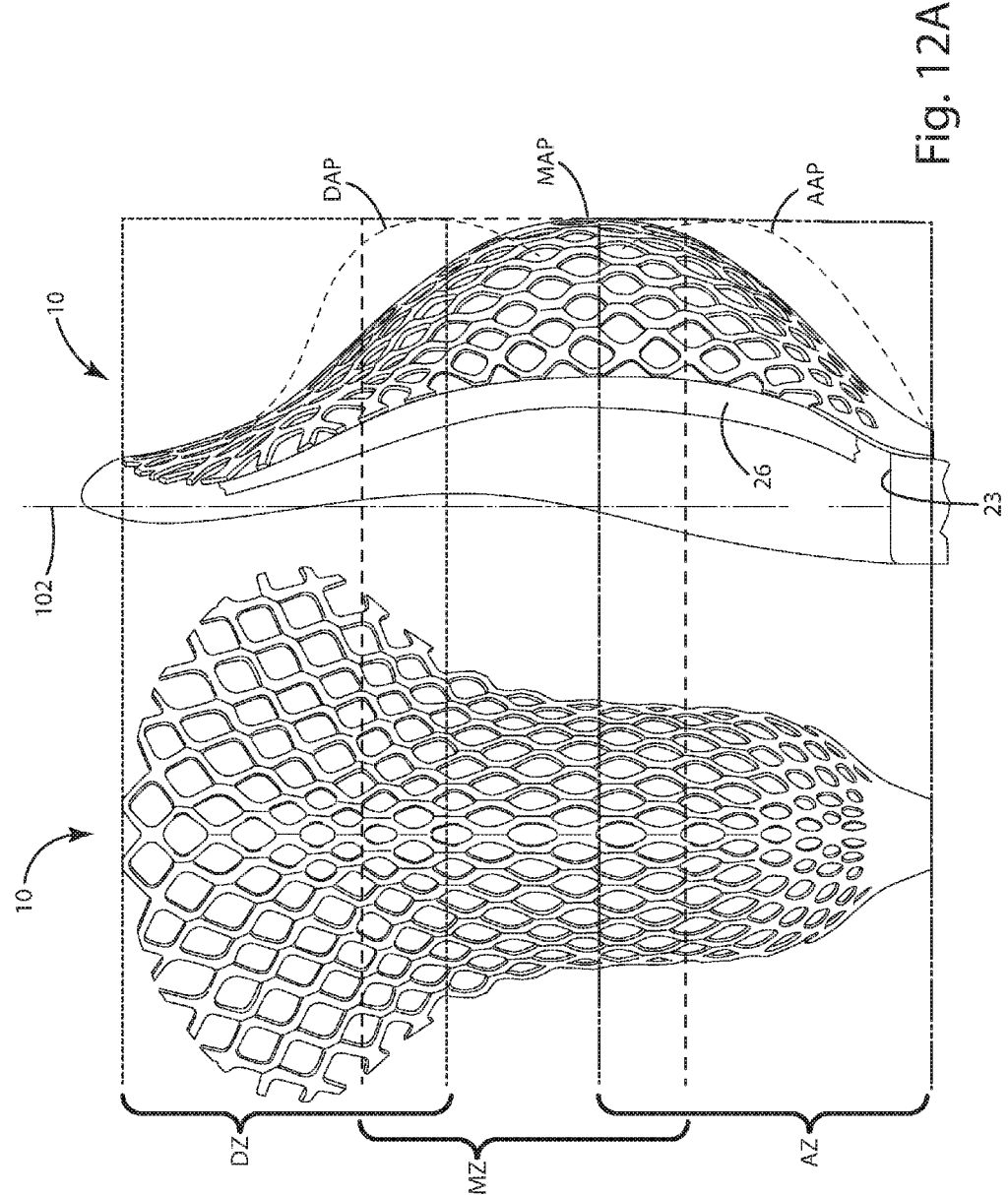
FIG. 12A is a top view of the molded pocket illustrating different zones within which to locate a pocket apex for attack, midfield and defense lacrosse heads.

As mentioned above, the ball channel and location of the apex, or corresponding deepest depth of the pocket, can vary for players using a head in an attack position, a midfield position, or a defense position. For use in an attack position, the ball channel 40 can be relatively well defined, having a lower (toward and the ball stop) pocket apex with a long center channel length (a long ramp). The ball channel 40 also can be "deeper" from the middle M of the pocket, where the ball is typically cradled or held, through the ramp R and out toward the scoop 28 of the head. As an example, with reference to FIG. 12A, the molded pocket 10 can be configured to include multiple zones, that is, an attack zone AZ, a midfield zone MZ and a defense zone DZ. When a head with the molded pocket is to be used in an attack position, the apex AAP of the attack pocket can be located in the attack zone AZ. Generally, this attack zone AZ of the pocket corresponds to the molded pocket portion located in the first $\frac{1}{3}^{rd}$ or $\frac{2}{5}^{th}$ the distance from the ball stop 23 along the longitudinal axis 102. The apex AAP of the attack pocket can correspond to the maximum depth of the molded pocket, which maximum depth is measured either from the lowest point of the sidewall 26 in the particular zone, for example the attack zone, to the bottom of the molded pocket in that particular zone, or from the longitudinal axis 102 centered vertically in the ball stop 23, depending on the application. When the apex AAP of the attack pocket is located in the attack zone, the pocket is considered a low pocket. When the pocket is a low pocket, the pocket 10 in general is deepest in the attack zone AZ, with the pocket in the midfield zone MZ and defense zone DZ generally being shallower than that depth of the pocket in the attack zone AZ.

For use in a midfield position, the pocket can include a ball or shooting channel and an apex placed in the middle of the pocket, for example, midway between the ball stop and the scoop. The shooting channel 40 can be a mid-center length channel for better control. As an example, with reference to FIG. 12A, when a head with the molded pocket is to be used in a midfield position, the apex MAP of the midfield pocket can be located in the midfield zone MZ. Generally, this midfield zone MZ of the pocket corresponds to the molded pocket portion located in the second $\frac{1}{3}^{rd}$ or $\frac{2}{5}^{th}$ the distance from the ball stop 23 along the longitudinal axis 102 as illustrated. The apex MAP of the midfield pocket can correspond to the maximum depth of the molded pocket, which maximum depth is measured either from the lowest point of the sidewall 26 in the particular zone, for example the midfield zone, to the bottom of the molded pocket in that particular zone, or from the longitudinal axis 102 when that axis is centered vertically in the ball stop 23, depending on the application. When the apex MAP of the midfield pocket is located in the midfield zone MZ, the pocket is considered a mid-pocket. Further, when the pocket is a mid-pocket, the pocket 10 in general is deepest in the midfield zone MZ, with the pocket in the attack zone AZ and defense zone DZ generally being shallower than that depth of the pocket in the midfield zone MZ.

For use in a defense position, the pocket can include an apex placed high on the pocket, toward the scoop, and a short shooting or center channel (a short ramp). For example, the apex can be located between the midway (located between the ball stop and the scoop), and the scoop. As a further example, with reference to FIG. 12A, when a head with the molded pocket is to be used in a defense position, the apex DAP of the defense pocket can be located in the defense zone DZ. Generally, this defense zone DZ of the pocket corresponds to the molded pocket portion located in the third or last ⅓rd or ⅖th the distance from the ball stop 23 along the longitudinal axis 102 as illustrated. The apex DAP of the attack pocket can correspond to the maximum depth of the molded pocket, which maximum depth is measured either from the lowest point of the sidewall 26 in the particular zone, for example the defense zone DZ, to the bottom of the molded pocket in that particular zone, or from the longitudinal axis 102 when that axis is centered vertically in the ball stop 23, depending on the application. When the apex DAP of the defense pocket is located in the defense zone MZ, the pocket is considered a high pocket. Further, when the pocket is a high pocket, the pocket 10 in general is deepest in the defense zone DZ, with the pocket in the attack zone AZ and midfield zone MZ generally being shallower than the depth of the pocket in the defense zone DZ.

Examples of dimensions or maximum depths for particular pockets, that is high pockets, mid pockets and low pockets, in the respective zones are presented in Table 1 below.

TABLE 1

Values for Maximum Pocket Depths in Heads of Different Positions

|  | High Pocket | Mid Pocket | Low Pocket |
|---|---|---|---|
| Maximum Depth to Bottom of Pocket in Defense Zone | Optionally, about 1 mm to about 315 mm; further optionally about 15 mm to 160 mm; even further optionally about 30 mm to 65 mm | N/A | N/A |
| Maximum Depth to Bottom of Pocket in Midfield Zone | N/A | Optionally, about 1 mm to about 315 mm; further optionally about 15 mm to 160 mm; even further optionally about 30 mm to 65 mm | N/A |
| Maximum Depth to Bottom of Pocket in Attack Zone | N/A | N/A | Optionally, about 1 mm to about 315 mm; further optionally about 15 mm to 160 mm; even further optionally about 30 mm to 65 mm |

The construction of the ball channel, shooting ramp, apex and other features of the molded pocket 10, when configured for use in one or more positions, for example, attack, midfield and defense positions, as well as goalie positions, for both men's and women's lacrosse heads, is better understood with reference to FIGS. 13A-13F.

As shown there, the molded pocket 40 generally includes the middle portion M which transitions to a shooting ramp R. The ball channel 40 can extend within at least the ramp R and can be generally flanked on opposite sides through the ramp by flanks 50A and 50B as described above. As shown in FIGS. 13B and 13C, the area adjacent the middle M of the pocket 10 can include a bottom 42B that transitions to pocket walls 50S. The bottom 42B can be rounded or polygonal. When rounded, the bottom 42B can be in the shape of an arc having a radius, such as radius $R_B$ or $R_C$ shown in cross sections taken perpendicular to the longitudinal axis 102 in FIGS. 13B and 13C. The radius $R_B$ can be measured at a location where the cross section shown in FIG. 13B is taken about 1 to about 3 inches from the base 23. The radius $R_C$ can be taken at a location where the cross section shown in FIG. 13C is taken about 3 to about 5 inches from the base 23. The radii above can correspond to the curvature of the pocket across a width of the pocket, sometimes referred to as a width curvature.

Generally, the rounded bottom 42B can transition to the pocket walls 50S. The pocket walls 50S can be planar, or have a rounded shape with a significantly larger radius than that of the rounded bottom 42B. Where the transition occurs, or generally where the rounded bottom 42B intersects or merges into the pocket walls, the pocket walls can project substantially at an wall angle B1 or B2 away from the end or boundary of the rounded bottom 42. The wall angles B1 and B2 can be measured relative to a vertical plane VP that is parallel to and laterally offset from the longitudinal axis 102 and that passes through the intersection of the rounded bottom 42B and the respective pocket wall 50S.

The radii of the rounded bottom and the wall angles can vary depending on the applications. Various optional values for wall angles B1 and B2, first width curvature and radius $R_B$, and second width curvature and radius $R_C$, used in connection with virtually any head used in any position, are illustrated in Table 2 below.

TABLE 2

Values for Curvature Widths and Wall Angles in Pockets

|  | Pocket Dimensions |
|---|---|
| Curvature Width $R_B$ | about 10 mm to about 315 mm<br>about 10 mm to about 65 mm |
| Curvature Width $R_C$ | about 10 mm to about 315 mm<br>about 10 mm to about 65 mm |
| Wall Angle B1 | about 0° to about 90°<br>about 4° to about 90°<br>about 15° to about 40° |
| Wall Angle B2 | about 4° to about 90°<br>about 0° to about 90°<br>about 15° to about 50° |

With further reference to FIGS. 13D and 13E, the molded pocket 10 can be formed with the ball channel 40 or shooting contour SC of particular configurations and the flanks 50A, 50B being disposed at preselected flank angles B3 and B4. As an example, the ball channel can be rounded or polygonal. When rounded, it can be in the shape of an arc having a radius, such as radius $R_D$ or $R_E$ shown in cross sections taken perpendicular to the longitudinal axis 102. The ball channel 40 radius $R_D$ can be taken at a location where the cross section shown in FIG. 13D is taken about 5 to about 7 inches from the base 23. The ball channel 40 radius $R_E$ can be established at a location where the cross section shown in FIG. 13E is taken about 6.5 to about 9 inches from the base 23. This radius can be part of a circle having a center that is below the pocket rather than above it, as in the other radii noted above.

Generally, the rounded ball channel 40 transitions to the flanks 50A and 50B at the optional shoulders 41S as described herein. Where the transition occurs, or generally at or near the shoulders 41S, the pocket walls can project substantially at flank angles B3, B4 away from the end or boundary of the ball channel 40 or shooting contour SC. The flank angles B3 and B4 can be measured relative to a vertical plane VP that is parallel to the longitudinal axis 102 and that passes through the intersection of the ball channel 40 or shooting contour SC and the respective flank 50A or 50B, optionally at the shoulder 41S. In this configuration at the cross section taken in FIG. 13, the ball channel or shooting contour can be substantially planar and/or can include only a small amount of rounding.

The radii of the ball channel and shooting contour, as well as the flank angles can vary depending on the application. The side-to-side width curvatures of the ball channel and/or shooting contour and the flank angles as well can. Various optional values for the flank angles B3 and B4, and the curvatures of the ball channel $R_D$ and $R_E$ used in connection with virtually any head used in any position, are illustrated in Table 3 below.

TABLE 3

Values for Flank Angles and Ball Channel Curvatures in Pockets

| | Pocket Dimensions |
|---|---|
| Flank Angle B3 | about 90° to about 0° |
| | about 60° to about 30° |
| Flank Angle B4 | about 90° to about 0° |
| | about 80° to about 45° |
| Ball Channel Curvature $R_D$ | about 10 mm to about 100 mm |
| | about 20 mm to about 50 mm |
| Ball Channel Curvature $R_E$ | no curvature; flat or substantially planar |
| | about 0 mm to about 1000 mm |
| | about 200 mm to about 800 mm |

With reference to FIG. 13F, the molded pocket 10 can be formed with the ball channel 40 or shooting contour SC of a particular configuration and ramp angle relative to other components. For example, the ball channel 40 and shooting contour SC can include a shooting ramp 40R down its center, which is generally aligned with the longitudinal axis 102, and which is visible in the cross section taken parallel to the longitudinal axis 102 in FIG. 13F. Generally, the shooting ramp bottom, which is taken at the point of greatest depth in the ball channel, is comprised of a first part 40R1 and a second part 40R2. The first part 40R1 can be generally planar or linear, and can transition to the rounded bottom 42B of the pocket. At the transition, the first part 40R1 can form a ramp angle B6 and proceed along that angle, linearly to the second part 40R2. The second part 40R2 can be less linear or planar than the first part 40R1, and indeed can lie along an arc having a radius $R_F$. Generally, the arc can be part of a circle with a center being located below the pocket 10, with that circle intersecting the longitudinal axis 102. The second part 40R2 can follow this arc toward and/or to the scoop 28. Of course, the first and second parts can be merged together as one continuous, unchanging part, for example, where both parts have the same radius $R_F$, or in which both are of a similar planar or linear configuration.

The pocket bottom 42B can be generally rounded along a direction from the base 23 to the scoop 28, as shown in the cross section taken in FIG. 13F. The pocket bottom 42B can follow an arc, having a radius $R_G$. The arc can be part of a circle with a center being located above the pocket 10, with that circle intersecting the longitudinal axis 102. Generally, the molded pocket can be formed so that along the longitudinal axis 102, the rounded bottom includes a first curvature, optionally having a first radius $R_G$ and that first curvature transitions to a second curvature, optionally having the second radius $R_F$ in a direction from base 23 to scoop 28. As noted above, the first and second curvatures, and the radii can be formed from circles with centers above and below the molded pocket respectively. Also, if desired, the first curvature can transition to a relatively linear, flat or planar first part of a shooting ramp which itself transitions to the second curvature.

As shown in FIG. 13F, the front portion of the bottom 42B can transition to the shooting ramp 40R at a transition location 40T. At this transition location, the shooting ramp 40R, and optionally the first part 40R1, can be disposed at a ramp angle B6. This ramp angle can be taken at the point or along a line where the bottom 42B transitions to the ramp 40R, and can be taken relative to a first horizontal axis HA1 that runs generally parallel to and optionally below the longitudinal axis 102.

At its rear, near the base 23, the rounded bottom 42B can transition to a rear pocket wall 50R. This wall 50R can be contiguous with the pocket walls 50S, and can cleanly merge into them. The rear pocket wall can extend generally toward the base 23 or ball stop depending on its precise location. The rear portion of the bottom 42B also can transition to the rear pocket wall at a transition location 50T. At this transition location, the rear pocket wall can be disposed at a rear pocket wall angle B5. This angle B5 can be taken at the point or along a line where the bottom 42B transitions to the rear pocket wall, and can be taken relative to the first horizontal axis HA1 (or some other horizontal axis) that runs generally parallel to and optionally below the longitudinal axis 102.

The first and second curvatures, respective radii, shooting ramp angles and rear pocket wall angles can vary depending on the application. Various optional values for ramp angle B6, rear pocket wall angle B5, first curvature and radius $R_G$, and second curvature and radius $R_F$ used in connection with virtually any head used in any position, are illustrated in Table 4 below.

TABLE 4

Ramp Angles, Rear Pocket Wall Angles,
First and Second Curvature Values

| | Pocket Dimensions |
|---|---|
| Shooting Ramp Angle B6 | about 10° to about 80° |
| | about 20° to about 70° |
| | about 30° to about 50° |
| Rear Pocket Wall Angle B5 | about 10° to about 80° |
| | about 15° to about 75° |
| | about 25° to about 65° |
| First Curvature/Radius $R_G$ | about 10 mm to about 1000 mm |
| | about 50 mm to about 800 mm |
| Second Curvature/Radius $R_F$ | no curvature; flat or substantially planar |
| | about 0 mm to about 500 mm |
| | about 0 mm to about 100 mm |

III. First Alternative Embodiment

A first alternative embodiment of the lacrosse pocket is illustrated in FIGS. 16-19 and generally designated 110. The pocket shown there is similar in construction and operation to the embodiments described above with several exceptions. For example, the pocket 110 is molded directly to a pocket frame 60. The molded pocket 110 can be molded from the same or a different material from the pocket frame 60. For example, the molded pocket 110 can be of an elastomeric material while the pocket frame 60 can be from a more rigid polymer or plastic, such as nylon. Alternatively, the molded pocket 110 can be constructed from a first polymeric material of a first durometer, while the pocket frame 60 can be molded from the same polymeric material having a greater durometer.

Generally, the pocket 110 can include the individual molded strings, combined molded strings, shooters, rails and other components as described in connection with the embodiments above. The pocket frame 60 can be constructed so as to be rigidly and consistently attached to the pocket. For example, as shown in FIGS. 18, 18A and 19, the frame 60 can include an inner part 61 and an outer part 62. The inner part 61 and outer part 62 can be identical to one another, but of course can be asymmetrically formed or dissimilar from one another in structure depending on the particular application. The inner part 61 and outer part 62 can each form a somewhat plate like structure that extends from a bottom 64 to a top 65 of the frame 60. The pocket frame 60 can define a groove 63 extending from the bottom 64 to the top 65 of the frame, or generally upward from the bottom. The inner surfaces of the inner part 61 and outer part 62, namely the interior surfaces 61A and 62A can generally define the groove 63.

Figure 16:
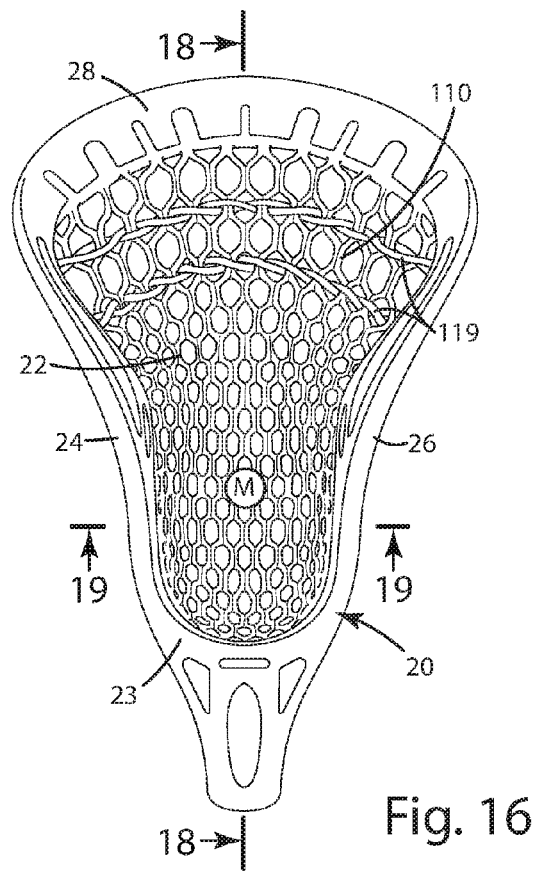
FIG. 16 is a top view of a first alternative embodiment of a lacrosse pocket molded to a pocket frame connected to a lacrosse head.

The inner part 61 and outer part 62 also can include a structural protuberance or projection 61B and 62B extending laterally outward away from the exterior surfaces of the inner and outer parts 61 and 62 respectively. The projections as shown can be of a semicircular geometric configuration. Alternatively, they can be of another geometric configuration, for example, they can be triangular, polygonal, rectangular, square, trapezoidal or combinations of the foregoing. Moreover, the projections 61B and 62B can be duplicated on the exterior surfaces of the parts, and instead of being a single projection can extend in multiple places from the top 65 to the bottom 64 of the pocket frame along the parts 61 and 62. Of course, these projections 61B and 62B can also be formed as elongated ridges that extend around the entire pocket frame 60 generally facing the interior 22 as shown in FIG. 16, or replaced with recesses or apertures, to form female type interlocking structures.

Returning to FIG. 16, the projections 61B and 62B can operate to form a physical interlocking structure between the pocket frame 60 and the component of the head frame 20 which is molded over the frame 60. As shown in FIG. 18, and particularly the exploded sub view of FIG. 18A, that component can be the scoop 28. As shown there, the scoop 28 can define a groove 29 within which the pocket frame 60 is positioned. As described in further detail below, the scoop 28 and more generally the head 20 can be molded over the pocket frame 60. Alternatively, the pocket frame 60 can be molded within the groove or recess 29 defined by the scoop 28. Optionally, this recess 29 can extend also into the sidewalls and/or ball stop 23, depending on the particular application and connection points between the molded pocket 110 and the lacrosse head 20.

Returning to FIGS. 17 and 18, the molded pocket 110 can include a support rail 118. Although shown in connection with a forward support rail 118 adjacent the scoop, the pocket can also include other sidewall support rails and ball stop support rails having components and connected to the pocket frame similar to that of the forward support rail. For example as shown in FIG. 18, the support rail 118 is used in the scoop for attaching molded pocket 110 to the pocket frame 60. In the ball stop 23 of the head 20, the ball stop support rail 113 is joined with the pocket frame 60. That ball stop support rail 113 can be of a similar construction as the scoop support rail 118. Likewise, the sidewall support rails 114 and 116 shown in FIG. 19 can be attached to the pocket frame 60 using similar constructions as that described in connection with the scoop support rail 118.

The support rail 118 can be encapsulated, embedded or otherwise trapped within the groove 63 of the pocket frame 60. Specifically, the support rail 118 can include inner 118A and outer 118B surfaces. These surfaces can be bonded directly to the interior of the groove 63, for example directly to the surfaces 61A and 62A. Although not shown, the surfaces 61A and 62A can include one or more recesses or ridges, or holes or projections to further enhance the mechanical bonding of the support rail 118 to the pocket frame 60.

Optionally, the support rail 118 can extend a distance D5 outward and below the bottom 64 of the pocket frame 60. This distance can vary depending on the particular flexibility of the molded support rail after it is completed. In some cases, the support rail can extend a distance D5 that is optionally about 1 mm, 2 mm, 3 mm, 4 mm, 5 mm or 10 mm below the bottom 64 of the pocket frame 60. In some cases, the support rail can be configured so that it does not extend beyond the bottom 64 of the pocket frame 60, in which case distance D5 can be zero.

In the embodiment shown in FIG. 18, the support rail of the pocket can optionally include a T-shaped end 118C that assists in mechanically joining the pocket and the frame. The T-shaped end 118C can include first and second lateral members that extend outwardly at the end 65 over the inner part 61 and out part 62 of the pocket frame 60. These lateral members or wings can extend from the inner to the outer surfaces of the inner part 61 and outer part 62 respectively. The flanges can provide an additional mechanical and structural connection between the support rail 118 and the pocket frame 60, and more particularly can impair the support rail 118 from moving significantly within the groove 63.

If desired, the T-shaped end 118c can be eliminated or modified, with the top of the support rail terminating at an end that is the same width as the remainder of the support rail. This end may or may not be encapsulated or covered by an overlaying portion of the frame. Although not shown, the T-shaped end can be replaced with an L-shaped end which includes a lateral flange that overlaps only the first part or the second part. Further, the support rail 118 can be configured so that in some portion of the rail around the perimeter of the head, the T-shaped end 118c is included, but in other areas it is not. The areas it is located can correspond to those where the pocket encounters forces that might pull the pocket away from the frame. Optionally, the lateral members in different areas can be thickened or thinned, and can extend different distances or thicknesses from the top 65 of the frame pocket 60. These different thicknesses can be fine tuned to the particular location in the head in which particular characteristics are desired.

Turning to FIG. 19, the sidewalls 24 or 26 of the head 20 including the pocket frame 60 and molded pocket 110 can be of a particular configuration. As shown there, the pocket frame 60 and the corresponding support rails 114 and 116 joined therewith is molded over by the lower rails 24A and 26A of the respective sidewalls 24 and 26 of the head 20. The pocket frame 60 and respective support rails 114, 116 can be formed in a similar manner to that of the scoop support rail 118 as shown at FIG. 18.

As shown in FIG. 19, the pocket frame 60 can be over molded by the sidewall 26 or more particularly a lower rail or other component of the head to substantially conceal most or all the pocket frame 60 and/or at least a portion of the support rail 116 within the sidewall. For example, the inner surface 26D of the rail 26A facing the interior 22 of the pocket or lacrosse head can form a layer located laterally interior of the pocket frame 60. This layer can be of a predetermined thickness so that the pocket frame 60 and the inner part 62 is substantially concealed when viewing the interior rail surface 26D. The interior rail surface 26D can transition to an upper rail surface 26F. In the region adjacent the upper surface 26F the rail 26A can be of another thickness that also conceals the upper surface, end or top of the pocket frame 60. The upper surface 26F can transition to an outer surface 26E, which also conceals the outer part 61 of the pocket frame.

In this construction, the pocket frame 60 can be sandwiched between the part of the rail including the inner surface 26A and the outer part of the rail including the outer surface 26E. The top of the pocket frame 65 may or may not extend through or beyond the upper surface 26F of the lower rail, depending on the attachment of the molded pocket and pocket frame to the sidewall or other component. Although the aforementioned is described in connection with the lower rail 26A of the sidewall 26, it can also be applied to the ball stop, opposing sidewall and/or scoop or other features of the lacrosse head.

Optionally, as shown in FIG. 19, the head can be constructed so that there are no recesses facing toward the interior 22 of the head. For example, there are no recesses on the interior surfaces 22A of the sidewalls. Instead, the pocket frame 60 and respective support rails 114 and 116 extend downwardly from the lower surfaces 24B and 26B of the respective lower rails of the sidewalls. Therefore, there is no portion of the pocket frame or molded pocket that interfere with the interior 22 of the pocket, let alone the interior surfaces 22A facing toward the interior 22. Alternatively, if it is desired that the pocket frame 60 extend laterally inward, for example, toward the longitudinal axis 102 of the head 20, the pocket frame and/or support rails 114 can be located in recesses on the interior facing surfaces of the sidewalls.

A method for making the first alternative embodiment of the lacrosse pocket including the pocket frame will now be described. In general, that method includes molding the pocket frame 60 out of a first material, such as a polymeric material, or even a metal or composite. The pocket frame 60 can be molded to include the scoop member 68 joined with opposing sidewall members 65 and 66, which are further joined with a ball stop member 67. The frame 60 can define a groove 63 through all of these different members. The groove can include the features described above.

With the pocket frame molded, the pocket can be molded directly to the pocket frame. The pocket frame can include the various components described in connection with FIG. 18 above to physically connect and bond to the molded pocket material. The molded pocket material can be a polymeric material and/or an elastomeric material, or other natural or synthetic rubber or latex as desired.

With the molded pocket 110 attached to the pocket frame 60, the pocket frame and molded pocket can be placed in a lacrosse head mold. The lacrosse head 20, and in particular a lacrosse head frame including the various components such as the ball stop 23, sidewalls 24, 26 and scoop 28 can be molded over the pocket frame 60 and/or the molded pocket support rails to connect the pocket frame 60 and/or molded pocket 110 to the head 20 and its frame.

After the former molding operation is completed, the molded head, pocket frame, and molded pocket form an integral and monolithic structure which are all permanently attached to one another and cannot be separated from one another without destroying the one or more of the components. Of course, if desired, the head, pocket frame and/or molded pocket can be constructed with fastening features that allow these components to be nondestructively detached or disassociated from one another.

IV. Second Alternative Embodiment

A second alternative embodiment of the lacrosse pocket is illustrated in FIGS. 20-25. The pocket shown there is similar in construction and operation to the embodiments described above with several exceptions. For example, as shown in FIGS. 20-23, the pocket frame 160 is joined with a molded pocket 210. The pocket frame can be overmolded over the molded pocket or vice versa. Alternatively, the molded pocket 210 can include support rails extending around different regions of the pocket, for example, the ball stop, sidewalls and scoop as described in embodiments above. These support rails can be attached to the pocket frame support members, for example the ball stop member 167, sidewall support members 165 and 166, and the scoop member 168 of the pocket frame 160.

The pocket frame 160, and optionally the support rails of the molded pocket extending within the pocket frame, can define a plurality of pocket frame connector holes 169. These pocket frame connector holes can be defined in the ball stop member 167, the sidewall members 165 and 166 as well as the scoop member 168, which optionally can be continuous with one another, having no breaks or voids in any part thereof. Although not shown, these pocket frame connector holes can extend through any portion of support rails that are included in the pocket frame. Of course if desired, the holes 169 can be above or outside the support rails of the molded pocket 210. The connector holes 169 can be defined entirely around the molded pocket within the pocket frame 160.

As shown in FIGS. 20 and 21, the molded pocket 110 and the pocket frame 160 are configured to interfit within features of the lacrosse head 20 to join these items, and optionally detachably couple these items. With such a coupling construction, a user can generally remove and/or replace one pocket frame with another by simply removing or detaching the pocket frame from the lacrosse head and its components. The user can also attach or couple a different pocket frame, or the same pocket frame, to the head. For example, the head 20, and in particular, the ball stop 23, scoop 28, and/or sidewalls 24 and 26, can define a pocket frame shoulder or stringing ridge 169A. Net holes 29 can be defined through the head adjacent the stringing ridge 169A. These net holes 29 align with the respective connector holes 169 defined in the pocket frame 160. Accordingly, the pocket frame 160 can be strung to the lacrosse head 20 with a string 29S extending through both the net holes 29 and the connector holes 169. The string 29S can be constructed from a conventional lace, web, cord or other elongated material including strands, fibers and/or other components.

Figure 23:
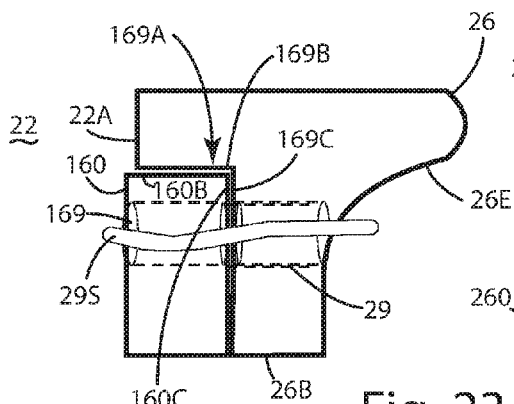
FIG. 23 is a cross section view of the molded pocket frame joined with a lacrosse head.

FIGS. 20 and 23 illustrate the stringing ridge 169A in more detail. As with the other embodiments, this stringing ridge construction is illustrated only in connection with a sidewall rail; however, it can be implemented with any of the other structures of the head, such as the ball stop, other sidewall or scoop. The stringing ridge 169A can include a first surface 169B and a second surface 169C. The first surface is generally horizontal and transitions from an inner surface 22A of the head, and more particularly an inner surface of the rail 26, to a generally horizontal or outwardly extending surface 169B. That outwardly extending surface 169B extends from the interior of the pocket generally outwardly, toward the exterior surface 26E of the rail 26. The outwardly extending surface 169B transitions to a generally vertical or downwardly extending surface 169C. That surface 169C transitions to and generally terminates at the lower exterior surface 26B of the rail 26.

Although shown as being adjoined at a corner, the outwardly extending surface 169B and downwardly extending surface 169C of the stringing ridge 169A can transition at a rounded or arced corner. Alternatively, these surfaces 169B and 169C can form a part of a continuously curved surface, or a multifaceted, multi-angled structure, or any other structure which generally provides structural registration of the pocket frame 160 within the stringing ridge 169A.

As further shown in FIG. 23, the pocket frame 160 can include corresponding surfaces 160B and 160C which are placed immediately adjacent and generally abut against the surfaces 169B and 169C. These surfaces also can include other interlocking components such as ridges, bumps, projections and recesses and the like to further connect and register the pocket frame 160 with the rail 26.

Optionally, although shown as being defined on the interior surface 22A of the head, the stringing ridge 169A alternatively can be defined on the exterior surface 26E of the rail 26. In this case, the pocket frame 160 can be displaced outwardly, rather than inwardly, of the rail 26 or other head structure.

Figure 24:
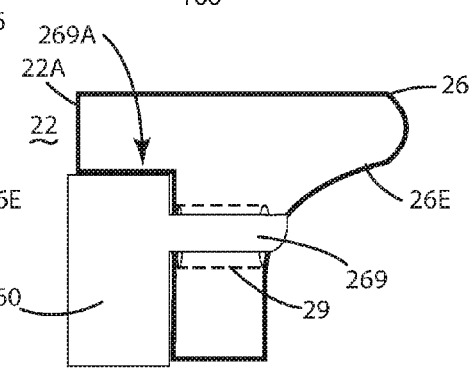
FIG. 24 is a cross section view of the molded pocket frame being joined with a lacrosse head in a first alternative manner.
Figure 25:
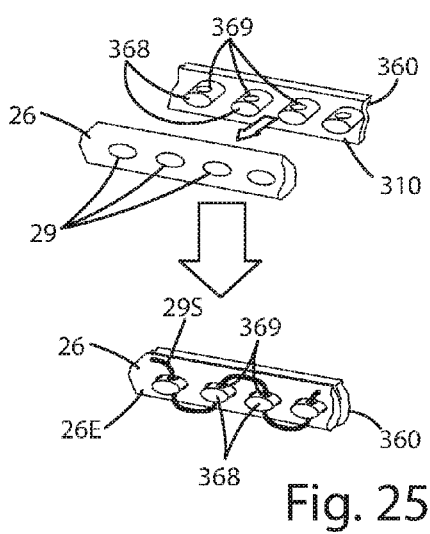
FIG. 25 is a perspective view of the molded pocket frame being joined with a head in a third alternative manner.
Figure 24A:
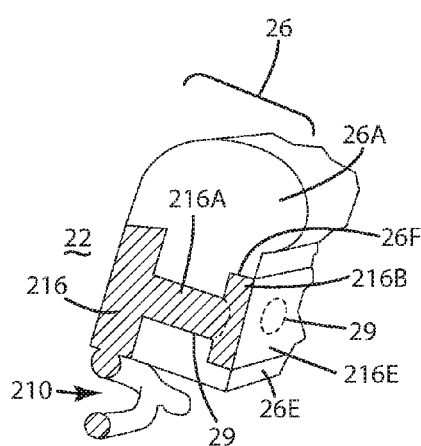
FIG. 24A is a cross section view of the molded pocket frame being joined with a lacrosse head in a second alternative manner.

Modifications to the attachment of the pocket frame and molded pocket to the ball stop, sidewalls and/or scoop shown in FIGS. 20-23 are shown in FIGS. 24, 24A and 25. For example as shown in FIG. 24, the lower rail 26 can define multiple net holes 29 that extend from a stringing ridge 269A outwardly to the exterior surface 26E of the sidewall. The pocket frame 260, or alternatively, a support rail of the molded pocket if desired, can include an extension 269 which extends laterally outwardly away from the pocket frame or molded pocket. This extension 269 can extend through the net holes 29. In some cases, the extension can be directly molded, along with the remainder of the pocket frame and/or molded pocket, so that it fills and joins with the net hole 29. Alternatively, the extension 269 can extend beyond the exterior surface 26E of sidewall, or any other exterior surface of the scoop or ball stop, and can be connected by an externally mounted connector member.

Another example of the connection of the pocket frame and molded pocket to the ball stop, sidewalls and/or scoop, is illustrated in FIG. 24A. There, the molded pocket 210 can include a support rail 216 which includes an extension 216A. The support rail and molded pocket can be molded directly to the lower rail 26 and/or other component of the sidewall 26, scoop or ball stop, depending on the location. This extension 216A when molded, can extend through and fill the respective net holes 29 defined by the component of the head, which as shown can be the lower rail 26A of a sidewall. The lower rail can define on its exterior 26E an elongated rectangular recess or shouldered hole 26F. Although shown as rectangular in shape, the recess 26F can square, triangular, polygonal, trapezoidal or include a rounded bottom, or other geometric cross section. The recess can extend around the entire perimeter of the head, on an exterior or interior surface, or alternatively in preselected locations around the perimeter of the head.

The extension 216A can include a head or flange portion 216B extends into and optionally fills or occupies the recess 26F. The head located and registered in this recess can offer additional support and mechanical connection between the molded pocket 210 and the sidewall 26, or other component to which the molded pocket is joined. The outer surface 216E of the flange 216B can be configured to be flush with the exterior surface 26E of the rail 26A or other exterior surface of the head. If desired, however, it can extend outwardly and provide an ornamental or tactile effect over the exterior surface 26E. Optionally, although not shown, a pocket frame can include a similar extension and flange to connect the pocket frame to the head.

Further optionally, although shown with the molded pocket and/or pocket frame facing the interior 22 of the head, the pocket frame 260 and/or support rail 216 can alternatively be formed along or positioned near the exterior surface 26E of the sidewall 26 for other component to which these items are connected. In these constructions, the extensions extend inwardly through the net holes 29 and can include a similar head, flange or other enlarged portion to mechanically secure the pocket frame and/or molded pocket to the lacrosse head.

Yet another example of the connection of the pocket frame and molded pocket to the ball stop, sidewalls and/or scoop, is illustrated in FIG. 25. There, the pocket frame 360 is attached to the pocket 310 using any of the constructions described herein. The frame and/or molded pocket includes extensions 368 that extend outwardly away from pocket frame 310. These extensions 368 can define one or more holes 369. The holes 369 can be transversely oriented relative to the direction of the extensions 368 from the pocket frame 360. For example, the extensions 368 can extend laterally outward from the pocket frame 360. The holes 369 can be defined vertically through (and transverse to) the extensions 368.

Although shown as being oval shaped, the extensions 368 can be of any geometric configuration, and can generally correspond to the shape of the net holes 29 defined by the sidewall, scoop, ball stop or other component of the head to which it is attached. To connect the pocket frame 360 and/or molded pocket 310 to the sidewall 26, the extensions 368 are placed through the net holes 29 so that the extension holes 369 are located beyond the exterior surface 26e of the sidewall 26. A lace or string 29S can be strung through the holes 369 in the extensions 368 that project past the exterior 26E of the sidewall 26. Optionally, the pocket frame could be reconfigured so that the extensions face inwardly, in which case the string 29S would be located on the interior of the lacrosse head when strung through the holes 369. Further optionally, although shown with the extensions 368 extending from the pocket frame, the molded pocket 310 can include a support rail as described in any of the embodiments herein. This support rail can include similar extensions, with the pocket frame absent from the construction.

V. Third Alternative Embodiment

Figure 26:
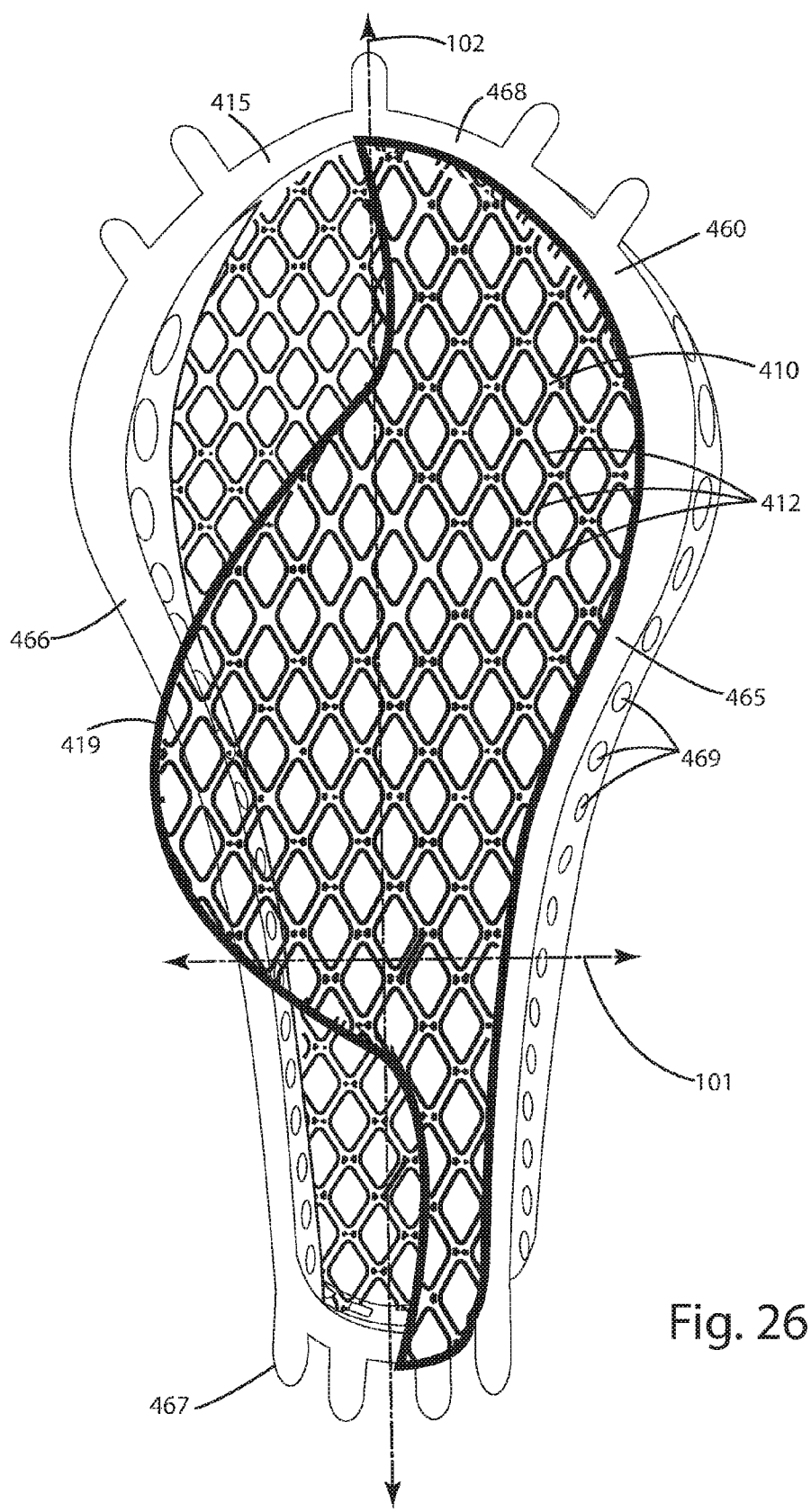
FIG. 26 is a perspective view of a third alternative embodiment of a mesh or synthetic pocket and a pocket frame independent of a lacrosse head.
Figures 27, 28:
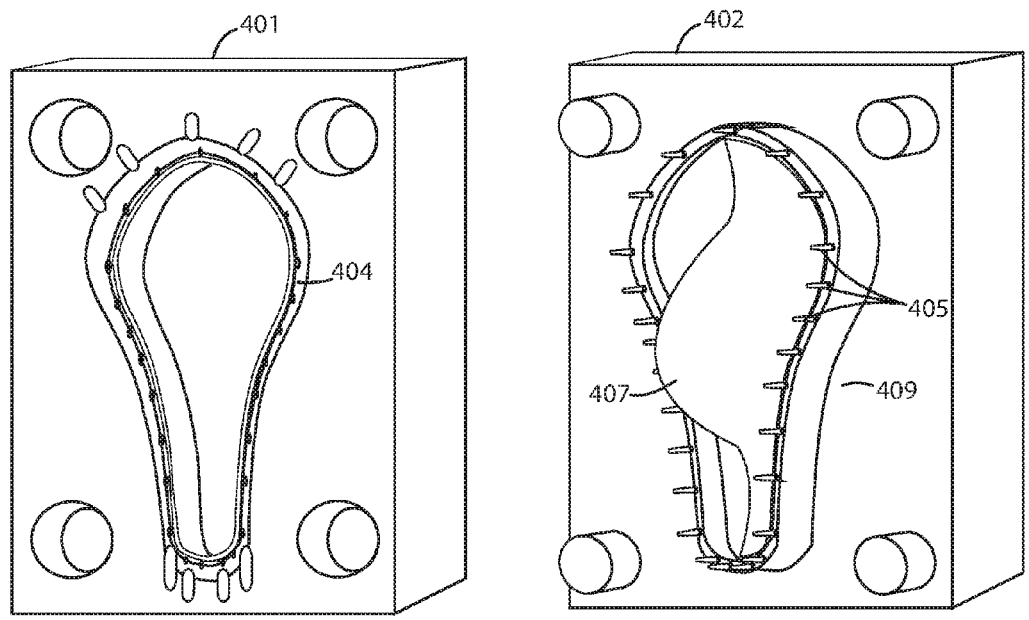
FIG. 27 is a perspective view of a first mold cavity for a pocket of the third alternative embodiment.
FIG. 28 is a perspective view of a second mold cavity for a pocket of the third alternative embodiment.

A third alternative embodiment of the lacrosse pocket is illustrated in FIG. 26. The pocket shown there is similar in construction and operation to the embodiments described above with several exceptions. For example, the pocket 410 is joined with the pocket frame 460. The pocket frame 460 can define one or more connector holes 469 which can be registered with corresponding net holes in a lacrosse head as described in the embodiments herein. The pocket frame 460 can be formed with any other structures or components described in connection with the other embodiments herein. Further, the pocket frame 460 can be formed to connect to the lacrosse head with any of the other constructions described herein.

The pocket 410, however, can differ from or be the same as the molded pocket described in connection with the other embodiments above. For example, the pocket 410 can be constructed from a conventional mesh material or other synthetic material. The mesh or synthetic material can be overmolded around its perimeter 415 by the pocket frame 460. In this construction the mesh or synthetic material is embedded in or encapsulated in the material making up the pocket frame. Thus, the material of the mesh or synthetic material can have embedded within its outer surfaces, and to some extent, within its structure, the polymeric material from which the pocket frame 460 is molded. This can provide a connection between the mesh or other synthetic material and the molded pocket 460.

The mesh or other material can be stretched or pre-tensioned laterally in opposite directions that are aligned with the lateral axis 101 at any number of infinite locations along the longitudinal axis 102. The mesh or other material also or alternatively can be stretched or pre-tensioned longitudinally in opposite directions aligned with the longitudinal axis 102 at any of infinite locations along the lateral axis 101. In its pre-tensioned state, whether laterally stretched, longitudinally stretched, or both, the pocket 410 can be molded to the pocket frame, and in so doing, can retain a generally taut and preconfigured shape and contour corresponding to the amount of residual tension left in the mesh or material after the molding.

Further, the mesh or other material can be preformed or shaped with a bulbous or contoured ball receiving area 419 of a mold. This ball receiving area can be shaped to hold a lacrosse ball placed in the pocket 410. Optionally, the pre-tensioning can enable the mesh to be held to form the bulbous formation 419 or other structures within the mesh or synthetic material of the pocket 410.

A method for making the third alternative embodiment of the pocket including the pocket frame 460 and the pocket 410 constructed from mesh, other material, or even the molded strings mentioned in the embodiments herein will now be described with reference to FIGS. 27-33. Generally, the pocket can be made in a mold, which can include a first mold part 401 and a second mold part 402. The first mold part 401 can define a pocket frame mold cavity 404, which includes portions that correspond to the ball stop member 467, sidewall members 465, 466 and the scoop member 468 of the pocket frame 460. The mold cavity 404 also can include extensions that correspond to the net holes 469 to be defined by the pocket frame.

The second mold part 402 can be configured to complete the mold cavity 404. The second mold part 402 can also include a plurality of locator elements, such as pins 405, that are disposed around at least a portion of a perimeter of the pocket frame mold cavity 404. These pins can be located directly on the cavity, can be located interior of it, or located exterior of it. The locator pins can be configured to extend outwardly and from the second mold part 402 so that when a mesh pocket or other synthetic pocket material is stretched over them, the locator pins register within holes 431 defined by the pocket 410 as described below.

The second mold part 402 also can define a projection portion 407 that projects outwardly away from the mold. This projection portion can be configured to correspond to a desired contour 419 for retaining a lacrosse ball within the completed pocket after it is molded to the pocket frame.

Figure 29:
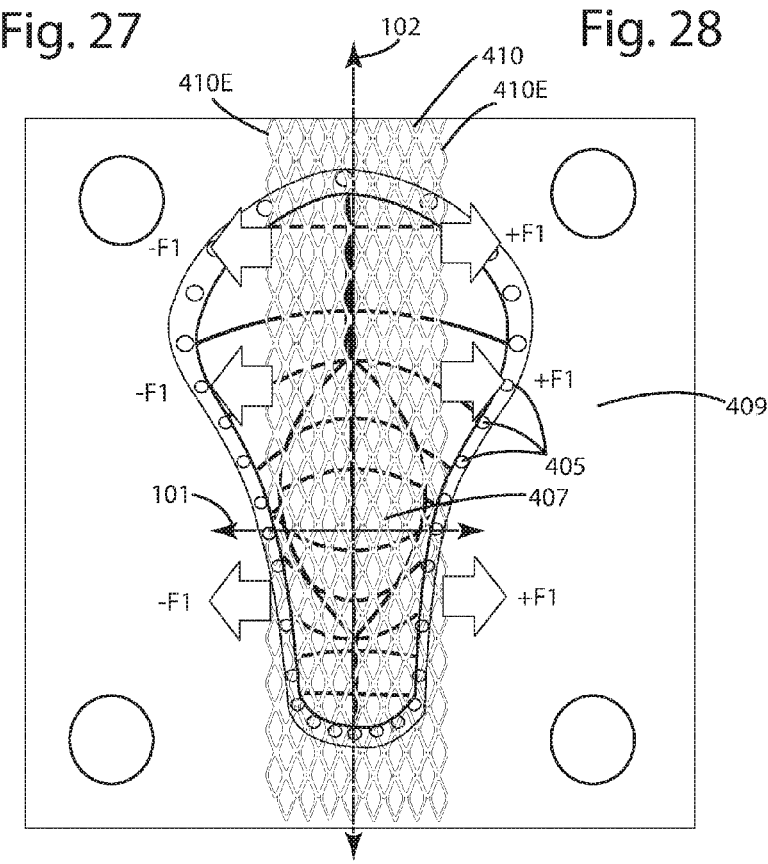
FIG. 29 is a top view of a mesh material being placed over the second mold cavity for a pocket of the third alternative embodiment.
Figure 30:
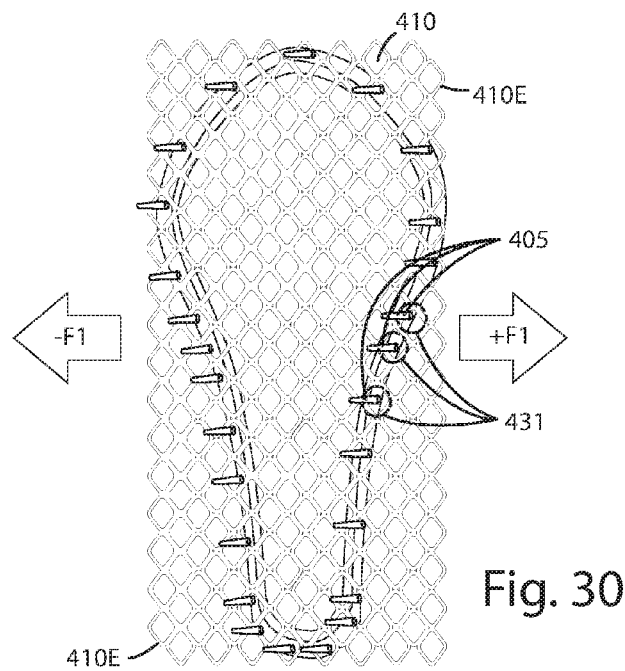
FIG. 30 is a top view of a mesh material being tensioned over the second mold cavity for a pocket of the third alternative embodiment.
Figure 31:
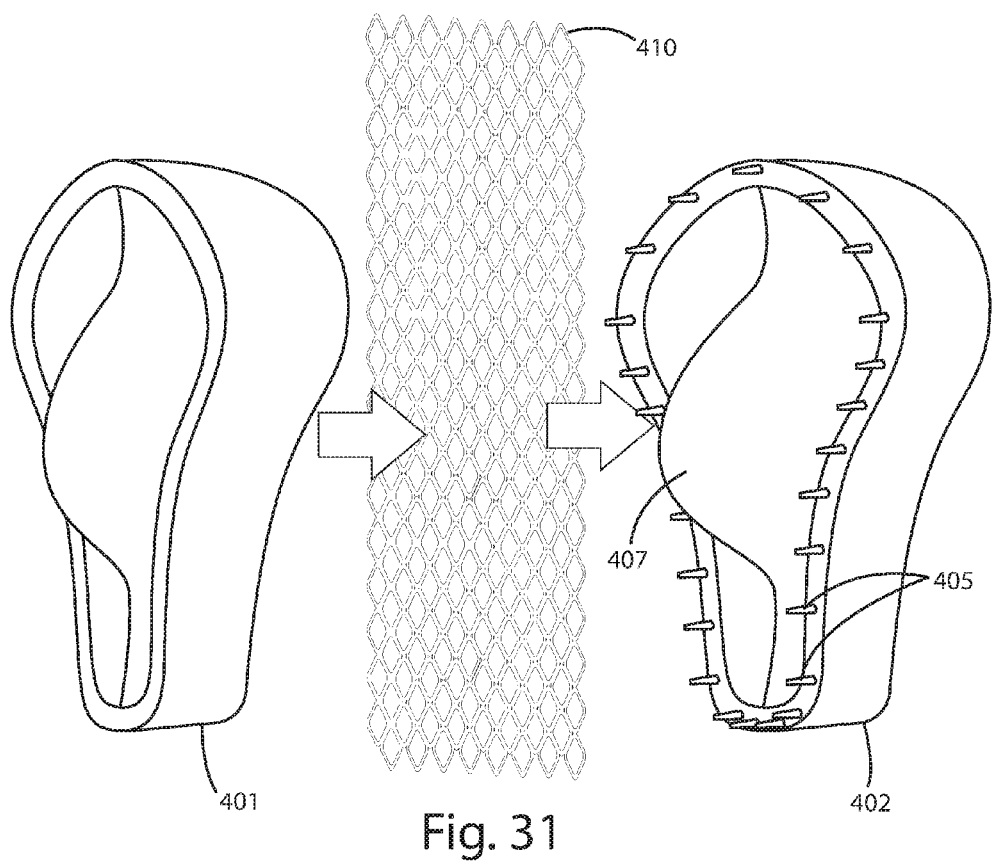
FIG. 31 is a perspective view of the first and second molds, with mesh being placed, for a pocket of the third alternative embodiment.

Generally, the first and second mold parts are used to mold a pocket frame to a mesh or synthetic or other pocket. With reference to FIG. 29, a mesh pocket in an un-stretched, un-tensioned state is placed two-dimensionally in a flat planar form above the second mold 402, generally above the locator pins 405. The mesh or other material 410 is then stretched using forces +F1 and −F1 in the directions of the arrows as shown. Generally, these forces +F1 and −F1 are applied in direction in which the lateral axis 101 extends, and generally perpendicular to the longitudinal axis 102, at some plurality of locations along the longitudinal axis 102. The forces +F1 and −F1 stretch the mesh material to a pre-tensioned mode. The forces can range from 1, 2, 3, 4, 5, 10, 15, 20, 25 or 30 pounds, or more or less, depending on the desired amount of tension. Optionally, the outer edges 410E on opposing sides of the longitudinal axis 102 can be clamped in a clamping device (not shown) to effect symmetric application of the forces +F1 and −F1. Alternatively, this can also ensure that the mesh is evenly stretched along the entire length of the head. This pre-tensioned mode is shown in FIG. 30. Generally, in this pre-tensioned mode, the mesh or material is stretched laterally about 1%, 2%, 3%, 4%, 5%, 10%, 15%, 20%, 25% or more or less its width in an un-tensioned mode, such as when it is simply lying flat on a horizontal surface.

As shown in FIG. 30, after the mesh or material 410 has been adequately stretched, it is brought closer to the locator pins so that the locator pins 405 register in corresponding pocket holes 431. The forces +F1 and −F1 can be maintained on the edges 410E of the mesh or material 410 and/or optionally they can be relieved. Either way, the mesh remains in a pre-tensioned mode being strung across the second mold and held in that pre-tensioned mode by the locator pins. Where the second mold includes a projection 407, that projection also is reflected through the mesh where the projection is brought adjacent the upper surface 409 of the second mold.

Optionally, in some cases the mold can be modified to eliminate the locator pins yet still hold the mesh or other pocket material 410 in a pre-tensioned mode. For example, the mold can include clamps that clamp the edges 410E of the mesh or material and apply the forces +F1 and −F1 throughout the pocket frame molding operation. In this construction, the mold locator pins can be absent yet the mesh is still maintained in a pre-tensioned state before, during and after molding material to form the pocket frame.

Figure 32:
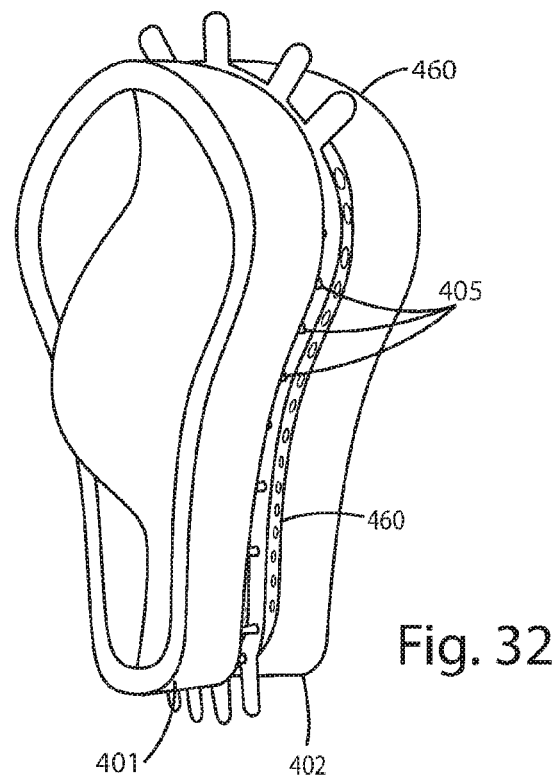
FIG. 32 is a perspective view of the first and second molds with mesh tensioned and the pocket frame being molded over the mesh for a pocket of the third alternative embodiment.

Returning to FIG. 31, the first mold part 401 and second mold part 402 are moved together with the mesh or material 410 in its pre-tensioned mode installed on the second mold 402 and/or otherwise held in a pre-tensioned mode using other techniques. As shown in FIG. 32, the mold parts 401 and 402 are brought together to fully define the pocket frame mold cavity. This pocket frame mold cavity has extending through it at least a portion of the mesh or other material 410. In other words, the mesh or material 410 is located within the pocket frame mold cavity 404 as shown in FIG. 32. A polymeric material is injected or otherwise introduced into the pocket mold cavity to form the pocket frame. As it is injected it encapsulates and is optionally embedded within portions, surfaces and any fibers, strands or filaments of the mesh or material that are located within the mold cavity 404. The various structures of the pocket frame are formed. The frame is allowed to cure for a predetermined amount of time.

Figure 33:
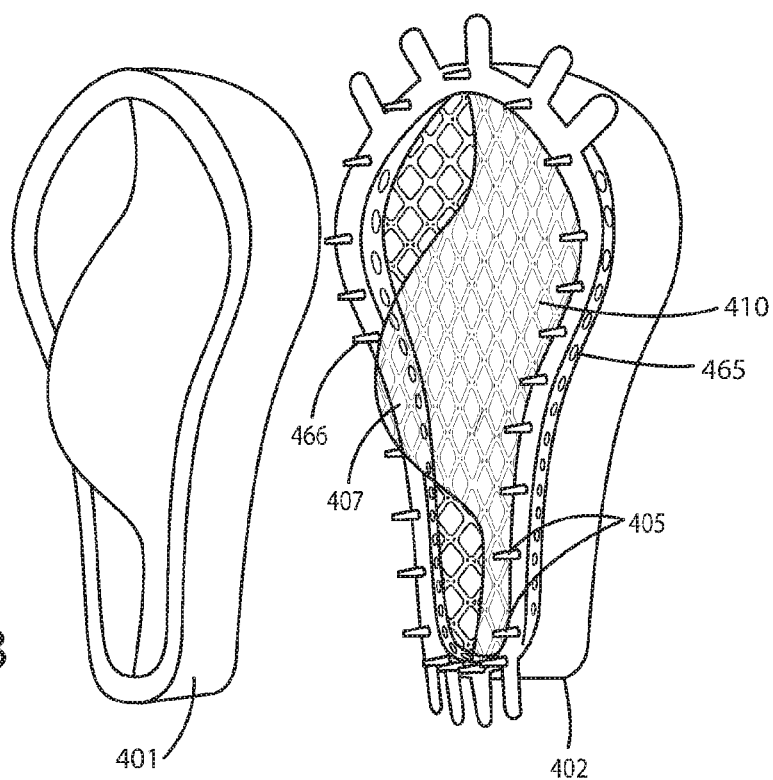
FIG. 33 is a perspective view of the first and second molds with mesh contoured and attached to the molded pocket frame after molding a pocket of the third alternative embodiment.

After the frame 460 has cured, as shown in FIG. 33, the first and second mold parts 401 and 402 are separated. The cured pocket frame 460 is attached and molded directly to the mesh or other synthetic material forming the pocket 410. The perimeter of the mesh is held by the molded pocket frame, and the mesh or material can remain in a laterally and/or longitudinally tensioned mode due to the pocket frame's rigidity. Of course, in some instances, the tension held in the mesh can slightly draw the sidewall elements 466 and 465 together or toward one another. The mesh also can have a corresponding ball holding section or bulbous portion formed via the bulbous section 407 of the mold. After the mold parts are separated, the pocket frame 460 is completely removed from them. Again, the mesh maintains all or part of the tension established in the pre-tension mode, when connected to the frame. If any portions of the mesh or other synthetic material from which the pocket 410 is constructed extend beyond the exterior of the pocket frame, or are undesirably exposed through the pocket frame, those portions can be trimmed from the pocket frame and discarded. Other finishing operations can be performed on the pocket frame and pocket as well to prepare them for joining with a lacrosse head.

Optionally, the above method can likewise be used to mold a fabric, mesh, other synthetic material, or a molded pocket including molded strings as described herein directly to a lower portion of a conventional lacrosse head. In such a method, the pocket frame can be replaced with the lower rails, lower ball stop and/or lower portion of the scoop of the lacrosse head and the same steps followed.

Further optionally, the above method can be modified slightly so that the mesh or material of the pocket is pre-tensioned less, or not at all, and still molded to the pocket frame. For example, the mesh or material can be pre-tensioned a very small amount or simply loosely draped across the mold cavity. The pocket frame can be molded over the mesh or material. The pocket frame, however, can be sized slightly smaller than the head to which it will be attached. The pocket frame itself can be constructed from a slightly stretchable and/or elastic polymeric or other material. When the pocket frame is joined with the head, the frame is put under a tension and or stretched laterally, longitudinally, or otherwise, and in turn places the mesh or material of the pocket in a tensioned mode. To do so, the pocket frame or head, or tools to join the head and frame can include tapers or wedged portions to expand the perimeter or dimensions of the frame.

VI. Method of Manufacture for the Current Embodiment

Figure 34:
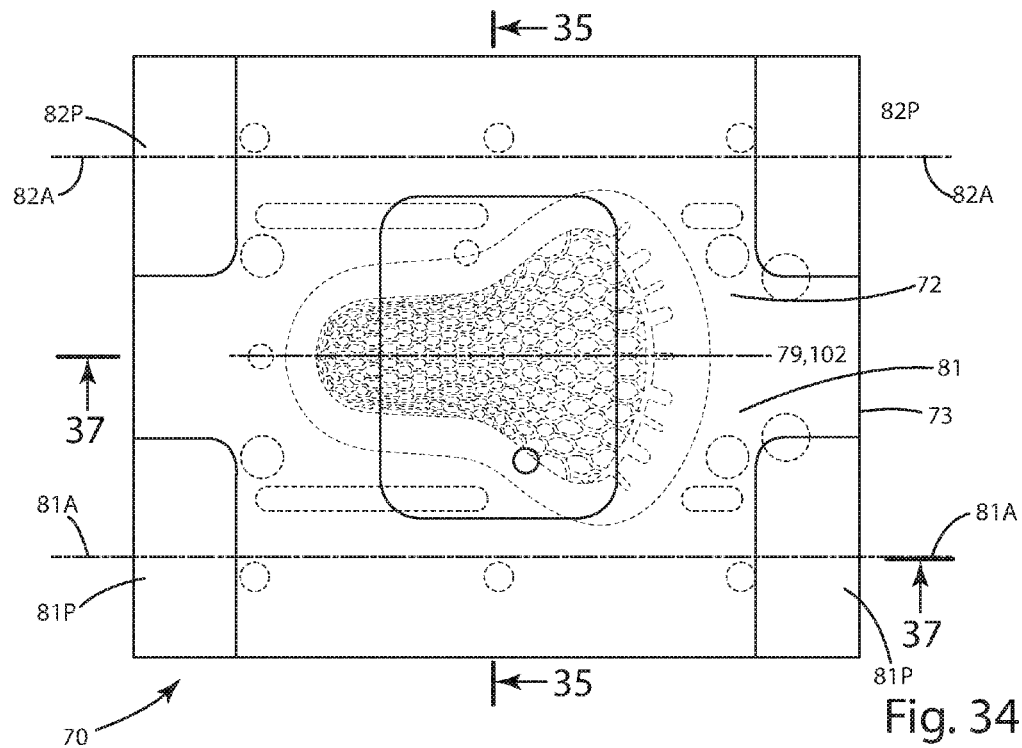
FIG. 34 is a top view of a mold for joining a molded pocket and head of the current embodiment.

A method of manufacturing a molded pocket of the current embodiment described above will now be described with reference to FIGS. 34-45. The molded pocket of the current embodiment shown in FIGS. 1-4 can be constructed with an injection molding apparatus. One mold suitable for such injection molding is illustrated in FIG. 34 and generally designated 70. This mold 70 can include a mold base 73 which includes a lifter 71. The lifter 71 and/or base 73 can define a first pocket cavity portion 75A. This first pocket cavity portion can cooperate with a second pocket cavity portion 85A and a third pocket cavity portion 85B, which are defined by the mold slides 81 and 82, also referred to as mold doors herein, to form a complete mold pocket cavity 74. The mold slides or doors 81 and 82 can be pivotally attached to the base 73 via the respective pins 81P and 82P, so that the respective mold slide doors fold or hinge about respective pivot axes 81A and 82A from an open position to a closed position. In the closed position, the slides engage one another or are at least placed immediately adjacent one another along a line of symmetry 79 of the molded pocket cavity 74 or a parting line of the molded pocket in general.

Injection molded material is injected through a network of runners 86 into the base molded pocket cavity 74 defined by the first pocket cavity portion 75A and the second and third pocket cavity portions 85A and 85B. An already formed lacrosse head 20 can be held in place relative to the base 73 via a retainer element 71. The lacrosse head 20 can include net holes or other apertures or grooves defined in its lowermost region, in communication with the molded pocket cavity 74. When the material is injected, it fills the cavity as well as engages the lacrosse head to affix the molded pocket to the lacrosse head.

Figure 35:
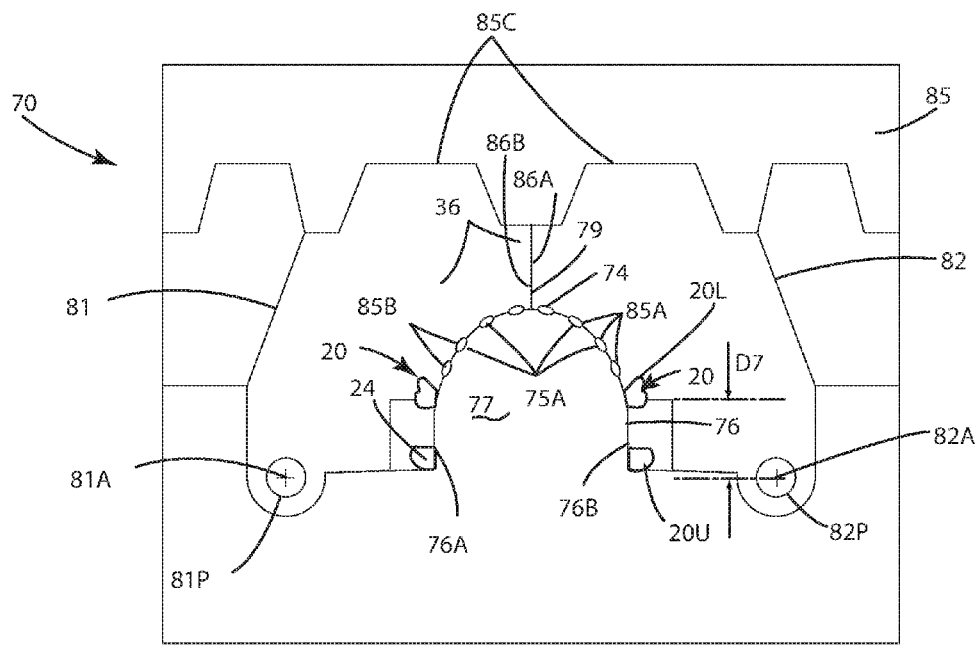
FIG. 35 is an end section view of the mold with opposing mold slides of the mold in a closed position, taken along line 35-35 of FIG. 34.
Figure 36:
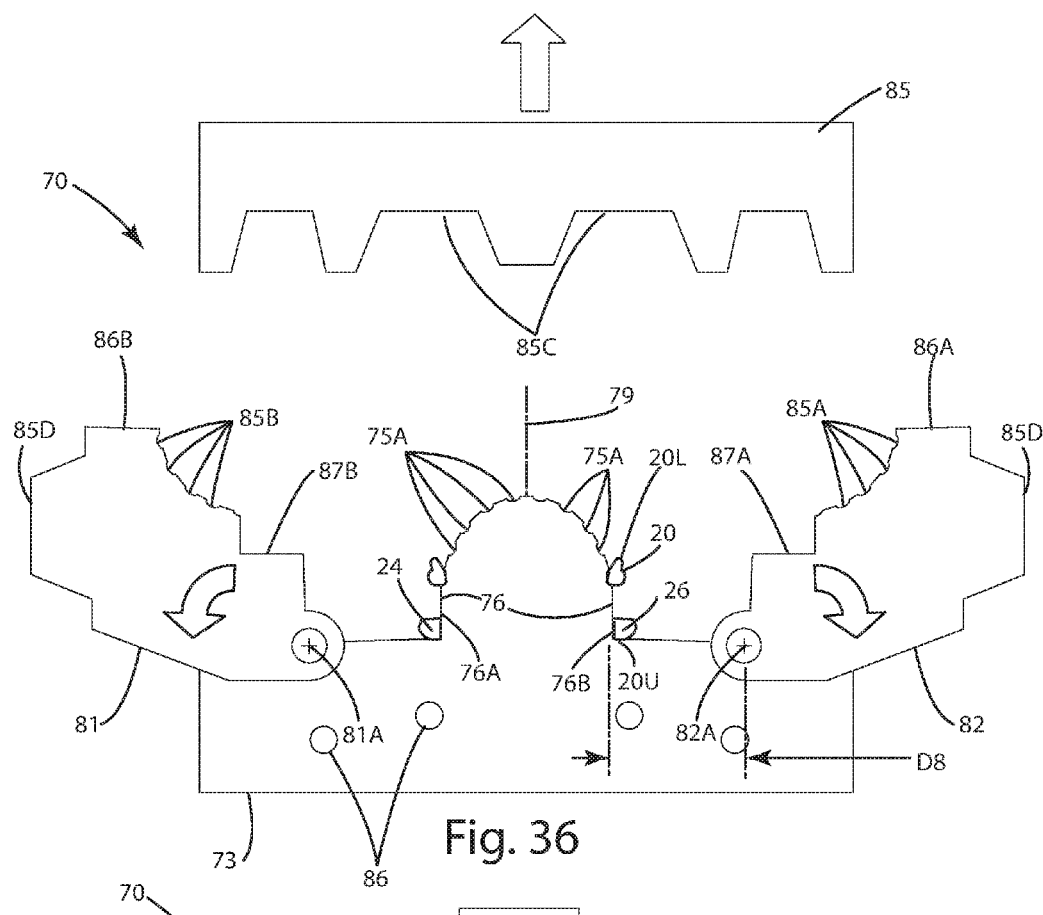
FIG. 36 is an end section view of the mold with opposing mold slides of the mold in an open position, taken along line 35-35 of FIG. 34.

Turning now with more particularity to FIGS. 34-36, the base 73 can include the retainer portion 76. The retainer portion can include opposing sides 76A and 76B. These opposing sides can be connected to one another and generally form a continuous periphery of the retainer portion 76. This periphery can correspond to one or more different portions of the interior and/or exterior surfaces of a lacrosse head 20. For example, as shown in FIGS. 35 and 36, the base sides 76A and 76B can be configured to engage the respective sidewalls 24 and 26. Other parts of the periphery can engage the base 23 and/or scoop 28. In so doing, the lacrosse head is effectively held in an consistent and fixed position relative to the retainer portion 76, and more generally, to the base 73 for molding operations. Again, this can facilitate a clean and consistent connection of the molded pocket to the lacrosse head.

The retainer portion 76 can be the same size or slightly larger than the interior surfaces of the molded pocket around an inner perimeter 15 of the lacrosse head 20. This can ensure a friction or tight fit to promote tight tolerances when the pocket 10 is molded to the head 20. Optionally, where the molded pocket 10 is to be joined or molded to a pocket frame, such as those in the embodiments above, the retainer portion 76 can be sized and configured to engage the interior of the pocket frame in a similar manner. Generally, the retainer portion can be reduced in height due to the fact that the pocket frame is typically shorter in height than the sidewalls and/or base of a lacrosse head. With the pocket frame appropriately placed, the molded pocket can be injection molded using the techniques and methods described herein.

Returning to FIGS. 34-36, the mold base 73 can include one or more lifters 71 configured to extend upwardly into the and through the interior 22 of the lacrosse head 20. Generally the lifter 71 can protrude upwardly past the lowermost portion of the lower rails of the sidewalls 24 and 26, and further above the lowermost portions of the ball stop and/or scoop (not shown). This generally corresponds to the feature of the molded pocket extending below those lowermost portions of the head 20. The uppermost portion of the lifter 71 can define the first pocket cavity portion 75A. This first pocket cavity portion 75A can include surfaces that basically mirror the various components of the molded pocket, for example the individual molded strings, the combined strings and the shooters, as well as the support rails and any other features of the molded pocket or other pockets herein.

The molded pocket cavity 74 can be collectively formed by the first pocket cavity portion 75A of the base 73 and/or lifter 71, the second pocket cavity portion 85A, and the third pocket cavity portion 85B which are respectively defined by the mold slide 81 and the mold slide 82. The molded pocket cavity 74 can collectively define all of the surfaces mirroring the finished molded pocket. The molded pocket cavity 74 also can be in direct fluid communication with the lacrosse head 20 and its components to promote attachment of the molded pocket to a lacrosse head, or optionally to a molded pocket frame as desired. The molded pocket cavity 74 also is in direct fluid communication with multiple runners 86 defined by the mold, for example the base mold 73 and/or the mold slides 81 and 82. These runners can deliver a supply of molding material, for example polymeric materials, such as those described above, to form the molded pocket 10 in the molded pocket cavity 74. A variety of different configurations of the runners can be used depending on the particular application.

As shown in FIGS. 34-36, the mold slides 81 and 82 are pivotally connected to the mold base 73. In effect, these slides do not operate like conventional mold slides which move primarily linearly either up or down relative to a mold cavity. Instead, these mold slides are configured to pivot about pivot axes 81A and 82A riding on pins 81P and 82P. Optionally, although shown as including a pair of slides that pivot away from one another when opened, the mold can include a single pivoting slide defining a molded pocket cavity portion, or three, four, or more pivoting slides defining multiple molded pocket cavity portions.

Figure 37:
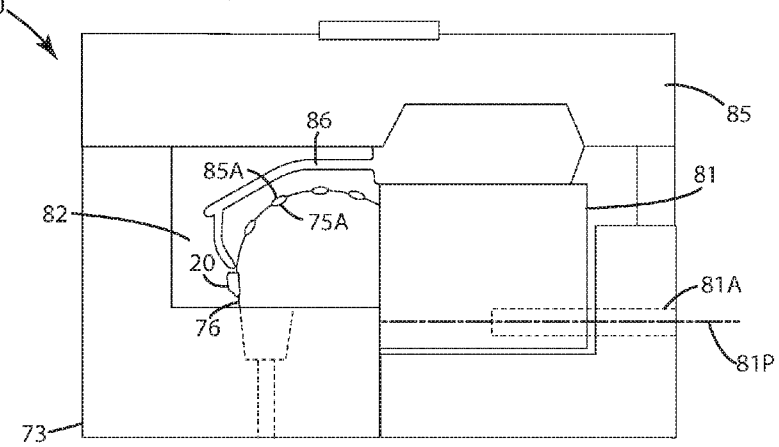
FIG. 37 is a side section view of the mold with opposing mold slides of the mold in a closed position, taken along line 37-37 of FIG. 34.

With reference to FIGS. 35-37, the pins can be further connected to the mold base 73. Although shown as multiple pins connecting different ends of the mold slides 81 and 82, the pins 81P and 82P can be a single continuous pin on opposite side of the line of symmetry 79. As described in further detail below, when the mold is open to install a head 20 on the retainer portion 76, the slides are pivoted or folded open in the direction of the arrows R4. Before doing so, the clamp plate 85 can be disengaged from those slides to allow such rotation as described below.

The mold slides 81 and 82, and/or the base 73, can include an internal head relief portions 87A and 87B. These portions are configured to allow clearance between the slides 81, 82 when they are folded or pivoted closed, and the head 20 placed on the retainer portion 76. The head 20 can fit within the respective reliefs 87A and 87B defined by the slides 81 and 82, so that the slides 81 and 82 do not engage or contact the head.

Further, each of the slides can be configured to include an inner engagement surfaces 86A and 86B. When the slides 81, 82 are closed in the position shown in FIG. 35, those surfaces 86A and 86B are placed in contact with one another to at least partially close off the molded pocket cavity 74. As mentioned above, the slides, as well as the base, can include one or more runners 86 through which injected fluid material, such as a liquid polymeric material or other material is mobilized. One or more of those runners can be defined by the inner engagement surfaces 86A and 86B. If desired, the surfaces, when contacting one another, can complete one of more of the runners so that the runner is effectively closed to form a complete runner. Again, the runners can be in fluid communication with the molded pocket cavity 74, including the first molded pocket cavity portion 75A and the second and third molded pocket portion cavity portions 85A and 85B.

The slides 81 and 82 can be strategically positioned and moveable in a specific path or paths to ensure that they release in a consistent, non-damaging manner from the complex molded features of the molded pocket, and its intricate and multifaceted surfaces is consistent. As described above, the individual molded strings, molded combined strings and shooters of the molded pocket can be of various complicated shapes and complex geometric configurations. For example, as shown in FIG. 1, the molded strings and combined molded strings form intricate hexagonal shapes. As shown in FIG. 4, the combined molded strings 12C are rather intricate and form a variety of complicated exterior surfaces, particularly in the upper and lower portions of the combined molded strings, and at the junction 12J. The second and third pocket mold cavity portions 85A and 85B of the slides 81 and 82 can be cleanly and consistently released from these complicated surfaces, optionally due to the pivoting mold slides or doors removing those cavity portions from the molded surfaces of the pocket in somewhat orthogonal directions or other directions straight away from the molded surfaces, to prevent excessive pulling or tearing of the molded pocket and its material.

To achieve the pivoting action of the slides, the axes 81A and 82A of the respective slides 81 and 82 can be positioned to facilitate precise and accurate movement in the directions R4 when the slides are folded open. The axes 81A and 82A of the respective doors 81 and 82 can be positioned "above" the lowermost portion 20L of the lacrosse head 20 when the head is positioned horizontally, with the lower rail vertically below the upper rail. The perspective in FIG. 35 shows the head upside down in the mold, so there, the axes appears "below" the lowermost portion 20L. Further, the lowermost portion 20L of the head appears to be an uppermost portion of the head 20. There, however, that is not really the case, because again, the head is vertically upside down in FIG. 35.

The axes 81A and 82A can be specifically positioned to ensure the clean release of the second pocket cavity portion 85*a* and the third cavity pocket portion 85*b* from the molded pocket after it is formed. For example, as shown in FIG. 35, the axes 82A and 81A can be offset a distance D7 "above" the lowermost portion 20L of the lacrosse head 20 in the mold. The pivot axes 81A and 82A also can be located so that they are effectively substantially above the uppermost portion 20U of the lacrosse head 20. Generally, the axes 81A and 82A can be above the upper rail of the sidewalls of the lacrosse head. The distance D7 can be optionally about 1 inch to about 12 inches, further optionally about 2 inches to about 8 inches, even further optionally about 3 inches to about 6 inches above the lacrosse head 20, and more particularly, above the lowermost portion 20L of the sidewalls. The distance D7 further can be precisely selected so that the second pocket cavity portion 85A and the third pocket cavity portion 85B cleanly release from the molded pocket as further described below.

As shown in FIG. 36, the pivot axes 81A and 82A can also be laterally offset relative to the head 20, for example, the outermost surface of the sidewalls, or head in general, a preselected distance D8. This distance D8 can be optionally about 1 inch to about 12 inches, further optionally about 2 inches to about 8 inches, even further optionally about 4 inches to about 8 inches, yet even further optionally, about 6 inches offset from the outermost surface of the sidewalls of the lacrosse head 20. This precise distance as well can be preselected to ensure that the slides 81 and 82 pivot in such a manner so as to be drawn swiftly and consistently away from the molded pocket after it is formed and the mold cavity without damaging, disrupting or tearing the finished mold pocket.

Generally, the pivot axes are located laterally outward from the lacrosse head, and vertically above the lowermost portion 20L of the lacrosse head and/or molded pocket cavity 74, or generally above and laterally away from the sidewalls of the lacrosse head, or the molded pocket cavity 74, as shown in FIGS. 35 and 36.

Although not shown, the first and second slides 81 and 82 can be connected to pneumatic or hydraulic element which can move those first and second slides 81 and 82 about the pivot axes 81A and 82A. Further, if desired the slides 81 and 82 can be separated up into multiple individual side-by-side slides which are pivotable about additional or fewer axes than the two illustrated. For example, the mold could be configured with a first portion of a mold cavity defined by a base mold and a second portion of the mold cavity defined by a single slide. The single slide could be pivotable about an axis similar to the axes above. To open the mold, the slide could pivot generally like a door about the single axis, opening away from the base mold to thereby separate the second mold cavity portion from the first mold cavity portion, freeing the molded article inside the collective mold cavity.

The axes 81A and 82A of the respective mold slides 81 and 82 are generally parallel to one another and disposed on diametrically opposed on opposing sides of the axis of symmetry 79 of the lacrosse head. The axis or line of symmetry can be aligned with the longitudinal axis 102 of the lacrosse head. If desired, the slides can optionally be reconfigured so that they are not parallel and are offset as some angle relative to one another, and relative to the axis of symmetry 79.

As shown in FIGS. 35-37, the mold 70 also can include a clamp plate 85. This clamp plate can defines recesses 85C which are configured to receive the slide projections 85D of the respective first and second slides 81 and 82 when they are in a closed position, with their engagement surfaces 86A and 86B generally engaging one another across the line of symmetry 79 of the mold 70. The clamp plate 85 can be compressed against these slides so that the recesses capture the projections and effectively hold the slides 81 and 82 so that they do not move. For example, the projections 85D are entrapped within the recesses 85C so that the slides 81 and 82 do not fold or pivot open in directions R4 during a molding operation, when injection molded material under high pressure might be injected into the molded pocket cavity 74. The recesses 85C and the projections 85D can be tapered as illustrated to ensure that there is positive and forceful registration between the recesses of the clamp plate 85 and the projections 85D of the slides. This can ensure that the slides are held in a secure, locked closed position, as shown in FIG. 35. Of course, the projections and recesses can be reversed, with the projections on the clamp plate and the recesses on the mold slides With further reference to FIGS. 35 and 36, the clamp plate 85 is movable and operable in both a closed mode or molding mode as shown in FIG. 35 and an open mold mode as shown in FIG. 36. In the molding mode of FIG. 35, the plate 85 is lowered toward the slides 81, 81 so that the recesses 85C entrap the projections 85D. In the open mold mode shown in FIG. 36, the clamp plate 85 is moved upwardly in the direction of the arrow so that the projections 85D are released from the recesses 85C. This movement can be primarily vertical, or in a direction linearly away from the base mold 73. The clamp plate 85 can be moved a distance away from the base mold 73 so that the slides 81 and 82, can have room to clear the clamp plate 85 and pivot open, somewhat like doors.

Operation of the mold, and the method for forming a molded pocket will now be described with reference to FIGS. 38-45. In general, the method for molding the molded pocket includes placing a lacrosse head frame and/or a pocket frame within a mold, the mold having a first molded pocket cavity portion formed immediately adjacent the lacrosse head or pocket frame. At least one slide is moved adjacent a base of the mold. The at least one slide includes a second portion of the molded pocket cavity to form a completed molded pocket cavity. Optionally, the at least one slide is rotated about a pivot axis to bring the second cavity portion immediately adjacent the first cavity portion to form the completed molded pocket cavity.

Further optionally, the mold can include a second slide across a line of symmetry of the mold. The second slide also can pivot about a second pivot axis, which is parallel to but offset laterally relative to the line of symmetry an the opposite side of the head. The second slide can include a third cavity portion which, when brought against the first cavity portion is in communication with that first cavity portion and the second cavity portion to form the completed molded pocket mold cavity in which the molded pocket can be formed.

Even further optionally, a clamp plate can be pressed adjacent the first slide and optional second slide to secure and/or capture the slides so that they do not separate from one another or distort the finished mold cavity during the molding of the molded pocket. Material can be injection molded into the molded pocket mold cavity.

As the molded pocket is molded, it joins with the lacrosse head and/or pocket frame mechanically and/or via a bonding action between the material of the injection molded pocket and the head or pocket frame. After the molded pocket is formed, the first and optional second slides can be pivoted or folded open about the pivot axes. Due to the pivoting action, optionally away from the line of symmetry, the second mold cavity portion and optional third cavity mold portion cleanly and consistently break or separate away from the molded pocket so that it remains intact and does not tear. Optionally, the internal surfaces of the second mold cavity portion and optional third cavity mold portion move in an arcuate or curved pathway away from the molded features and surfaces of the molded pocket as the slides are pivoted open.

The lacrosse head and/or pocket frame having the molded pocket joined with it can be removed from the mold. Any sprues or flashing formed during the molding process can be removed from the molded pocket.

Figure 38:
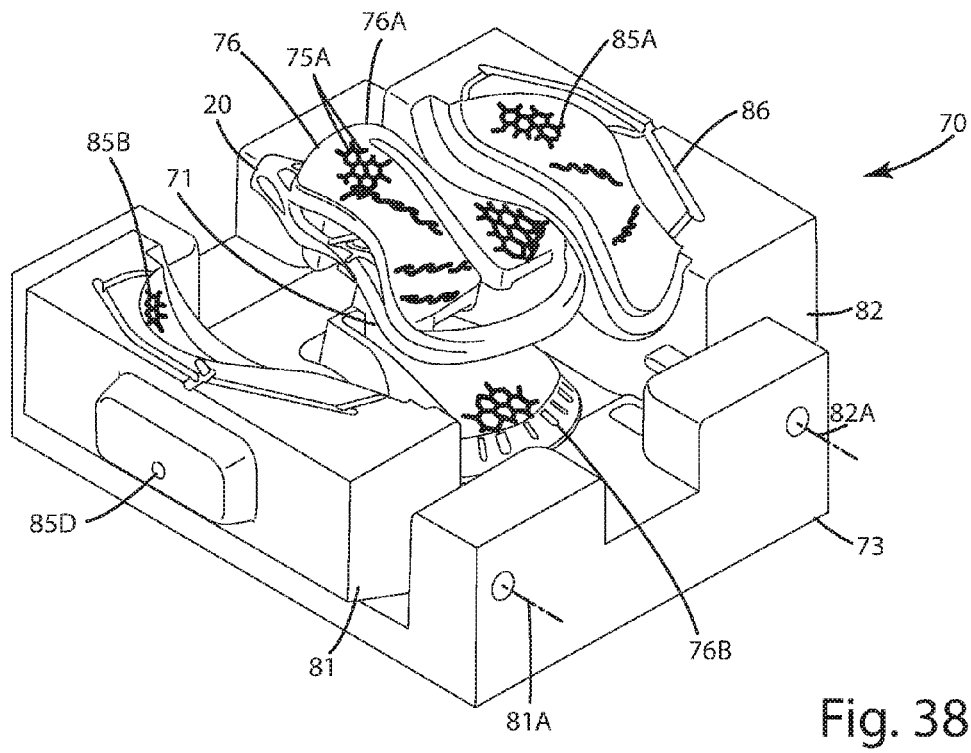
FIG. 38 is a perspective view of the mold slides open and a lacrosse head being placed in the mold.

More particularly, as shown in FIG. 38, the mold 70 is configured with the slides 81 an 82 in an open mode. The head 20, or a pocket frame as described herein, is fit over the retainer portion 76, optionally being friction fit with force to ensure that it remains in the desired position throughout the injection molding of the molded pocket. As shown in FIG. 38, the retainer portion can include a primary portion 76A and a secondary portion 76B if desired to facilitate the fitment of the head and better accommodate the shape of the desired molded pocket. Additional retainer portions or lifters can be included in the base or retainer portion as desired depending on the application. These retainer portions or lifters also can be used to lift the finished product out of the mold as described in further detail below or optionally retract the head and the first pocket cavity portion 75A into the mold toward the base 73.

Figure 39:
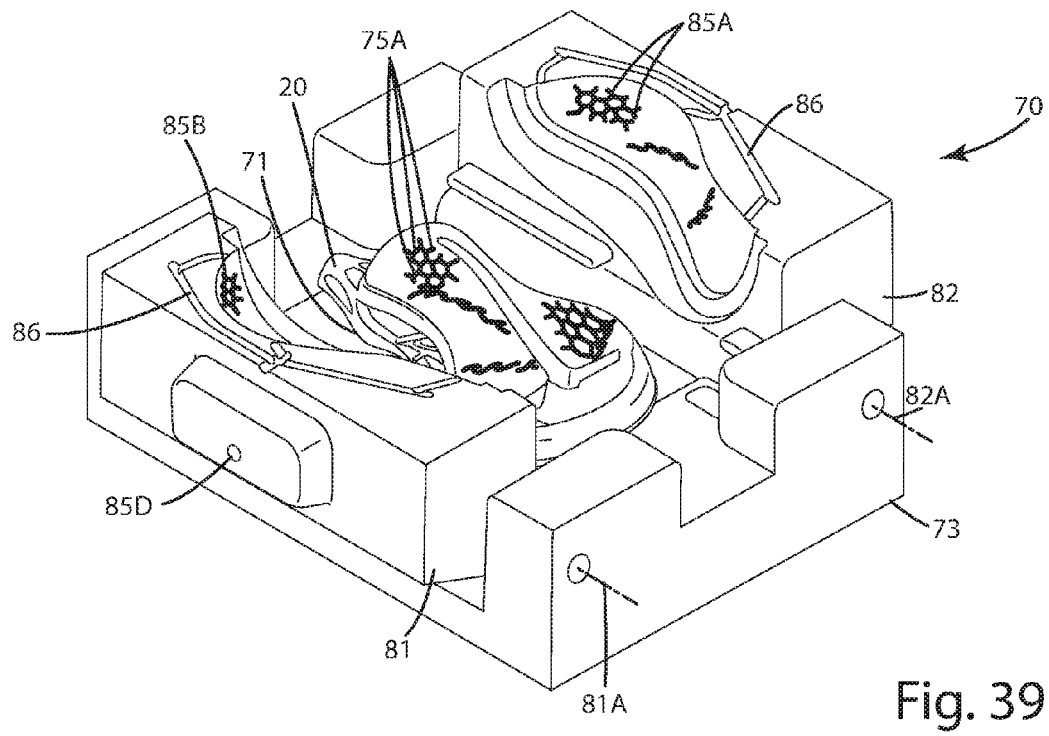
FIG. 39 is a perspective view of the mold slides open and the head retracted into the mold on a retainer portion.

Turning now to FIG. 39, the head 20 along with the retainer portion 76 is retracted or drawn toward the base 73 with the lifter 71. In so doing, the first cavity portion 75A is positioned so that the second cavity portion 85A and the third cavity portion 85B will align with that cavity portion when the slides 81, 82 are closed.

Figure 40:
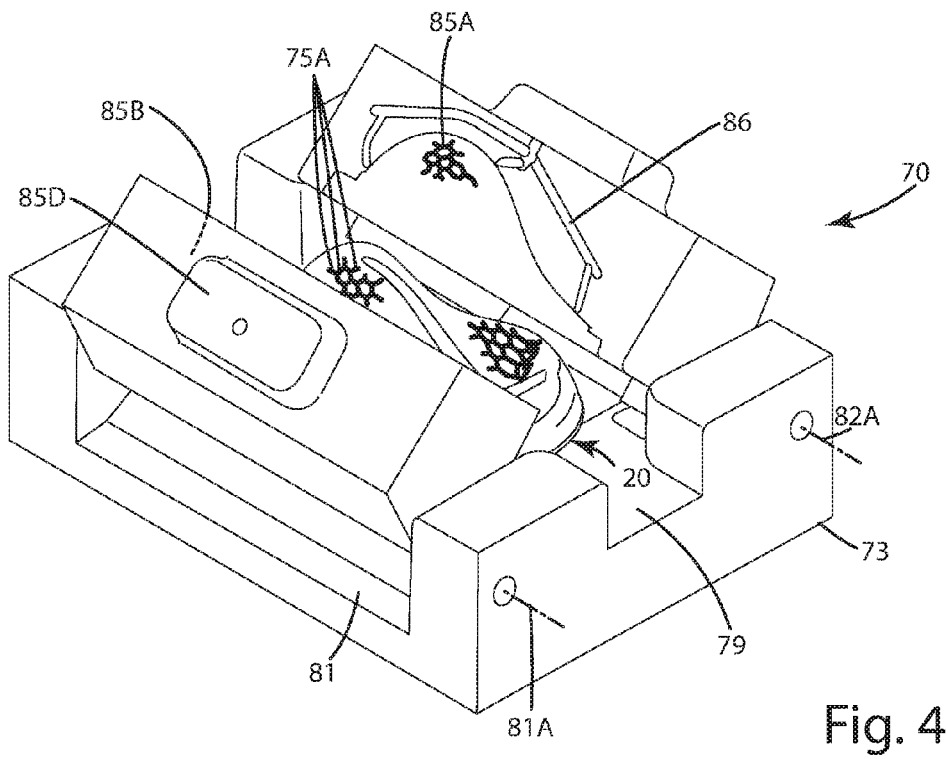
FIG. 40 is a perspective view of the mold slides closing to complete a cavity for the molded pocket.

As shown in FIG. 40, the slides 81, 82 are moving from an open mode to a closed mode. During the closing action, the slides fold inward toward the line of symmetry 79 of the mold about their respective pivot axes 81A and 82A. Optionally, instead of a line of symmetry, these slides can fold toward some other predetermined line which is conveniently located to ensure that when the slides open, the mold cavity portions associated with those slides cleanly and consistently separate from the molded pocket without damaging its surfaces, for example, surfaces of the molded strings, or tearing the molded pocket. Thus, even though referred to as a line of symmetry, this feature need not always separate the mold and/or the pocket into perfectly symmetric opposing sides. One side can be slightly larger than the other or can be slightly offset from the perfect center of the molded pocket and/or mold.

Generally, during the closing action, the second molded pocket mold cavity portion 85A and third molded pocket mold cavity portion 85B of the respective slides move along arcuate pathways toward the first molded pocket mold cavity portion 75A. This movement along those arcuate pathways can be due to the pivoting action about the respective axes. Optionally, the each of the various surfaces and points of the second molded pocket mold cavity portion 85A and third molded pocket mold cavity portion 85B can move along their own single arcuate pathway, generally rotating toward one another as the slides are closed to the closed mode. This action sometimes can be referred to as a barn door closing action.

Figure 41:
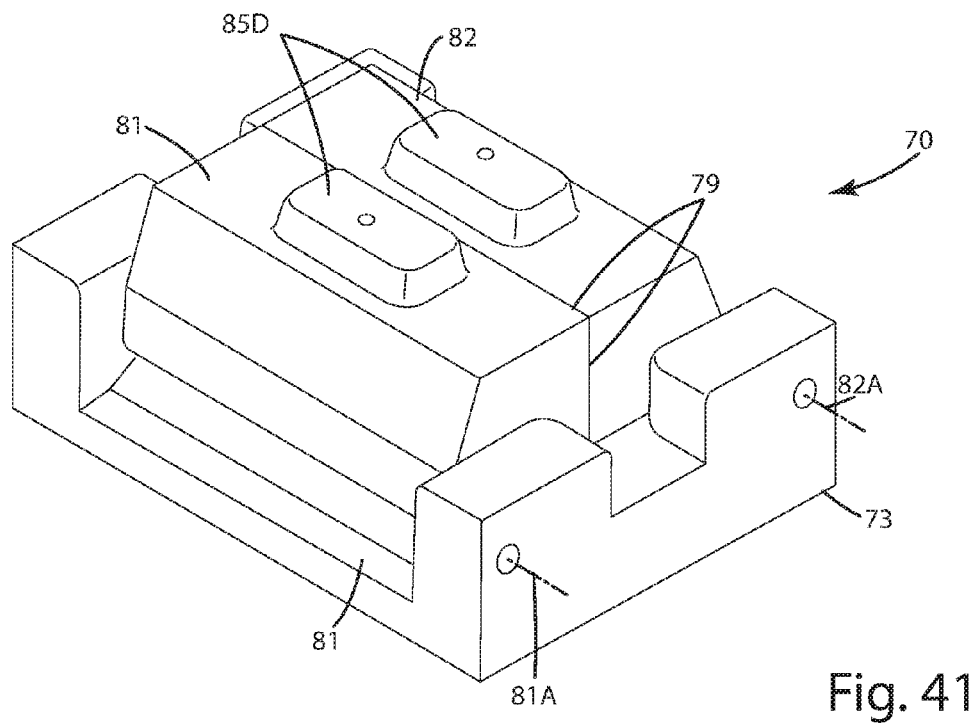
FIG. 41 is a perspective view of the mold slides closed to complete the cavity for the molded pocket.

FIG. 41 illustrates the mold 70 in a closed configuration with the slides 81 and 82 in a closed mode. In this configuration, the first pocket cavity portion 75A, second pocket cavity portion 85A and the third pocket cavity portion 85B cooperatively form the completed molded pocket cavity 74, also shown in FIG. 35. The engagement surfaces 86A and 86B can be engaging or in contact with one another. If there are partial runners 86 along the engagement surfaces, those runners can be completed and can form full runners. The frame of the lacrosse head can be located within the reliefs 87A and 87B defined by the slides when the slides are in the closed mode.

Figure 42:
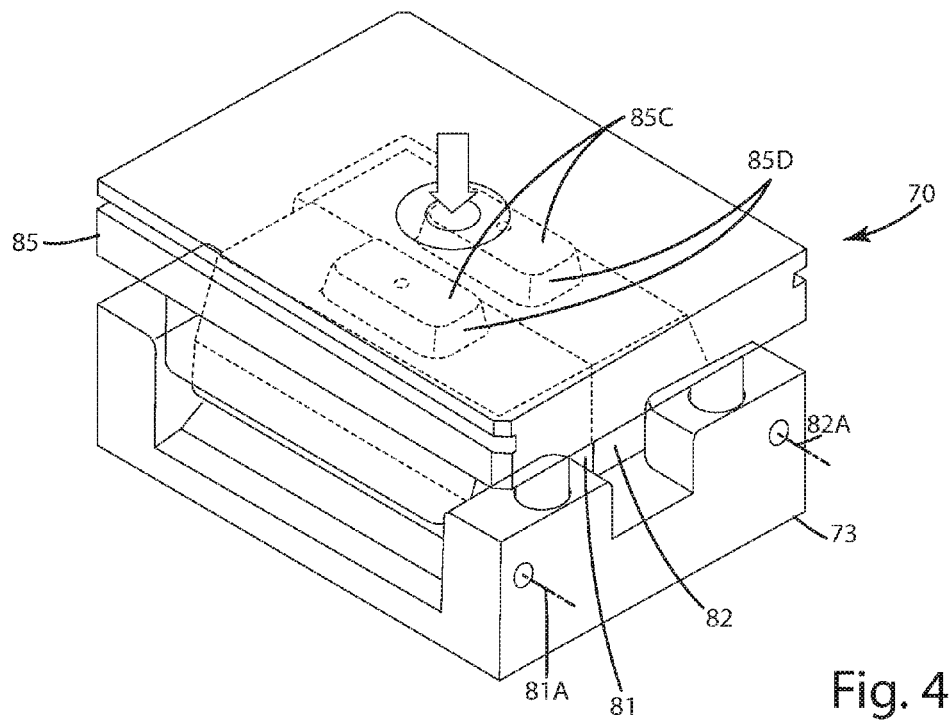
FIG. 42 is a perspective view of the mold slides closed to complete the cavity for the molded pocket, with a clamp plate closed against the slides.

As shown in FIG. 42, the slides 81 and 82 remain fully closed. The projections 85D extending from the slides 81 and 82 are registered within the corresponding recesses 85C of the clamping plate 85. The clamping plate can be brought downward, or generally toward the mold base 73, to ensure the appropriate registration of the projections 85D in the recesses 85C. This effectively locks the slides 81 and 82 in place and completes the mold cavity 74 within the mold 70. At this point, the polymeric material or other material can be injection molded or otherwise introduced into the molded pocket cavity, forming the individual strings, combined strings, shooters, support rails and any other components of the molded pocket. In so doing, the introduced material can also engage portions of the lacrosse head frame and/or pocket frame in communication with the molded pocket cavity to join the molded pocket with the head and/or pocket frame.

Figure 43:
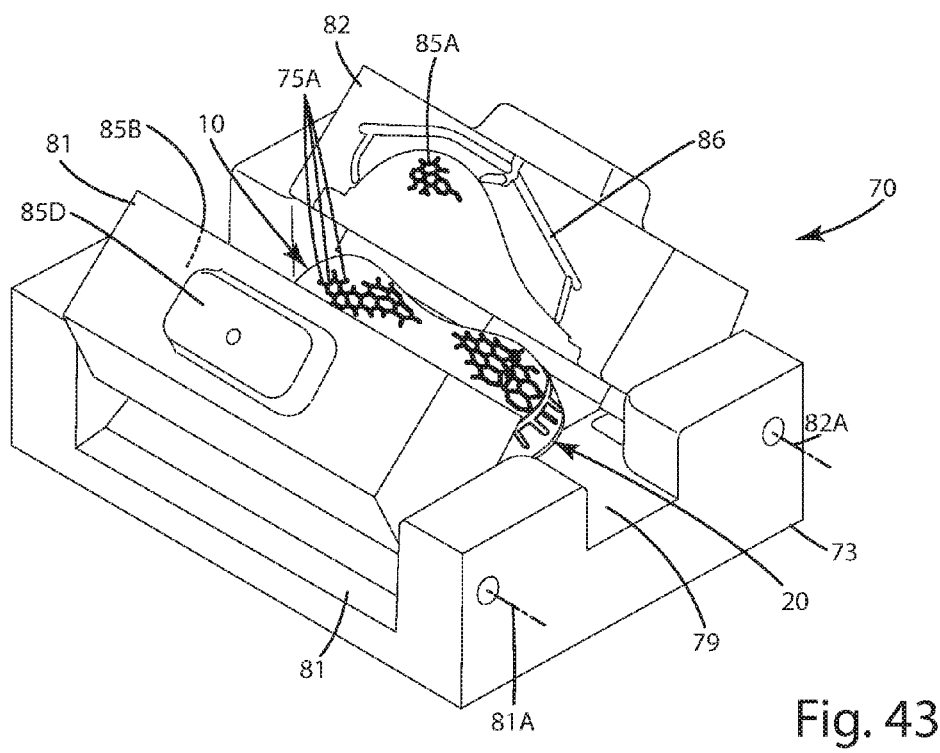
FIG. 43 is a perspective view of the mold slides opening with the molded pocket molded and joined with the head.

After the molded pocket is sufficiently molded and cured within the molded pocket cavity, the mold can be opened. This is illustrated in FIG. 43. There, the mold slides 81 and 82 are fully pivoted open about the respective axes 81A and 82A toward an open mode. Again, due to the precise placement of these axes relative to the various surfaces of the molded pocket 10 within the mold described above, when the second molded cavity portion 85A and/or third molded cavity portion 85B are separated from the multifaceted surfaces of the molded pocket, those portions 85A and 85B cleanly release from those surfaces.

Generally, during the opening action, the second molded pocket mold cavity portion 85A and third molded pocket mold cavity portion 85B of the respective slides move along arcuate pathways away from the molded pocket and the first molded pocket mold cavity portion 75A. This movement along the arcuate pathways can be due to the pivoting action about the respective axes. Optionally, the each of the various surfaces and points of the second molded pocket mold cavity portion 85A and third molded pocket mold cavity portion 85B can move along their own single arcuate pathway as the slides are opened, and generally rotate away from one another.

Figure 44:
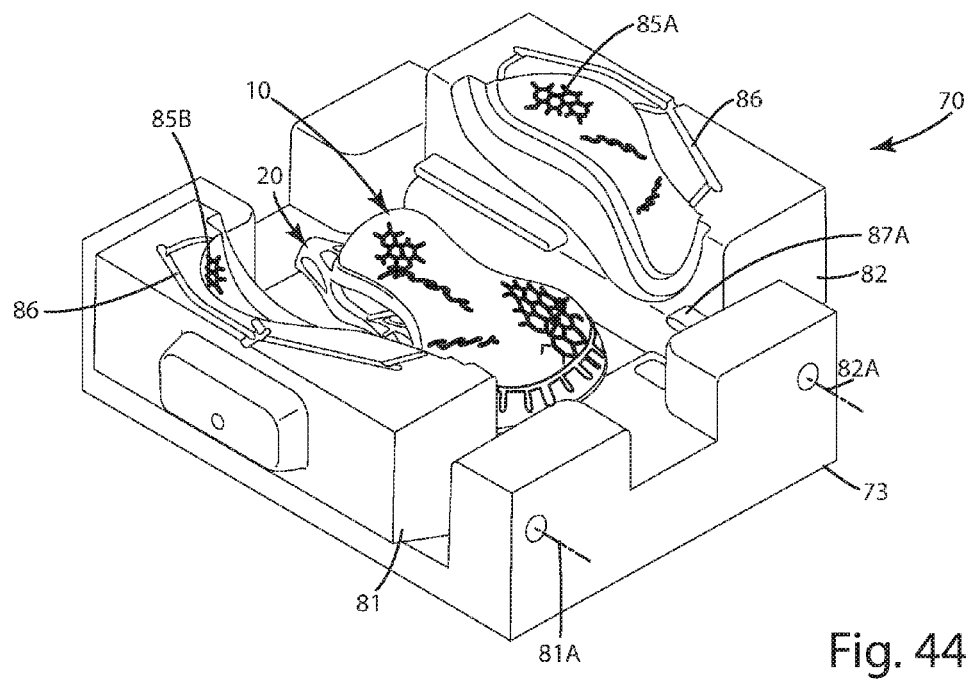
FIG. 44 is a perspective view of the mold slides open with the molded pocket molded and joined with the head, but retracted in the mold base.
Figure 45:
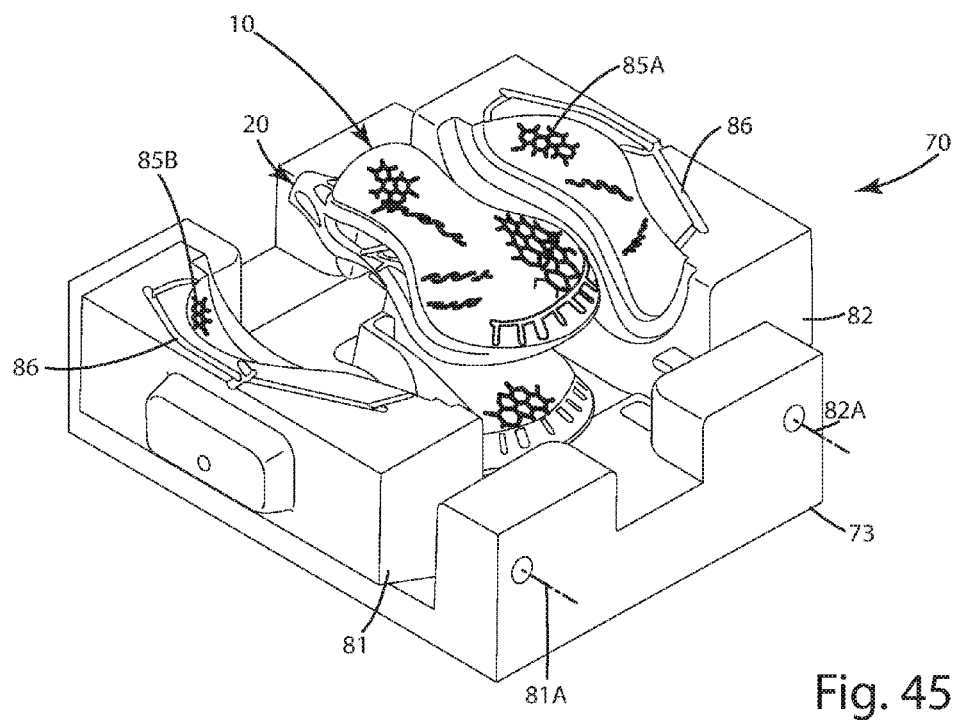
FIG. 45 is a perspective view of the mold slides open with the molded pocket molded and joined with the head, with the head being lifted from the mold base.

Any remaining sprues can be removed at this point from the molded pocket and/or mold. The slides 81 and 82 can continue to open as shown in FIGS. 44 and 45. In FIG. 45, the lifter, which can form a portion of the retainer 76 as noted above can lift the lacrosse head and/or pocket frame, along with the formed mold pocket out from the base 73 for removal by an operator. Further finishing, such as removing flashing and brushing the parting line corresponding to the line of symmetry can be performed as desired. The molded pocket, along with the associated lacrosse head and/or pocket frame can be further prepared, finished and/or packaging.

With all of the embodiments described above, a durable and easy-to-install pocket and related method are provided.

Directional terms, such as "vertical," "horizontal," "top," "bottom," "upper," "lower," "inner," "inwardly," "outer" and "outwardly," are used to assist in describing the invention based on the orientation of the embodiments shown in the illustrations. The use of directional terms should not be interpreted to limit the invention to any specific orientation(s).

The above description is that of current embodiments of the invention. Various alterations and changes can be made without departing from the spirit and broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims. Any reference to claim elements in the singular, for example, using the articles "a," "an," "the" or "said," is not to be construed as limiting the element to the singular. Any reference to claim elements as "at least one of X, Y and Z" is meant to include any one of X, Y or Z individually, and any combination of X, Y and Z, for example, X, Y, Z; X, Y; X, Z; and Y, Z.

The embodiments of the invention in which an exclusive property or privilege is claimed are defined as follows:

1. A method of joining a lacrosse pocket to a frame, the method comprising:
   overmolding only a perimeter of a lacrosse pocket with a first polymeric material that embeds within and encapsulates a plurality of strands of the lacrosse pocket, thereby forming a frame with the lacrosse pocket attached thereto, applying a tension to the frame which in turn applies tension to the lacrosse pocket so that the lacrosse pocket is in a tensioned mode.

2. The method of claim 1 comprising:
engaging the lacrosse pocket with a bulbous contour during the overmolding step,
wherein the lacrosse pocket maintains a shape corresponding to the bulbous contour after the overmolding step.

3. The method of claim 1,
wherein the lacrosse pocket includes a longitudinal axis,
wherein the tension is applied perpendicular to the longitudinal axis.

4. The method of claim 1,
wherein the lacrosse pocket includes a longitudinal axis,
wherein the tension is applied longitudinally, generally parallel to the longitudinal axis.

5. The method of claim 2,
wherein the lacrosse pocket is constructed from a fabric,
wherein the lacrosse pocket is in the tensioned mode during the overmolding the frame step.

6. The method of claim 1,
wherein the frame includes an inner part and an outer part that sandwich the perimeter of the lacrosse pocket.

7. A method of joining a lacrosse pocket to a pocket frame joined with a lacrosse head, the method comprising:
overmolding only a perimeter of a lacrosse pocket with a first polymeric material that encapsulates a plurality of strands of the lacrosse pocket, thereby forming a pocket frame with the lacrosse pocket attached thereto; and
overmolding the pocket frame, with the lacrosse pocket attached thereto, with a second polymeric material that extends over at least a portion of the frame, thereby forming a lacrosse head frame with the pocket frame attached thereto, and the lacrosse pocket attached to the pocket frame.

8. The method of claim 7,
wherein the lacrosse pocket is constructed from a fabric.

9. The method of claim 8,
wherein the first polymeric material is different from the second polymeric material and the fabric.

10. The method of claim 7 comprising:
applying tension to the pocket frame before overmolding with the second material.

11. The method of claim 10,
wherein the applying tension to the pocket frame in turn applies tension to the lacrosse pocket so that the lacrosse pocket attains a tensioned mode before the overmolding the pocket frame step.

12. A method of joining a lacrosse pocket to a frame, the method comprising:
applying a tension to a lacrosse pocket;
overmolding only a perimeter of a lacrosse pocket with a polymeric material that embeds within and encapsulates a plurality of strands of the lacrosse pocket, while the tension is applied to the lacrosse pocket.

13. The method of claim 12,
wherein the lacrosse pocket is a fabric,
wherein the tension applying stretches the fabric to a pre-tensioned mode.

14. The method of claim 12,
wherein the polymeric material forms a frame in a mold,
wherein at least a portion of the tension is retained in the lacrosse pocket after the frame is removed from the mold.

15. The method of claim 12,
wherein the lacrosse pocket is constructed from a fabric,
wherein the tension applying stretches the fabric to a width in a tensioned mode that is greater than another width of the fabric in an un-tensioned mode.

* * * * *